US 8,623,976 B2

(12) United States Patent
Hou et al.

(10) Patent No.: US 8,623,976 B2
(45) Date of Patent: Jan. 7, 2014

(54) POLYMERIZATION CATALYST COMPOSITIONS CONTAINING METALLOCENE COMPLEXES AND POLYMERS PRODUCED BY USING THE SAME

(75) Inventors: Zhaomin Hou, Wako (JP); Yunjie Luo, Wako (JP); Xiaofang Li, Wako (JP); Jens Baldamus, Wako (JP)

(73) Assignee: RIKEN, Wako-shi (JP)

( * ) Notice: Subject to any disclaimer, the term of this patent is extended or adjusted under 35 U.S.C. 154(b) by 0 days.

(21) Appl. No.: 13/543,158

(22) Filed: Jul. 6, 2012

(65) Prior Publication Data

US 2012/0277387 A1  Nov. 1, 2012

Related U.S. Application Data

(62) Division of application No. 13/167,159, filed on Jun. 23, 2011, now abandoned, which is a division of application No. 11/631,381, filed as application No. PCT/JP2005/012254 on Jul. 1, 2005, now Pat. No. 7,994,267.

(30) Foreign Application Priority Data

Jul. 2, 2004 (JP) ................. 2004-197271
Dec. 17, 2004 (JP) ................. 2004-366159

(51) Int. Cl.
 *C08F 4/52* (2006.01)
 *C08F 210/00* (2006.01)
(52) U.S. Cl.
 USPC ........... 526/170; 526/126; 526/134; 526/160; 526/164; 526/339; 526/340; 526/340.3; 526/346; 526/347; 526/943
(58) Field of Classification Search
 USPC ............ 526/160, 339, 340, 340.3, 346, 347, 526/126, 134, 164, 170, 943
 See application file for complete search history.

(56) References Cited

U.S. PATENT DOCUMENTS

| 5,066,741 A | 11/1991 | Campbell, Jr. |
| 5,206,197 A | 4/1993 | Campbell, Jr. |
| RE36,563 E | 2/2000 | Takeuchi |
| 6,596,828 B1 | 7/2003 | Kaito et al. |
| 2003/0018144 A1 | 1/2003 | Kaita et al. |
| 2005/0154158 A1 | 7/2005 | Hanaoka et al. |

FOREIGN PATENT DOCUMENTS

| EP | 421659 | 4/1991 |
| EP | 878489 | 11/1998 |
| EP | 1086957 | 3/2001 |
| JP | 62-104818 | 5/1987 |
| JP | 62/187708 | 8/1987 |
| JP | 3-124706 | 5/1991 |
| JP | 5-320258 | 12/1993 |
| JP | 10-60030 | 3/1998 |
| JP | 10-259206 | 9/1998 |
| JP | 2000-178293 | 6/2000 |
| WO | 00/18808 | 4/2000 |
| WO | 00/52062 | 9/2000 |

OTHER PUBLICATIONS

Pellecchia et al., Macromolecules, vol. 25, pp. 4450-4452, (1992).
Tardif et al., Organometallics, vol. 22, No. 6, pp. 1171-1173, (Mar. 2003).
Hultzsch et al., Angew, Chem. Int. Ed., vol. 38, No. 1/2, pp. 227-230, (1999).
Tanaka et al., Journal of Polymer Chemistry, vol. 39, pp. 1382-1390, (2001).
Ishihara et al., Macromolecules, vol. 19, pp. 2465-2465, (1986).
McKnight et al., Chem. Rev. vol. 98, pp. 2587-2598, (1998).
Cui et al., J. AM. Chem. Soc., vol. 126, pp. 1312-1313, (2004).
Tanimura et al., Journal of Polymer Science: Part B Polymer Physics, vol. 39, pp. 973-978, (2001).
Nomura et al., Macromolecules, vol. 36, pp. 3797-3799, (2003).
Simanke et al., Journal of Polymer Science: Part A Polymer Chemistry, vol. 40, pp. 471-485, (2002).
International Search Report issued Oct. 25, 2005 in International (PCT) Application No. PCT/JP2005/012254.
International Preliminary Report on Patentability and Written Opinion of the International Searching Authority issued Jan. 16, 2007 in International (PCT) Application No. PCT/JP2005/012254.

*Primary Examiner* — Caixia Lu
(74) *Attorney, Agent, or Firm* — Wenderoth, Lind & Ponack, L.L.P.

(57) ABSTRACT

The present invention provides a novel catalyst composition comprising a metallocene complex, and a novel producing method for various polymer compounds. Preferably, the invention provides a novel polymer compound, and a producing method thereof. Specifically, the invention provides a polymerization catalyst composition, comprising:

(1) a metallocene complex represented by the general formula (I), including:
 a central metal M which is a group III metal atom or a lanthanoid metal atom;
 a ligand Cp* bound to the central metal and including a substituted or unsubstituted cyclopentadienyl derivative;
 monoanionic ligands $Q^1$ and $Q^2$; and
 w neutral Lewis base L; and
(2) an ionic compound composed of a non-ligand anion and a cation:

$$Q^1 \diagdown \underset{\underset{Q^2}{|}}{\overset{\overset{Cp^*}{|}}{M}} \diagup L_w \qquad (I)$$

where w represents an integer of 0 to 3.

37 Claims, 22 Drawing Sheets

¹H-NMR spectrum charts of copolymers of styrene and 1,3-cyclohexadiene

Fig. 9    13C-NMR spectrum chart of the copolymer of styrene and 1,3-cyclohexadiene obtained in Examples 85

$^{13}$C-NMR spectrum charts of the copolymers of styrene and 1,3-cyclohexadiene 1H-NMR spectrum charts of copolymers of ethylene and 1,3-cyclohexadiene Fig. 13   $^{13}$C-NMR spectrum chart of the copolymer of ethylene and 1,3-cyclohexadiene obtained in Example 92

Fig. 16  $^{13}$C-NMR spectrum chart of the terpolymer of ethylene, norbornene, and styrene obtained in Example 99

Fig. 19 ¹³C-NMR spectrum chart of the copolymer of ethylene and dicyclopentadiene obtained in Example 102

$^{13}$C-NMR spectrum chart of a styrene-isoprene copolymer (70 mol% styrene)

POLYMERIZATION CATALYST COMPOSITIONS CONTAINING METALLOCENE COMPLEXES AND POLYMERS PRODUCED BY USING THE SAME

This application is a Divisional of U.S. application Ser. No. 13/167,159, filed Jun. 23, 2011, now abandoned which is a Divisional of U.S. application Ser. No. 11/631,381, filed Feb. 2, 2007, now U.S. Pat. No. 7,994,267, which is a national stage application of International application No. PCT/JP2005/012254, filed Jul. 1, 2005.

TECHNICAL FIELD

The present invention relates to a polymerization catalyst composition containing a metallocene complex, and more particularly to a polymerization catalyst composition, in which a central metal in the metallocene complex is a group III metal or a lanthanoid metal.

Further, the present invention relates to a production method of a polymer compound, which is characterized by using the polymerization catalyst.

Furthermore, the present invention relates to a polymer compound which may be produced by using the polymerization catalyst composition, particularly to a styrene high-syndiotactic polymer and a styrene-ethylene high-syndiotactic copolymer.

BACKGROUND ART

A metallocene complex is a compound being used as one of catalyst components in various polymerization reactions, and also is a complex compound which has a central metal bound with one or more cyclopentadienyl or derivatives thereof. Of those, a metallocene complex, which has a central metal bound with one cyclopentadienyl or one derivative thereof, may be referred to as "half metallocene complex" or the like.

A metallocene complex has completely different characteristics (including a catalyst activity for a polymerization reaction) depending on the type of its central metal. For example, the following reports have been made for a metallocene complex which has a central metal of a group III metal or a lanthanoid metal atom.

1. There is disclosed that a complex exemplified by the structural formula (II) can be used as a component of a polymerization catalyst system (see Patent Document 1). The complex disclosed in the document is characterized by including a crosslinking type ligand which has cyclopentadienyl (or a derivative thereof).

[Chem 1]

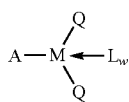
(II)

In the formula, M represents a group III metal or a lanthanoid metal, A represents a monoanionic crosslinking type ligand having a cyclopentadienyl ring or the like, Q represents a monoanionic ligand, L represents a neutral Lewis base, and w represents an integer of 0 to 3.

2. There is known a hydrido complex represented by $(C_5Me_4SiMe_3)LnH_2(THF)$ (Ln represents a group III metal or a lanthanoid metal. Same holds true for the following) (see, for example, Non-patent document 1). A complex represented by $(C_5Me_4SiMe_3)Ln(CH_2SiMe_3)_2(THF)$, which is used as a precursor for the hydrido complex, is also known.

In addition, it is reported that $[(C_5Me_4SiMe_3)YH_2]_4(THF)$ (tetranuclear complex) of the $(C_5Me_4SiMe_3)LnH_2(THF)$ is reacted with styrene to give a 1:1 adduct and shows no polymerization activity (see, for example, Non-patent document 6).

3. It is known that, of the above-mentioned $(C_5Me_4SiMe_3)Ln(CH_2SiMe_3)_2(THF)$, a complex having yttrium (Y) as Ln has no polymerization activity for styrene (see Non-patent document 2).

4. Further, a complex represented by $(C_5Me_4SiMe_3)La(CH_2(SiMe_3)_2)_2(THF)$ is known, and it is reported that the complex can serve as a catalyst for a polystyrene polymerization by being combined with methylaminoxane (MAO) or by itself to give an atactic polystyrene (see Non-patent document 3).

However, utility of a metallocene complex (particularly a metallocene complex having a central metal of a group III metal or a lanthanoid metal) as a polymerization catalyst component has not been sufficiently elucidated, so additional studies have been desired.

On the other hand, as a styrene polymer, a syndiotactic styrene polymer (sPS) which can be obtained by a polymerization reaction using a metallocene complex has been industrially produced, as well as an atactic styrene polymer which is referred to as a general grade polystyrene (GPPS), a high-impact resistant polystyrene (HIPS), or the like. Synthesis of sPS was announced by Idemitsu Kosan Co., Ltd. in 1986, and performed by using a catalyst system which includes a titanium metallocene complex (see, for example, Non-patent document 4). As the catalyst system, $CpTiX_3/MAO$ or $CpTiR_3/B(C_6F_5)_3$ (Cp represents a substituted or unsubstituted cyclopentdienyl or indenyl, X represents a halide or alkoxy, R represents an alkyl, and MAO represents methylaminoxane) or the like is mainly used.

The thus-synthesized sPS is characterized by having a slightly broad molecular weight distribution irrespective of high syndiotacticity (see, for example, Patent-Documents 2 and 3). Therefore, sPS with a narrower molecular weight distribution has been a compound of interest.

sPS is a polymer which has a high melting point of about 270° C., and advantages such as suitable crystallinity, excellent heat resistance, chemical resistance, and dimension stability, and thus is widely used in industry. Meanwhile, however, it is pointed out that sPS is difficult to be formed or the like.

On the other hand, some reports have been made for synthesis of an ethylene-styrene copolymer (see Non-patent document 5). Each of ethylene-styrene copolymers in those reports is a copolymer having no regio selectivity or a copolymer having no stereoregularity regarding a chain of styrene structural units. Thus, an ethylene-styrene copolymer, which has regio selectivity and high stereoregularity (particularly syndiotacticity) with respect to styrene structural units, has been an interesting compound.

Further, there is reported a method of synthesizing an isoprene-styrene copolymer having styrene structural units with high syndiotacticity using a catalyst of $CpTiCl_3/MAO$ (Cp is cyclopentadienyl) (see Non-patent document 10). A catalyst activity in the polymerization reaction is insufficient, so additional improvement has been required. Moreover, many physical properties of the isoprene-styrene copolymer to be synthesized have remained unclarified.

In a polymer of a cyclic olefin, a movement of a polymer main chain of the cyclic olefin is restricted compared to a polymer of a non-cyclic olefin, so the polymer of a cyclic olefins is expected to have excellent heat resistance, strength, and elasticity modulus. In addition, the cyclic olefin has an expanding potential to be used as an optical material. However, the cyclic olefin compound generally has low polymerization activity because its molecule is bulky, so the number of an effective polymerization catalyst system is limited.

In contrast, there is reported a 1,3-cyclohexadiene polymer which is obtained by polymerizing 1,3-cyclohexadiene, that is one of cyclic olefins, by using a specific nickel catalyst (Non-patent document 7). The polymer is characterized by being a polymer obtained by 1,4-selective addition polymerization of 1,3-cyclohexadiene. Further, it is suggested that the polymer is cis-syndiotactic. However, no specific reports regarding syndiotacticity, molecular weight, and the like thereof have been made.

Further, there are few reports on a 1,3-cyclohexadiene copolymer, so a copolymer of 1,3-cyclohexadiene and another olefin is an interesting compound. As one of a few examples, there is reported a copolymer of 1,3-cyclohexadiene and styrene, which is obtained by anionic copolymerization using alkyl lithium. However, the copolymer has no site regularity and stereoregularity.

On the other hand, as a polymer of norbornenes which is one of cyclic olefins, there have been known an open-ring metathesis polymer, a copolymer of norbornenes and ethylene, and the like. Particularly, the copolymer of norbornenes and ethylene has excellent transparency and heat resistance, so the copolymer is expected to be developed as an optical material (see Non-patent document 8). The inventors of the present invention have thought that a copolymer (terpolymer) including norbornenes, ethylene, and an aromatic component has physical properties (for example, UV blocking properties) equal to or superior to those of a copolymer of norbornenes and ethylene, and have made a study of production of the terpolymer.

Further, dicyclopentadiene as one of norbornenes has a C=C double bond derived from a norbornene structure and a C=C bond derived from cyclopentene. A copolymer of dicyclopentadiene and ethylene is also an interesting compound like norbornene. Recently, there has been reported that the copolymer of dicyclopentadiene and ethylene can be synthesized by using a specific Zr complex as a polymerization catalyst (Non-patent document 9). However, a copolymer of dicyclopentadiene and ethylene synthesized according to the reported method, has a limited molecular weight and content of dicyclopentadiene.

Patent Document 1: WO 00/18808
Patent Document 2: JP 62-104818 A
Patent Document 3: JP 62-187708 A
Non-patent document 1: Z. Hou et al., Organometallics, 22, 1171 (2004)
Non-patent document 2: J. Okuda et al., Angew. Chem. Int. Ed., 38, 227 (1999)
Non-patent document 3: K. Tanaka, M. Furo, E. Ihara, H. Yasuda, J. Polym. Sci. A: Polym. Chem. 39, 1382 (2001)
Non-patent document 4: N, Ishihara et al., Macromolecules, 19, 2464 (1986)
Non-patent document 5: Mc Knight, A. L.; Chem. Rev. 98, 2587, (1998)
Non-patent document 6: Z. Hou et al., J. Am. Chem. Soc., 126, 1312 (2004)
Non-patent document 7: S. Tanimura et al., Journal of Polymer Science: Part B: Polymer Physics, Vol. 39, 973-978 (2001)
Non-patent document 8: K. Nomura et al., Macromolecules, 36, 3797 (2003)
Non-patent document 9: Adriane G. Simanke et al., Journal of Polymer Science Part A: Polymer Chemistry, Vol. 40, 471-485 (2002)
Non-patent document 10: Pellecchia, C.; Proto, A.; Zambelli, A., Macromolecules, 25, 4450 (1992)

DISCLOSURE OF THE INVENTION

1. An object of the present invention is to provide a novel catalyst composition containing a metallocene complex. A further object of the present invention is to provide a production method of various kinds of polymer compounds using the catalyst composition. Preferably, a still further object of the present invention is to provide a production method of a novel polymer compound using the catalyst composition.

2. Meanwhile, the present invention provides a novel polymer compound. That is, an object of the present invention is to provide: (1) a styrene copolymer with a narrow average molecular weight distribution and high syndiotacticity; (2) an ethylene-styrene copolymer which has a high syndiotactic chain composed of styrene structural units; (3) a 1,3-cyclohexadiene polymer with high site regularity and stereoregularity; (4) a copolymer of 1,3-cyclohexadiene and another olefin monomer; and (5) a copolymer of another cyclic olefin.

That is, the present invention is as follows.

Firstly, the present invention is a polymerization catalyst composition shown below.

[1] A polymerization catalyst composition, comprising:
(1) a metallocene complex represented by the general formula (I), including:
a central metal M which is a group III metal atom or a lanthanoid metal atom;
a ligand Cp* bound to the central metal and including a substituted or unsubstituted cyclopentadienyl derivative;
monoanionic ligands $Q^1$ and $Q^2$; and
w neutral Lewis base L; and
(2) an ionic compound composed of a non-ligand anion and a cation:

[Chem 2]

(I)

where w represents an integer of 0 to 3.

[2] The polymerization catalyst composition according to [1], wherein the central metal M contained in the metallocene complex is selected from the group consisting of Scandium (Sc), Gadolinium (Gd), Yttrium (Y), Holmium (Ho), Lutetium (Lu), Erbium (Er), Dysprosium (Dy), Terbium (Tb), and Thulium (Tm).

[3] The polymerization catalyst composition according to [1], wherein the ligand Cp* including a cyclopentadienyl derivative is a non-crosslinking type ligand.

[4] The polymerization catalyst composition according to [1], wherein the cyclopentadienyl derivative contained in the ligand Cp* in the metallocene complex is tetramethyl(trimethylsilyl)cyclopentadienyl or pentamethylcyclopentadienyl.

[5] The polymerization catalyst composition according to [1], wherein at least one of the monoanionic ligands $Q^1$ and $Q^2$ in the metallocene complex is a trimethylsilyl group.

[6] The polymerization catalyst composition according to [1], wherein the neutral Lewis base L in the metallocene complex is tetrahydrofran.

Secondary, the present invention is the polymerization catalyst composition used for the polymerization shown below in particular among the polymerization catalyst compositions indicated above.

[7] The polymerization catalyst composition according to any one of [1] to [6], which is used for an olefinmonomer polymerization.

[8] The polymerization catalyst composition according to [7], wherein the olefin monomer is selected from the group consisting of an unsubstituted styrene, a substituted styrene, ethylene, α-olefin, diene, and norbornenes.

[9] The polymerization catalyst composition according to any one of [1] to [6], which is used for copolymerization of two or more kinds of olefin monomers.

[10] The polymerization catalyst composition according to [9], wherein the two or more kinds of olefin monomers are selected from the group consisting of an unsubstituted styrene, a substituted styrene, ethylene, α-olefin, diene, and norbornenes.

Thirdly, the present invention is a polymer or a copolymer shown below.

[11] A high syndiotactic polymer of a substituted or unsubstituted styrene, having Mw/Mn as an index of a molecular weight distribution of 1.7 or less.

[12] The high syndiotactic polymer according to [11], wherein syndiotacticity is 80 rrrr % or more in terms of a pentad indication.

[13] A high syndiotactic copolymer of a substituted or unsubstituted styrene and a substituted styrene, having Mw/Mn as an index of a molecular weight distribution of 1.7 or less.

[14] The high syndiotactic copolymer according to [13], wherein the high syndiotactic copolymer has a syndiotacticity of 80 rrrr % or more in terms of a pentad indication.

[15] A high syndiotactic copolymer of ethylene and a substituted or unsubstituted styrene.

[16] The high syndiotactic copolymer according to [15], wherein:
the high syndiotactic copolymer is a random copolymer, and has a syndiotacticity of a chain composed of styrene structural units of 98 r % or more in terms of a diad indication.

[17] The high syndiotactic copolymer according to [15], wherein:
the high syndiotactic copolymer is a block copolymer, and has a syndiotacticity of a styrene block chain of 80 rrrr % or more in terms of a pentad indication.

[18] The high syndiotactic copolymer according to any one of [15] to [17], having Mw/Mn as an index of a molecular weight distribution of 1.3 or less.

[19] The high syndiotactic copolymer according to any one of [15] to [18], wherein a ratio of the styrene structural unit with respect to all the structural units is 5 to 99 mol %.

[20] A polymer of a 1,3-cyclohexadiene, which has a ratio of a 1,4-structural unit with respect to all the structural units of 90% or more, and has a high cis-syndiotacticity.

[21] The polymer according to [20], wherein the polymer has a cis-syndiotacticity of 70 rrrr % or more.

[22] A copolymer of 1,3-cyclohexadiene and a substituted or unsubstituted styrene, which has a ratio of a 1,4-structural unit with respect to all structural units in the 1,3-cyclohexadiene of 90% or more.

[23] The copolymer according to [22], which is a random copolymer and has a syndiotacticity of a chain composed of styrene structural units of 98 r % or more in terms of a diad indication.

[24] A copolymer of 1,3-cyclohexadiene and ethylene.

[25] The copolymer according to [24], wherein a ratio of a 1,4-structural unit with respect to all the structural units of the 1,3-cyclohexadiene is 90% or more.

[26] A copolymer of ethylene, norbornenes, and a substituted or unsubstituted styrene.

[27] The copolymer according to [26], wherein:
the copolymer is a random copolymer and has a syndiotacticity of a chain composed of styrene structural units of 98 r % or more in terms of a diad indication.

[28] A copolymer of dicyclopentadiene and ethylene, which has a number average molecular weight of 100,000 or more.

[29] The copolymer according to [28], wherein a ratio of a dicyclopentadiene structural unit with respect to all structural units is 10 mol % or more.

Fourthly, the present invention is a production method of polymer shown below.

[30] A production method of olefin copolymer, comprising: polymerizing an olefin monomer by using the polymerization catalyst composition according to any one of [1] to [6].

[31] The production method according to [30], wherein the olefin monomer is one selected from the group consisting of a substituted styrene, an unsubstituted styrene, ethylene, diene, norbornenes, and α-olefin.

[32] A production method of olefin copolymer, comprising:
polymerizing two or more kinds of the olefin monomers by using the polymerization catalyst composition according to any one of [1] to [6].

[33] The production method according to [32], wherein the two or more kinds of olefin monomers are selected from the group consisting of a substituted styrene, an unsubstituted styrene, ethylene, diene, norbornenes, and α-olefin.

[34] The production method according to [30], wherein:
the olefin polymer is a substituted or unsubstituted styrene polymer; and
the olefin monomer is a substituted or unsubstituted styrene.

[35] The production method according to [34], wherein the substituted or unsubstituted styrene polymer is a high syndiotactic polymer.

[36] The production method according to [34], wherein the substituted or unsubstituted styrene polymer is the styrene polymer according to [11] or [12].

[37] The production method according to [32], wherein:
the olefin copolymer is a styrene copolymer; and
the olefin monomers are two or more kinds of the styrenes selected from a substituted styrene and an unsubstituted styrene.

[38] The production method according to [37], wherein the styrene copolymer is a high syndiotactic copolymer.

[39] The production method according to [37], wherein the styrene copolymer is the styrene copolymer according to [13] or [14].

[40] The production method according to [32], wherein:
the olefin copolymer is a copolymer of ethylene and a substituted or unsubstituted styrene; and
the olefin monomers are ethylene and a substituted or unsubstituted styrene.

[41] The production method according to [40], wherein the copolymer of ethylene and a substituted or unsubstituted styrene is the copolymer of ethylene and the substituted or unsubstituted styrene according to any one of [15] to [19].

[42] The production method according to [30], wherein:
the olefin polymer is a 1,3-cyclohexadiene polymer; and
the olefin monomer is 1,3-cyclohexadiene.

[43] The production method according to [42], wherein the 1,3-cyclohexadiene polymer is the 1,3-cyclohexadiene polymer according to [20] or [21].

[44] The production method according to [32], wherein:
the olefin copolymer is a copolymer of 1,3-cyclohexadiene and a substituted or unsubstituted styrene; and
the olefin monomers are 1,3-cyclohexadiene and a substituted or unsubstituted styrene.

[45] The production method according to [44], wherein the copolymer of 1,3-cyclohexadiene and a substituted or unsubstituted styrene is the copolymer according to [22] or [23].

[46] The production method according to [32], wherein:
the olefin copolymer is a copolymer of 1,3-cyclohexadiene and ethylene; and
the olefin monomers are 1,3-cyclohexadiene and ethylene.

[47] The production method according to [46], wherein the copolymer of 1,3-cyclohexadiene and ethylene is the copolymer according to [24] or [25].

[48] The production method according to [32], wherein:
the olefin copolymer is a copolymer of ethylene, norbornenes, and a substituted or unsubstituted styrene; and
the olefin monomers are ethylene, norbornenes, and a substituted or unsubstituted styrene.

[49] The production method according to [48], wherein the copolymer is the copolymer according to [26] or [27].

[50] The production method according to [32], wherein:
the olefin copolymer is a copolymer of dicyclopentadiene and ethylene; and
the olefin monomers are dicyclopentadiene and ethylene.

[51] The production method according to [50], wherein the copolymer of dicyclopentadiene and ethylene is the copolymer according to [28] or [29].

[52] The production method according to [32], wherein:
the olefin copolymer is a copolymer of a substituted or unsubstituted styrene and a conjugated diene; and
the olefin monomers are a substituted or unsubstituted styrene and a conjugated diene.

Use of the catalyst composition of the present invention provides a novel polymerization reaction and a novel production method of a polymer compound.

Further, a syndiotactic styrene polymer with a narrow molecular weight distribution, which is one of polymer compounds produced by using the catalyst composition of the present invention, has additionally high quality while retaining original characteristics as sPS, whereby the syndiotactic styrene polymer may be used as high-performance sPS.

Furthermore, an ethylene-styrene copolymer which is one of polymer compounds synthesized by using the catalyst composition of the present invention and which has a high syndiotactic chain composed of styrene structural units, has additionally high processibility while retaining original characteristics of sPS, whereby the ethylene-styrene copolymer is expected for a wide application compared to conventional sPS.

On the other hand, each of various cyclicolefin polymers (copolymers), which is one of polymer compounds produced by using the catalyst compound of the present invention, is expected for a wide application, for example, as an optical material.

Figure 1:
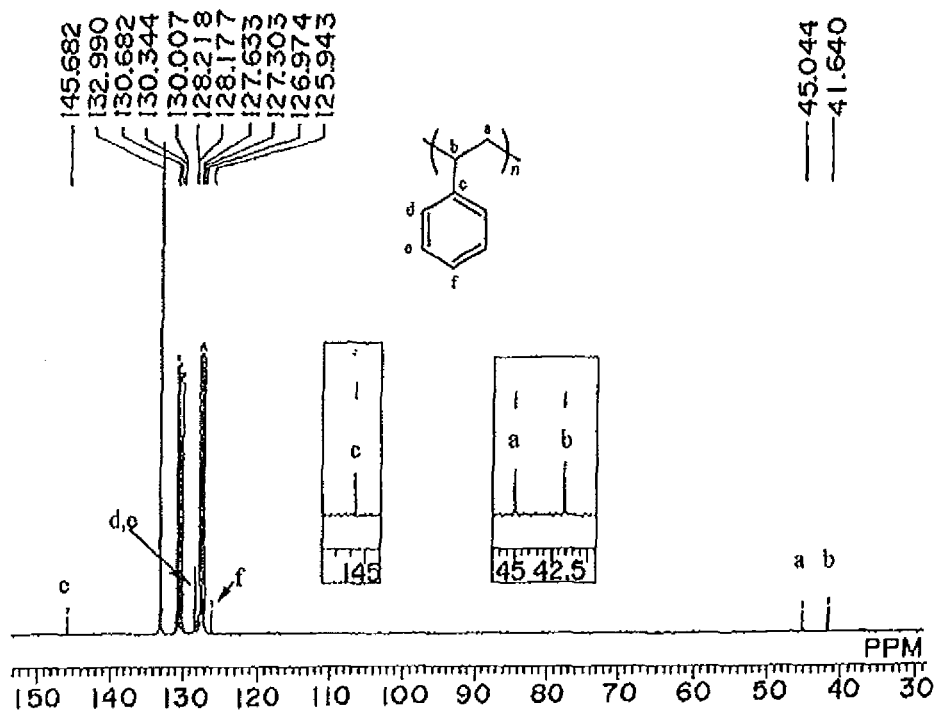
FIG. 1 is a $^{13}$C-NMR spectrum chart of a styrene polymer of the present invention.

BEST MODE FOR CARRYING OUT THE INVENTION (Catalyst Composition of the Present Invention)
A catalyst composition of the present invention is characterized by containing a metallocene complex and an ionic compound. In addition, the catalyst composition of the present invention may contain other arbitrary components.

1. Metallocene Complex Contained in the Catalyst Composition of the Present Invention A metallocene complex (hereinafter, also referred to as "metallocene complex to be used in the present invention") contained in the catalyst composition of the present invention is a complex represented by the following general formula (I). The complex is preferably a half metallocene complex.

[Chem 3]

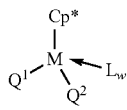
(I)

In the general formula (I), M represents a central metal in the metallocene complex. The central metal M is a metal which belongs to a group III metal or a lanthanoid metal, but is not particularly limited. A metallocene complex to be used in the present invention can be used as one component of a polymerization catalyst composition, so the central metal M may be suitably selected depending on the type of monomer to be subjected to polymerization, and the like.

In the case of polymerization of ethylene, for example, any of group III metals or lanthanoid metals may be used, and, for example, any of Scandium (Sc), Gadolinium (Gd), Yttrium (Y), Holmium (Ho), Lutetium (Lu), Erbium (Er), Dysprosium (Dy), Terbium (Tb), and Thulium (Tm) may be selected as shown in the following Examples.

In the case of polymerization of styrene, any of group III metals or lanthanoid metals may be used, and any of Sc, Gd, Y, and Lu may be selected as shown in the following Examples.

Cp* in the general formula (I) represents a ligand containing a cyclopentadienyl derivative, and binds to the central metal M with a H bond. The ligand is preferably a non-crosslinking type ligand. Here, the term "non-crosslinking type ligand" refers to a ligand which has a cyclopentadienyl derivative bound to the central metal M with a π bond and has no ligand atom or ligand group other than the cyclopentadienyl derivative.

Examples of the cyclopentadienyl derivative in Cp* include a cyclopendadienyl ring and a condensed ring containing cyclopentadienyl (which includes, but not limited to, an indenyl ring and a fluorenyl ring). The most preferable cyclopentadienyl derivative is a cyclopentadienyl ring.

A cyclopentadienyl ring is represented by the composition formula $C_5H_{5-x}R_x$. In the formula, x represents an integer of 0 to 5. Each of R's independently represents a hydrocarbyl group, a substituted hydrocarbyl group, or a metalloid group which is substituted by a hydrocarbyl group.

The hydrocarbyl group is preferably a hydrocarbyl group having 1 to 20 carbon atoms, more preferably a C1-20 (preferably C1-10, more preferably C1-6)alkyl group, phenyl group, benzyl group, or the like, and most preferably a methyl group.

A hydrocarbyl group in the substituted hydrocarbyl group is the same as the above-mentioned hydrocarbyl group. The term "substituted hydrocarbyl group" refers to a hydrocarbyl group in which at least one hydrogen atom is substituted by any of a halogen atom, an amide group, a phosphide group, an alkoxy group, an aryloxy group, and the like.

Examples of a metalloid in the metalloid group which is substituted by a hydrocarbyl group include Germyl (Ge), Stanyl (Sn), and Silyl (Si). Further, a hydrocarbyl group as a substituent in a metalloid group is the same as the above-mentioned hydrocarbyl group. The number of hydrocarbyl group for substitution is determined depending on the type of metalloid (in the case of a silyl group, for example, the number of hydrocarbyl group for substitution is 3).

At least one of R's in the cyclopentadienyl ring is preferably a metalloid group (more preferably a silyl group) which has a hydrocarbyl group as a substituent, and more preferably a trimethylsilyl group.

Specific examples of preferable cyclopentadienyl ring include, but not limited to, compounds represented by the following formulae.

[Chem 4]

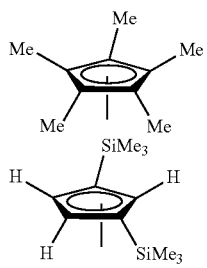
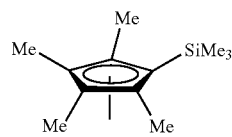

The cyclopentadienyl derivative in the ligand Cp* may be any of an indenyl ring (composition formula: $C_9H_{7-x}R_x$), a tetrahydroindenyl ring (composition formula: $C_9H_{11-x}R_x$), and the like. Here, R represents the same R as in the above-mentioned cyclopentadienyl ring, and X represents an integer of 0 to 7 or 0 to 11.

The cyclopentadienyl derivative in the ligand Cp* may be any of a fluorenyl ring (composition formula: $C_{13}H_{9-x}R_x$), an octafluorenyl ring (composition formula: $C_{13}H_{17-x}R_x$), and the like. Here, R represents the same R as in the above-mentioned cyclopentadienyl ring, and X represents an integer of 0 to 9 or 0 to 17.

In a complex represented by the general formula (I), which is to be used in the present invention, $Q^1$ and $Q^2$ are monoanionic ligands identical to or different from each other. Examples of the monoanionic ligand include, but not limited to, 1) a hydrido, 2) a halide, 3) a substituted or unsubstituted hydrocarbyl group having 1 to 20 carbon atoms, 4) an alkoxy group or aryloxy group, 5) an amide group, and 6) a phosphino group.

Further, $Q^1$ and $Q^2$ may be bound to each other, or form a so-called dianionic ligand in combination. Examples of the dianionic ligand include alkylidene, diene, a cyclometalled hydrocarbyl group, and a bidentate chelate ligand.

The halide may be any of the chloride, bromide, fluoride, and iodide.

Preferable examples of the hydrocarbyl group having 1 to 20 carbon atoms include: an alkyl group such as a methyl group, an ethyl group, a propyl group, a butyl group, an amyl group, an isoamyl group, a hexyl group, an isobutyl group, a heptyl group, an octyl group, a nonyl group, a decyl group, a cetyl group, or a 2-ethylhexyl group; a unsubstituted hydrocarbyl group such as a phenyl group or a benzyl group; and a substituted hydrocarbyl group such as a substituted benzyl group, a trialkylsilylmethyl group, or a bis(trialkylsilyl)methyl group. Preferable examples of the hydrocarbyl group include a substituted or unsubstituted benzyl group and a trialkylsilylmethyl group. More preferable examples of the hydrocarbyl group include an ortho-dimethylaminobenzyl group or trimethylsilylmethyl group.

Preferable examples of the alkoxy group or aryloxy group include a methoxy group or a substituted or unsubstituted phenoxy group.

Preferable examples of the amide group include a dimethylamide group, a diethylamide group, a methylethylamide group, a di-t-butylamide group, a diisopropylamide group, and an unsubstituted or substituted diphenylamide group.

Preferable examples of the phosphino group include a diphenylphosphino group, a dicyclohexylphosphino group, a diethylphosphino group, and a dimethylphosphino group.

Preferable examples of the alkylidene include methylidene, ethylidene, and propylidene.

Preferable examples of the cyclometalled hydrocarbyl group include propylene, butylene, pentylene, hexylene, and octylene.

Preferable examples of the diene include 1,3-butadiene, 1,3-pentadiene, 1,4-pentadiene, 1,3-hexadiene, 1,4-hexadiene, 1,5-hexadiene, 2,4-dimethyl-1,3-pentadiene, 2-methyl-1,3-hexadiene, and 2,4-hexadiene.

In the complex represented by the general formula (I), which is to be used in the present invention, L represents a neutral Lewis base. Examples of the neutral Lewis base include tetrahydrofran, diethylether, dimethylaniline, trimethylphosphine, and lithium chloride.

Further, L may bind to $Q^1$ and/or $Q^2$ to form a so-called multidentate ligand.

w of $L_w$ in the general formula (I) represents the number of neutral Lewis base L. w represents an integer of 0 to 3, preferably 0 to 1.

A metallocene complex to be used in the present invention may be synthesized according to a known method, for example, the method described in (1) Tardif, O.; Nishiura, M.; Hou, Z. M. Organometallics 22, 1171, (2003) or (2) Hultzsch, K. C.; Spaniol, T. P.; Okuda, J. Angew. Chem. Int. Ed, 38, 227, (1999).

Further, specific examples of production methods of those complex are described in the following reference examples.

2. Ionic Compound Contained in the Catalyst Composition of the Present Invention As described above, the catalyst composition of the present invention contains an ionic compound. Here, the term "ionic compound" includes an ionic compound composed of an coordinated anion and a cation. The ionic compound is combined with the metallocene complex and thus allows the metallocene complex to exert an activity as a polymerization catalyst. A possible mechanism may involve a reaction of an ionic compound with a metallocene complex to produce a cationic complex (active species).

An example of the uncoordinated anion which is a component of an ionic compound preferably includes a tetravalent boron anion. Examples of the tetravalent boron anion include tetra(phenyl)borate, tetrakis(monofluorophenyl)borate, tetrakis(difluorophenyl)borate, tetrakis(trifluorophenyl)borate, tetrakis(trifluorophenyl)borate, tetrakis(pentafluorophenyl)borate, tetrakis(tetrafluoromethylphenyl)borate, tetra(tolyl)borate, tetra(xylyl)borate, (tripheyl, pentafluorophenyl)borate, [tris(pentafluorophenyl), phenyl]borate, and tridecahydride-7,8-dicarbaundecaborate.

Of those uncoordinated anions, tetrakis(pentafluorophenyl)borate is preferable.

Examples of the cation which is a component of an ionic compound include a carbonium cation, an oxonium cation, an ammonium cation, a phosphonium cation, a cycloheptatrienyl cation, and a ferrocenium cation having a transition metal.

A specific example of the carbonium cation includes a trisubstituted carbonium cation such as a triphenylcarbonium cation or a tri-substituted phenylcarbonium cation. Specific examples of the tri-substituted phenylcarbonium cation include a tri(methylphenyl)carbonium cation and a tri(dimethylphenyl)carbonium cation.

Specific examples of the ammonium cation include: a trialkylammonium cation such as trimethylammonium cation, a triethylammonium cation, a tripropylammounium cation, a tributylammonium cation, or tri(n-butyl)ammonium cation; an N,N-dialkylanilinium cation such as an N,N-dimethylanilinium cation, an N,N-diethylanilinium cation, or an N,N-2,4,6-pentamethylanilinium cation; and a dialkylammonium cation such as a di(isopropyl)ammonium cation or a dicyclohexylammonium cation.

A specific example of the phosphonium cation includes a triarylphosphonium cation such as a triphenylphosphonium cation, a tri(methylphenyl)phosphonium cation, or a tri(dimethylphenyl)phosphonium cation.

Of those cations, anilinium cation or carbonium cation is preferable, and a triphenylcarbonium cation is more preferable.

That is, the ionic compound contained in the catalyst composition of the present invention may be a compound obtained by combining a coordinated anion and a cation, each of which is selected from the above-mentioned coordinated anions and cations, respectively.

Preferable examples of the ionic compound include triphenylcarbonium tetrakis(pentafluorophenyl)borate, triphenylcarbonium tetrakis(tetrafluorophenyl)borate, N,N-dimethylanilinium tetrakis(pentafluorophenyl)borate, and 1,1'-dimethylferroceniumtetrakis(pentafluorophenyl)borate. One kind of the ionic compound may be used, or two or more kinds of them can be used in combination.

Of those ionic compounds, an example of a particularly preferable ionic compound includes triphenylcarbonium tetrakis(pentafluorophenyl)borate.

Further, for example, $B(C_6F_5)_3$ or $Al(C_6F_5)_3$, which is a Lewis acid capable of producing a cationic metal transition compound by reaction with a transition metal compound, may be used as an ionic compound, and any of those compounds may be used in combination with any of the above-mentioned ionic compounds.

In addition, a combination of an alkylaluminum compound (e.g., aluminoxane, or preferably MAO or MMAO) or an alkylaluminum compound and a borate compound may be used as an ionic compound, and such an ionic compound may be used in combination with another ionic compound. In particular, when a monoanionic ligand Q of the above-mentioned complex represented by the general formula (I) to be used in the present invention is other than an alkyl and a hydrido (for example, the ligand is a halogen), it is thought to be preferable to use a combination of an alkylaluminum compound or an alkylaluminum compound and a borate compound.

3. Other Arbitrary Components Contained in the Catalyst Composition of the Present Invention The catalyst composition of the present invention may contain other arbitrary components in addition to the metallocene complex and the ionic compound. Examples of the arbitrary components include an alkylaluminum compound, a silane compound, and hydrogen.

An example of the alkylaluminum compound includes an organic aluminum compound which is generally used with a metallocene polymerization catalyst and referred to as "aluminoxane (almoxane)".

An example of the organic aluminum compound includes methylalminoxane (MAO).

An example of the silane compound includes phenylsilane.

4. Catalyst Composition of the Present Invention

As described above, the catalyst composition of the present invention is characterized by containing the above-mentioned metallocene compound and ionic compound. In the catalyst composition of the present invention, a molar ratio of the ionic compound to the metallocene compound varies depending on the types of the complex and the ionic compound.

For example, in the case where the ionic compound is composed of carbonium cations and borate anions (for example, the ionic compound is [$Ph_3C$][$B(C_6F_5)_4$]), the above-mentioned molar ratio is preferably 0.5 to 1, and in the case of MAO or the like, the molar ratio is preferably about 300 to 4,000.

It is thought that an ionic compound ionizes, specifically, cationizes a metallocene complex to make the metallocene complex be a catalyst active species. Therefore, if the ionic compound has the ratio not more than that described above, the compound is unable to sufficiently activate the metallocene complex.

On the other hand, if an ionic compound composed of carbonium ions and borate anions exists in an excess amount, there is a fear that the compound may react with a monomer which is to be subjected to a polymerization reaction.

In general, Lewis acid L is thought to inhibit coordination of olefin monomer to an active center, so a complex represented by the general formula (I) in which w is 0 may be referred to as a preferable complex to be used in the present invention.

The catalyst composition of the present invention may be used as a polymerization catalyst composition (particularly an addition polymerization catalyst composition).

For example, the catalyst composition can be used as a polymerization catalyst composition by 1) providing a composition including respective components (such as a metallocene complex and an ionic compound) into a polymerization reaction system or 2) providing respective components separately to the polymerization reaction system to compose a composition in the reaction system.

In the item 1), the phrase "providing a composition" includes providing a metallocene complex (active species) which has been activated by a reaction with an ionic compound.

As described above, the catalyst composition of the present invention may be used as a polymerization catalyst composition in polymerization reactions of various kinds of monomers. Examples of the polymerization reaction on which the catalyst composition of the present invention may have an effect as a catalyst, include a polymerization reaction of arbitrary monomer compound which is known to have an addition polymerization activity. Specific examples of the polymerization reaction include polymerization reactions of an olefin-based monomer, an epoxy-based monomer, an isocyanate-based monomer, a lactone-based monomer, a lactide-based monomer, a cyclic carbonate-based monomer, and an alkyne-based monomer, respectively. Specific examples of the polymerization reaction preferably include a polymerization reaction of an olefin-based monomer, and particularly preferably polymerization reactions of α-olefin, styrene, ethylene, diene, and cyclic olefins (including norbornenes such as 2-norbornene and dicyclopentadiene, and cyclohexadiene), respectively.

Here, an example of the diene that is an olefin-based monomer includes a cyclic diene such as 1,3-butadiene, 1,3-pentadiene, 1,4-pentadiene, 1,3-hexadiene, 1,4-hexadiene, 1,5-hexadiene, 2,4-dimethyl-1,3-pentadiene, 2-methyl-1,3-hexadiene, 2,4-hexadiene, or cyclohexadiene.

Further, the polymerization catalyst composition of the present invention can be used as a polymerization catalyst composition in a copolymerization reaction as well as a homopolymerization reaction. A monomer to be subjected to copolymerization may at least be capable of addition polymerization. Two or more olefin monomers are preferably used, and particularly preferably two or more of monomers selected from the group consisting of an α-olefin, a substituted or unsubstituted styrene, ethylene, diene, and a cyclic olefin are used.

(Polymer Compound of the Present Invention)

An embodiment of the polymer compound of the present invention is a high syndiotactic polymer of a substituted or unsubstituted styrene, or a high syndiotactic copolymer of two or more kinds of styrene selected from the group consisting of a substituted or unsubstituted styrene, which is characterized by having a narrow molecular weight distribution (hereinafter, they may be referred to as "styrene polymer of the present invention" and "styrene copolymer of the present invention", respectively, and both of them may be referred to as "styrene polymer (copolymer) of the present invention", collectively).

An embodiment of the polymer compound of the present invention is an ethylene-styrene copolymer, which is characterized in that its chain composed of styrene structural units has high syndiotactic stereoregularity (hereinafter, also referred to as "ethylene-styrene copolymer of the present invention").

An embodiment of the polymer compound of the present invention is a 1,3-cyclohexadiene polymer, which is characterized by having a high ratio of 1,4-structural unit with respect to the total structural units and being a high cis-syndiotactic polymer (hereinafter, also referred to as "CHD polymer of the present invention").

An embodiment of the polymer compound of the present invention is a copolymer of 1,3-cyclohexadiene and another olefin. An example of the copolymer includes a copolymer of 1,3-cyclohexadiene and a substituted or unsubstituted styrene, which is characterized by having a high ratio of 1,4-structural unit with respect to the total structural units of 1,3-cyclohexadiene (hereinafter, also referred to as "CHD-ST copolymer of the present invention"). Another example of the polymer compound of the present invention includes a copolymer of 1,3-cyclohexadiene and ethylene (hereinafter, also referred to as "CHD-ET copolymer of the present invention").

An embodiment of the polymer compound of the present invention is a copolymer of norbornenes, ethylene, and a substituted or unsubstituted styrene (hereinafter, also referred to as "NBE-ET-ST copolymer of the present invention").

An embodiment of the polymer compound of the present invention is a copolymer of dicyclopentadiene and ethylene, which is characterized by having a specific molecular weight (hereinafter, also referred to as a "DCPD-ET copolymer of the present invention").

1. Styrene Polymer or Styrene Copolymer of the Present Invention

The styrene polymer or styrene copolymer (styrene polymer (copolymer)) of the present invention is a polymer including a styrene (with or without a substituent $(R)_n$ on the phenyl ring) repetitive unit, which is represented by the following formula (A). The repetitive unit represented by the formula (A) is generally repeated with a head to tail bond. The repetitive unit represented by the formula (A) in the styrene polymer (copolymer) of the present invention may be one kind (homo polymer) or two or more kinds (copolymer).

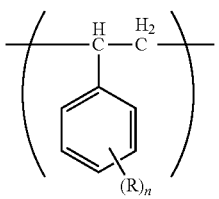

(A)

R on the phenyl ring in the formula (A) is an arbitrary substituent or atom. Examples of R include a halogen atom, an alkyl group having 1 to 4 carbon atoms, an alkoxy group having 1 to 4 carbon atoms, an alkylsilyl group, and a carboxyalkyl group.

A phenyl ring of a styrene structural unit in the styrene polymer (copolymer) of the present invention has R in a number denoted by n. n is preferably 0 to 3, and more preferably 0 or 1. The most preferable case is that n is 0 or that n is 1, and R binds to a phenyl ring carbon at para position with respect to the phenyl ring carbon binding to a polymer main chain.

Examples of the substituent or atom represented by $(R)_n$ include, but not limited to, the following ones.

1) analkylsuchas p-methyl, m-methyl, o-methyl, 2,4-dimethyl, 2,5-dimethyl, 3,4-dimethyl, 3,5-dimethyl, or p-tertiarybutyl;

2) a halogen such as p-chloro, m-chloro, o-chloro, p-bromo, m-bromo, o-bromo, p-fluoro, m-fluoro, o-fluoro, or o-methyl-p-fluoro;

3) a halogen-substituted alkyl such as p-chloromethyl, m-chloromethyl, or o-chloromethyl;

4) an alkoxy such as p-methoxy, m-methoxy, o-methoxy, p-ethoxy, m-ethoxy, or o-ethoxy;

5) a carboxyalkyl such as p-carboxymethyl, m-carboxymethyl, or o-carboxymethyl;

6) an alkylsilyl such as p-trimethylsilyl.

The styrene polymer (copolymer) of the present invention is a polymer with stereoregularity, and also is a high syndiotactic polymer. Here, the term "high syndiotactic" means that a ratio that phenyl rings in adjacent repetitive units represented by the formula (A) are alternately arranged with respect to the plane composed of a polymer main chain (the ratio is referred to as "syndiotacticity"), is high.

Syndiotacticity of the styrene polymer (copolymer) of the present invention is 80 rrrr % or higher in terms of a pentad indication (preferably 85 rrrr %, more preferably 90 rrrr %, particularly preferably 95 rrrr %, and most preferably 99 rrrr %). The syndiotacticity may be calculated from measurement data of NMR (particularly $^{13}$C-NMR) of the styrene polymer (copolymer) of the present invention. Specific description of the calculation is made in the Examples described below.

The styrene polymer (copolymer) of the present invention is characterized by having a narrow molecular weight distribution. Here, the term "molecular weight distribution" refers to a measurement value (Mw/Mn) obtained by a GPC method (where a measurement is performed by using polystyrene as a reference material and 1,2-dichlorobenzene as an eluate at 145° C.). The molecular weight distribution can be measured by using a GPC measurement device (TOSOH HLC 8121 GPC/HT), for example.

Here, the term "narrow molecular weight distribution" means that Mw/Mn is generally 1.7 or less, preferably 1.6 or less, more preferably 1.5 or less, and most preferably 1.4 or less.

A number average molecular weight of the styrene polymer (copolymer) of the present invention is arbitrary. A number average molecular weight of unsubstituted styrene polymer is preferably $0.4 \times 10^4$ or more, more preferably $8.5 \times 10^4$ or more, still more preferably $20.0 \times 10^4$ or more, and most preferably $25.0 \times 10^4$ or more.

A melting point of polystyrene of the present invention is generally 260° C. or higher. The melting point can be measured by a differential scanning calorimetry (DSC) method.

The styrene polymer (copolymer) of the present invention has characteristics similar to those of a conventionally known syndiotactic styrene polymer (copolymer) (sPS). That is, the styrene polymer (copolymer) of the present invention has characteristics such as a high melting point, heat resistance, chemical resistance, and dimension stability, and thus may be used as any of various kinds of engineer plastics. Further, the styrene polymer (copolymer) of the present invention is expected to be used as an engineer plastic having additional high-quality because of its physical properties, that is, a sharp molecular weight distribution.

2. Ethylene-Styrene Copolymer of the Present Invention

The ethylene-styrene copolymer of the present invention is a copolymer having a structural unit derived from styrene, which is represented by the following formula (A), and a structural unit derived from ethylene, which is represented by the formula (B). The structural unit represented by the formula (A) may be one kind or two or more kinds.

Here, R and n in the formula (A) are similar to R and n in the repetitive unit represented by the formula (A) described earlier in the part of the styrene polymer (copolymer), respectively.

[Chem 6]

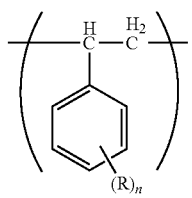

(A)

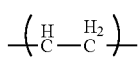

(B)

In the ethylene-styrene copolymer of the present invention, structural units represented by the formulae (A) and (B) may each be arranged in an arbitrary order. In other words, each of those structural units may be arranged in a random manner, or with a certain regularity (for example, structural units represented by the formulae (A) and (B) are arranged in an alternate manner, in a successive manner to some degree, or in other determined order). Therefore, the ethylene-styrene copolymer of the present invention may be any of a random copolymer, an alternate copolymer, a block copolymer, and other sequence-defined copolymer. The ethylene-styrene copolymer of the present invention is preferably a random copolymer or block copolymer.

The ethylene-styrene copolymer of the present invention is characterized by having stereoregularity. That is, when structural units in the copolymer, which are represented by the formula (A), are successive, the copolymer is characterized by having a high ratio (syndiotacticity) of phenyl rings in the repetitive structural units represented by the formula (A) alternately arranged with respect to the plane composed of a polymer main chain.

Here, the term "syndiotacticity of an ethylene-styrene copolymer, which is a random copolymer" refers to a ratio of diad (represented by r %) which is a syndiotactic sequence (sequence in which a phenyl group is arranged in an alternate manner with respect to a polymer main chain) among all of the two successive units (diad) of structural unit represented by the formula (A) in the copolymer.

The ethylene-styrene copolymer of the present invention, which is a random copolymer, has syndiotacticity of chain composed of structural units represented by the formula (A) of 60 r % or more, preferably 80 r % or more, and more preferably 98 r % or more in terms of a diad indication.

The syndiotacticity of the ethylene-styrene copolymer, which is a random copolymer, can be calculated from $^{13}$C-NMR spectrum. Specific description of the calculation is made in the Examples described below.

On the other hand, the term "syndiotacticity of an ethylene-styrene copolymer, which is a block copolymer" refers to a ratio of pentad (represented by rrrr %) which is a syndiotactic sequence (sequence in which a phenyl group is arranged in an alternate manner with respect to a polymer main chain) among all of the five successive units (pentad) in a styrene block chain (block chain in which a structural unit represented by the formula (A) is repetitive) in the copolymer.

The ethylene-styrene copolymer of the present invention, which is a block copolymer, has syndiotacticity of styrene block chain of 80 rrrr %, preferably 85 rrrr %, and more preferably 90 rrrr %, particularly preferably 95 rrrr %, and most preferably 99 rrr % or more in terms of a pentad indication.

The syndiotacticity of the ethylene-styrene copolymer, which is a block copolymer, can be determined in the same way as that of the above-mentioned styrene polymer (copolymer) of the present invention (that is, the syndiotacticity can be determined from NMR spectrum).

Contents of the structural unit represented by the formula (A) and the structural unit represented by the formula (B) which are present in the ethylene-styrene copolymer of the present invention are arbitrary. For example, of all structural units, a content of the structural unit represented by the formula (A) may be 5 to 99 mol % in a molar ratio.

When a content of the structural unit represented by the formula (A) increases, characteristics in which a sequence of the structural unit represented by the formula (A) (structural unit derived from styrene) has high stereoregularity (the sequence of high syndiotacticity), which is a characteristic of the ethylene-styrene copolymer of the present invention, may be effectively exerted. In other words, an increase in the content of the structural unit can provide the ethylene-styrene copolymer of the present invention with characteristics of a high syndiotactic polystyrene, such as heat resistance, chemical resistance, and dimension stability.

Meanwhile, the ethylene-styrene copolymer of the present invention includes a structural unit derived from ethylene and represented by the formula (B), so difficulties in forming, which have been involved in a conventional syndiotactic polystyrene, are reduced.

A molecular weight distribution of the ethylene-styrene copolymer of the present invention is arbitrary, but the copolymer may have a relatively narrow molecular weight distribution. Here, the term "molecular weight distribution" refers to a measurement value (Mw/Mn) obtained by a GPC method (where a measurement is performed by using polystyrene as a reference material and 1,2-dichlorobenzene as an eluate at 145° C.). The molecular weight distribution may be measured by using a GPC measurement device (TOSOH HLC 8121 GPC/HT), for example.

In general, the ethylene-styrene copolymer of the present invention has Mw/Mn, as an index of the molecular weight distribution, of 4.0 or less, preferably 2.0 or less, or more preferably 1.3 or less.

A number average molecular weight of the ethylene-styrene copolymer of the present invention is arbitrary. A number average molecular weight of ethylene-unsubstituted styrene copolymer is generally $1.0 \times 10^4$ or more, preferably $8.0 \times 10^4$ or more, or more preferably $50.0 \times 10^4$ or more.

A melting point of the ethylene-styrene copolymer of the present invention varies depending on the structure of structural unit derived from styrene, a ratio between the structural unit derived from styrene and the structural unit derived from ethylene, and the like. The ethylene-styrene copolymer of the present invention having a melting point of 200° C. or higher is expected to have characteristics similar to those of a conventionally known sPS, such as heat resistance, chemical resistance, and dimension stability. The melting point here is a melting point measured by a differential scanning calorimetry (DSC) method.

3. Conjugate Diene-Styrene Copolymer Produced by the Production Method of the Present Invention A conjugate diene-styrene copolymer produced by the production method of the present invention will be described by using an isoprene-styrene copolymer as an example. The isoprene-styrene copolymer produced by the production method of the present invention (hereinafter, referred to as "isoprene-styrene copolymer of the present invention") is a copolymer having a structural unit derived from styrene and represented by the following formula (A) and at least one kind of structural units derived from isoprene, which are represented by the formulae (C1) to (C4). The structural unit represented by the formula (A) may be one kind or two or more kinds. A major unit in the structural units derived from isoprene is a structural unit represented by (C1) (for example, a content of C1 is 60% or more of all structural units derived from isoprene)

[Chem 7]

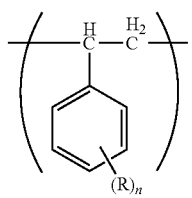

(A)

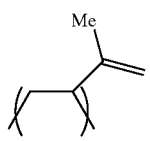

(C1)

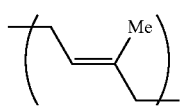

(C2)

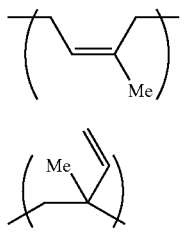

(C3)

(C4)

In the isoprene-styrene copolymer of the present invention, structural units represented by the formulae (A) and (C1) to (C4) may each be arranged in an arbitrary order. In other words, each of those structural units may be arranged in a random manner, or with a certain regularity. Therefore, the isoprene-styrene copolymer of the present invention may be any of a random copolymer, an alternate copolymer, a block copolymer, and other sequence-defined copolymer. The isoprene-styrene copolymer of the present invention is preferably a random copolymer or block copolymer, and more preferably a random copolymer.

The isoprene-styrene copolymer of the present invention preferably has stereoregularity. That is, it is preferable that when the structural units represented by the formula (A) in the copolymer are successive, a ratio (syndiotacticity) that phenyl rings in the successive structural units represented by the formula (A) alternately arranged with respect to the plane composed of a polymer main chain, is high.

On the other hand, tacticity of any of structural units represented by the formulae (C1) to (C4) is not particularly limited. For example, the tacticity is atactic.

Of all two successive units (diad) of structural unit represented by the formula (A) in the isoprene-styrene copolymer, which is a random copolymer, a ratio of diad (represented by r %) which is a syndiotactic sequence is 60 r % or more, preferably 80 r % or more, and more preferably 98 r % or more.

The syndiotacticity of the isoprene-styrene copolymer, which is a random copolymer, can be calculated from $^{13}$C-NMR spectrum.

Ratios of the structural unit represented by the formula (A) and the structural units represented by the formulae (C1) to (C4), all of which are present in the isoprene-styrene copolymer of the present invention, are arbitrary. For example, of all structural units, a molar ratio of the structural unit represented by the formula (A) may be 5 to 90 mol %.

A molecular weight distribution of the isoprene-styrene copolymer of the present invention is arbitrary. For example, the isoprene-styrene copolymer has Mw/Mn as an index of the molecular weight distribution of 1.8 or less, and preferably 1.2 or less. The molecular weight distribution is measured by the same method as the method used for measurement of the molecular weight distribution of the above-mentioned ethylene-styrene copolymer.

A number average molecular weight of the isoprene-styrene copolymer of the present invention is arbitrary. In the case of an isoprene-unsubstituted styrene copolymer, the number average molecular weight is generally 30,000 or more, and preferably 100,000 or more.

A melting point of the isoprene-styrene copolymer of the present invention varies depending on the structure of structural unit derived from styrene, ratios of the respective structural units, and the like, but the melting point is generally about 250° C.

3. 1,3-cyclohexadiene Polymer of the Present Invention

The 1,3-cyclohexadiene polymer (CHD polymer) of the present invention is characterized by having a high ratio of 1,4-structural unit with respect to all structural units therein. That is, as shown in the following formula, the CHD polymer may include a 1,4-structural unit and a 1,2-structural unit depending on the binding manner. The CHD polymer of the present invention is characterized by having a high ratio of the 1,4-structural unit with respect to all structural units therein. The term "high ratio of 1,4-structural unit" means that {the number of 1,4-structural unit/(the number of 1,4-structural unit+the number of 1,2-structural unit)} is 80% or more, preferably 90% or more, more preferably 95% or more, and still more preferably 99% or more.

[Chem 8]

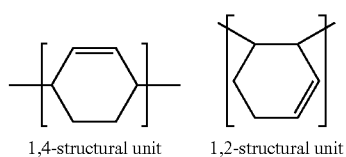

1,4-structural unit    1,2-structural unit

The ratio of 1,4-structural unit with respect to all structural units in the CHD polymer of the present invention can be determined from $^{13}$C-NMR spectrum data. That is, a peak of olefin carbon of 1,2-structure unit in the CHD polymer is observed at around 128 ppm while a peak of olefin carbon of 1,4-structural unit is observed at around 132 ppm (see FIG. 21). Thus, peak areas may be compared with each other to obtain the ratio of 1,4-structural unit.

The CHD polymer of the present invention is characterized by having a high ratio of 1,4-structural unit with respect to all structural units, and further, by being a polymer with stereoregularity and a high cis-syndiotactic polymer.

That is, two successive units (diad) of 1,4-structural unit generally present in a CHD polymer may be any of the following four geometric isomer. In contrast, the CHD polymer of the present invention is characterized by having a high ratio of cis-syndiotactic two successive units (the ratio is referred to as "cis-syndiotacticity") with respect to all two successive units of 1,4-structural unit therein.

[Chem 9]

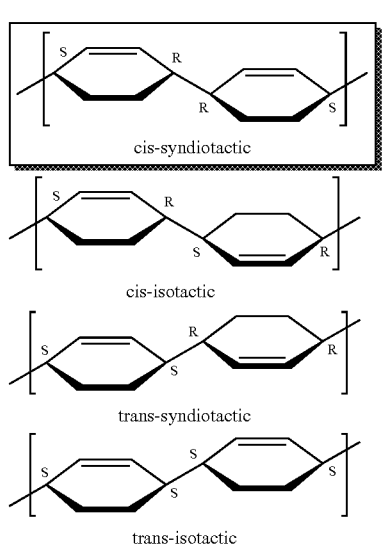

cis-syndiotactic cis-isotactic trans-syndiotactic trans-isotactic

Specifically, the cis-syndiotacticity of the CHD polymer of the present invention is generally 70 rrrr % or more, preferably 80 rrrr % or more, more preferably 90 rrrr % or more, and most preferably 99 rrrr % or more.

The cis-syndiotacticity of the CHD polymer of the present invention can be measured by analyzing $^{13}$C-NMR spectrum or an X-ray powder diffraction pattern.

Figure 6:
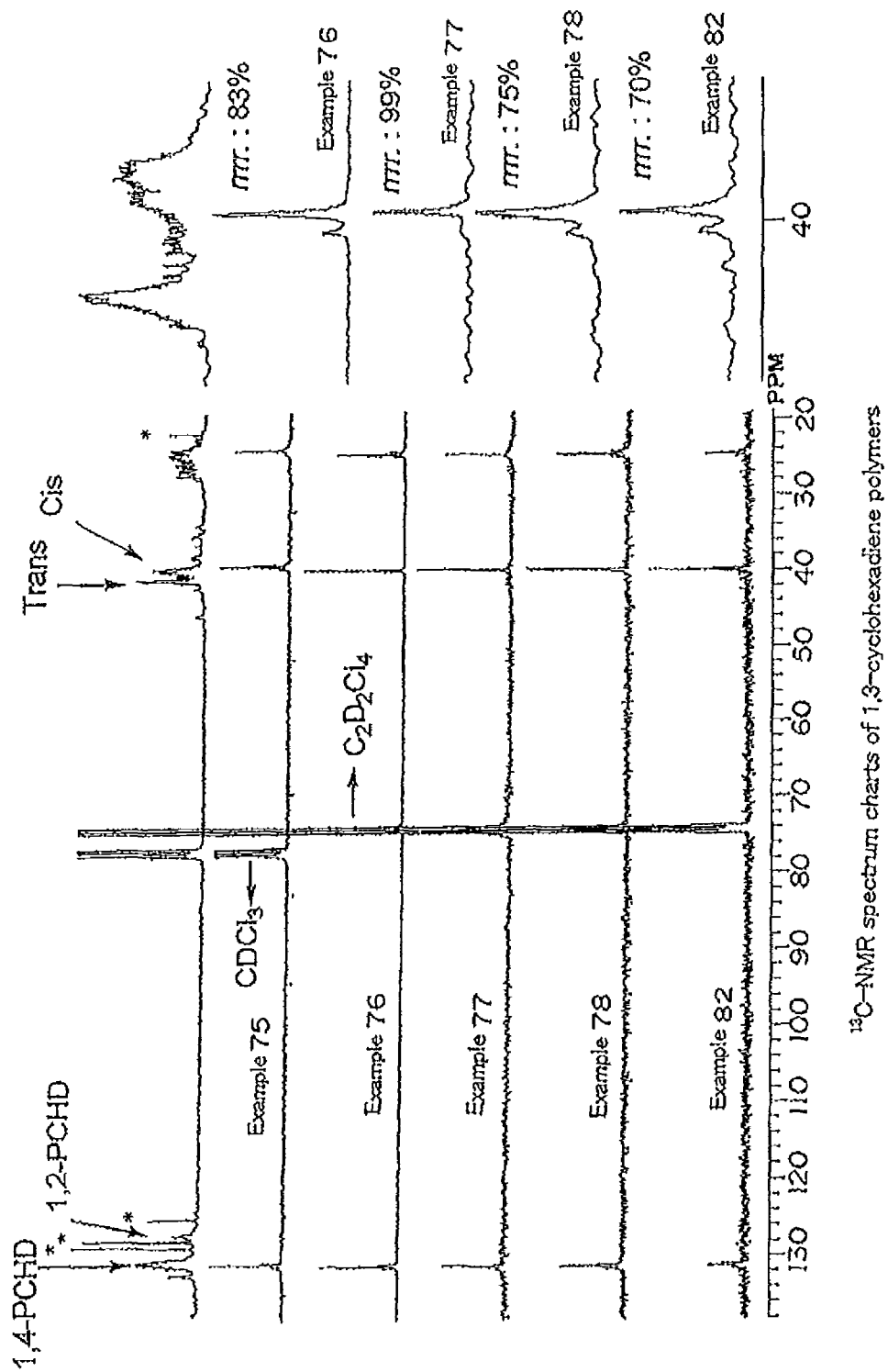
FIG. 6 shows $^{13}$C-NMR spectrum charts of 1,3-cyclohexadiene polymers, which were obtained in Examples 75, 76, 77, 78, and 82, respectively, and enlarged parts thereof (excluding Example 75).
Figure 21:
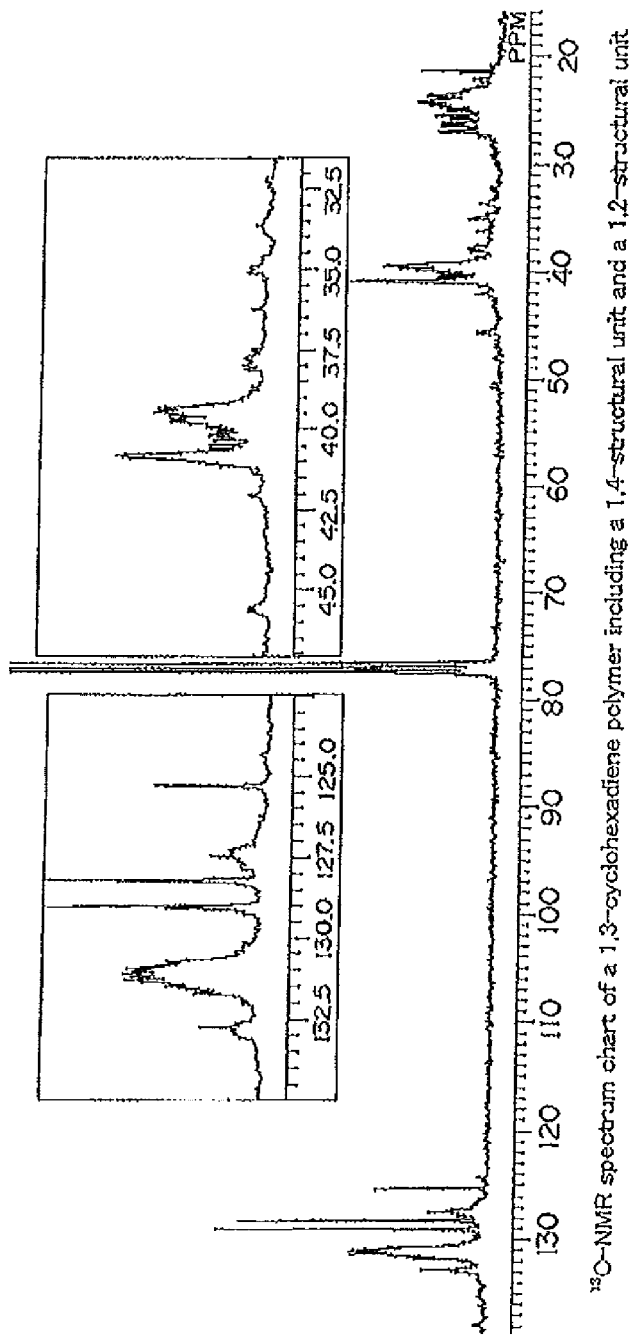
FIG. 21 is a $^{13}$C-NMR spectrum chart of a cyclohexadiene polymer, which includes a 1,4-structural unit and a 1,2-structural unit in a ratio of about 89:11.
Figure 22:
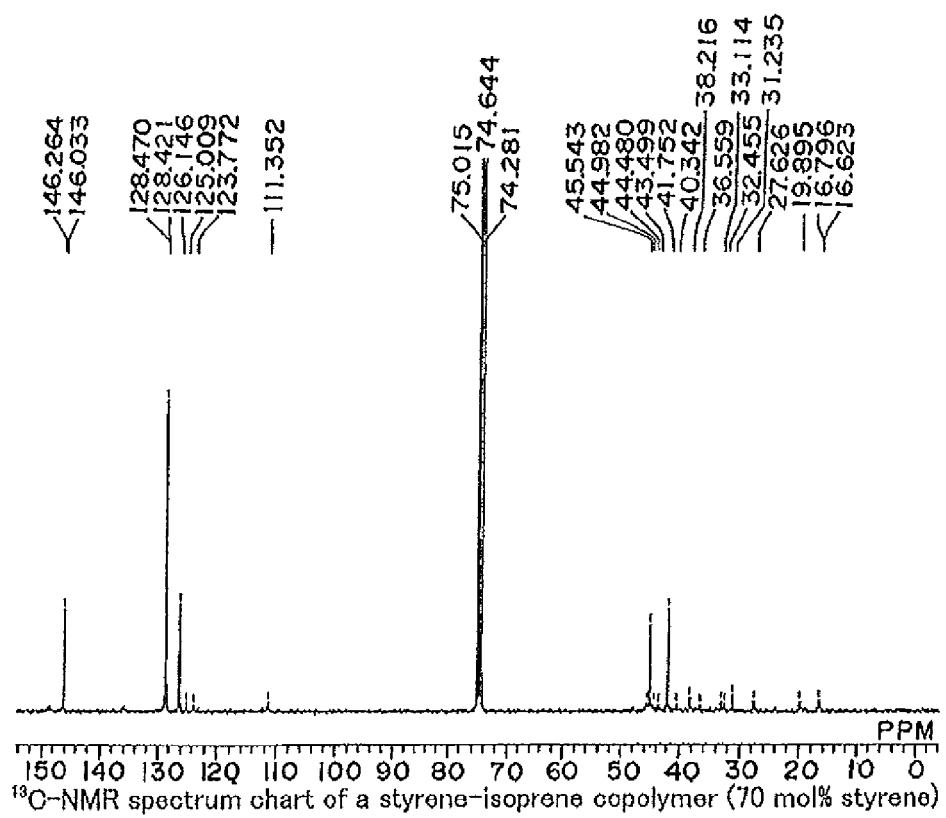
FIG. 22 is a $^{13}$C-NMR spectrum chart of a styrene-isoprene copolymer (70 mol % styrene).

As shown in the enlarged diagrams in FIG. 6 and FIG. 21, it is known that in the $^{13}$C-NMR spectrum of 1,3-cyclohexadiene polymer, a signal of tertiary carbon which links a 1,3-cyclohexadiene unit is observed as a multipeak at around 39 to 41 ppm. Further, a peak at around 40.7 ppm is thought to be an all-trans structure, and other peaks are thought to be all-cis or cis-trans structures (see Z. Sharaby et al., Macromolecules, 15, 1167-1173 (1982)).

Further, as described in Non-patent document 7 (Journal of Polymer Science: Part B: Polymer Physics, Vol. 39, 973-978 (2001)), X-ray powder diffraction patterns of powders of cis-syndiotactic polymer and cis-isotactic polymer are the same, with the cis-syndiotactic polymer having more stable structure than the cis-isotactic polymer. Therefore, it is thought that annealing of the cis-isotactic polymer results in a change in the structure and further change in a diffraction pattern, while annealing of the cis-syndiotactic polymer does not cause a change in the structure and further change in a diffraction pattern (those phenomena will be described in detail in Non-patent document 7).

Figure 7:
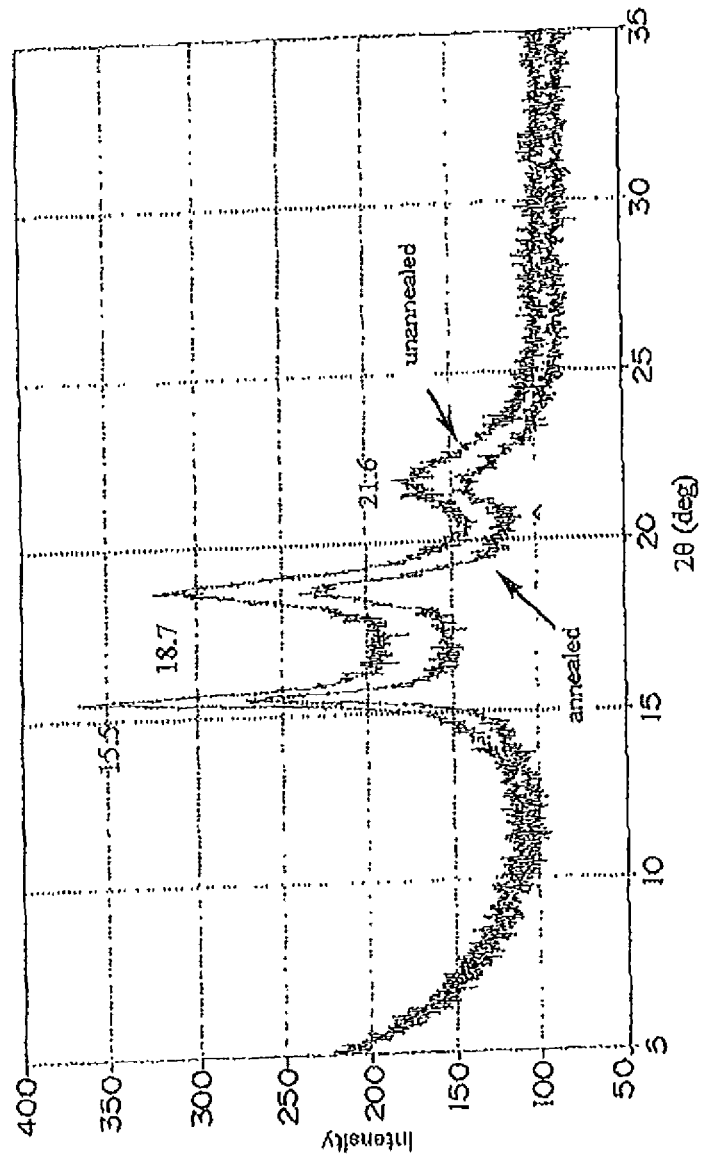
FIG. 7 is an X-ray powder diffraction pattern of the 1,3-cyclohexadiene polymer obtained in Example 77.

As shown in FIG. 7, in a powder of the CHD polymer (polymer obtained in Example 72) of the present invention, its X-ray powder diffraction pattern does not change before and after being subjected to annealing (at 227° C., under argon atmosphere, heating for 30 minutes).

In view of the foregoing, a peak at 39.9 ppm is attributed to rrrr (cis-syndiotactic), and a peak at 40.1 ppm is attributed to rr.

The cis-syndiotacticity of the CHD polymer of the present invention can be controlled by arbitrarily selecting the kind of ligand of a metallocene complex contained in a catalyst composition to be used in the production of the polymer (described later), kind of central metal, kinds of anion and cation of the ionic compound, reaction temperature, reaction solvent, and the like.

A molecular weight distribution of the CHD polymer of the present invention is not particularly limited. In general, the CHD polymer has Mw/Mn, as an index of the molecular weight distribution, of 2.6 or less, and preferably 2.0 or less.

Here, the term "molecular weight distribution" refers to a measurement value (Mw/Mn) obtained by a GPC method (where a measurement is performed by using polystyrene as a reference material and 1,2-dichlorobenzene as an eluate at 145° C.). The molecular weight distribution may be measured by using a GPC measurement device (TOSOH HLC 8121 GPC/HT), for example.

A molecular weight of the CHD polymer of the present invention is not particularly limited, but the number average molecular weight of the CHD polymer is preferably 7,000 or less. Further, a lower limit is not particularly limited, but is preferably 1,000 or more.

The number average molecular weight may be measured by the same GPC method as that used for the molecular weight distribution.

The CHD polymer of the present invention generally has a melting point. The temperature at the melting point is not particularly limited, but is generally about 220 to 250° C. The melting point here is a melting point measured by a differential scanning calorimetry (DSC) method.

4. Copolymer of 1,3-cyclohexadiene and Substituted or Unsubstituted Styrene (Chd-ST Copolymer) of the Present Invention The copolymer of 1,3-cyclohexadiene and substituted or unsubstituted styrene of the present invention is a polymer including a 1,3-cyclohexadiene structural unit and a styrene structural unit (preferably consisting of both of the units). Here, a content of the 1,3-cyclohexadiene structural unit in the CHD-ST copolymer of the present invention can be arbitrarily selected and controlled in a range of about 0 mol % to 100 mol %.

Figure 8:
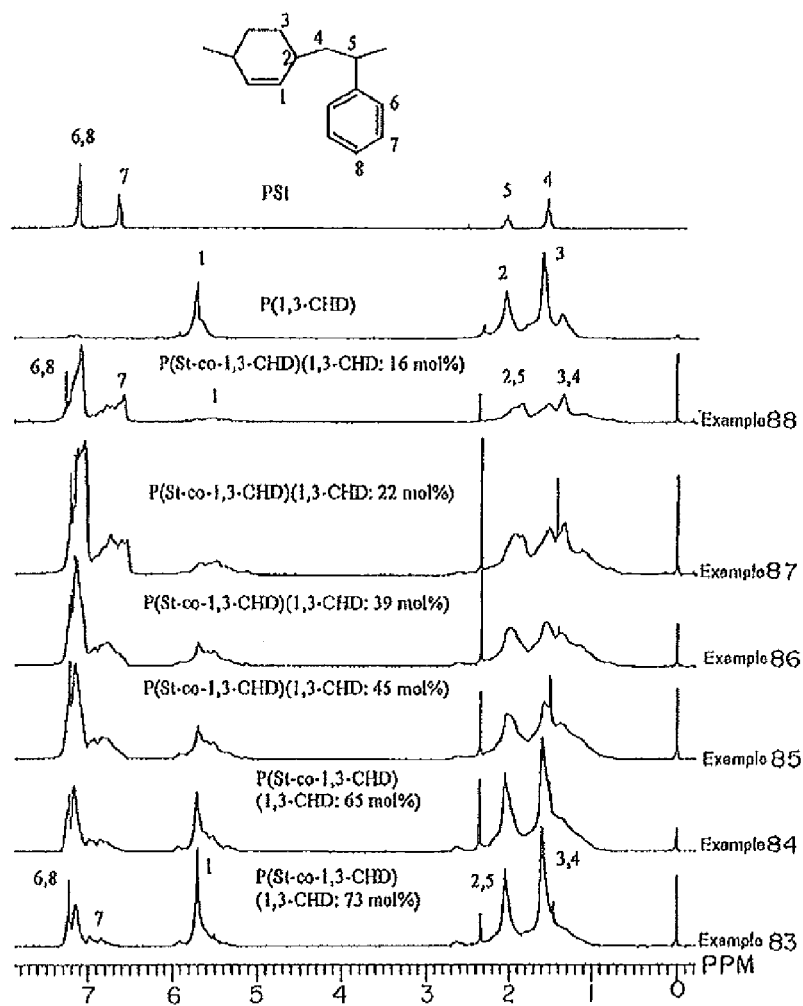
FIG. 8 shows $^{1}$H-NMR spectrum charts of copolymers of 1,3-cyclohexadiene and styrene, which were obtained in Examples 83 to 88, respectively.
Figure 9:
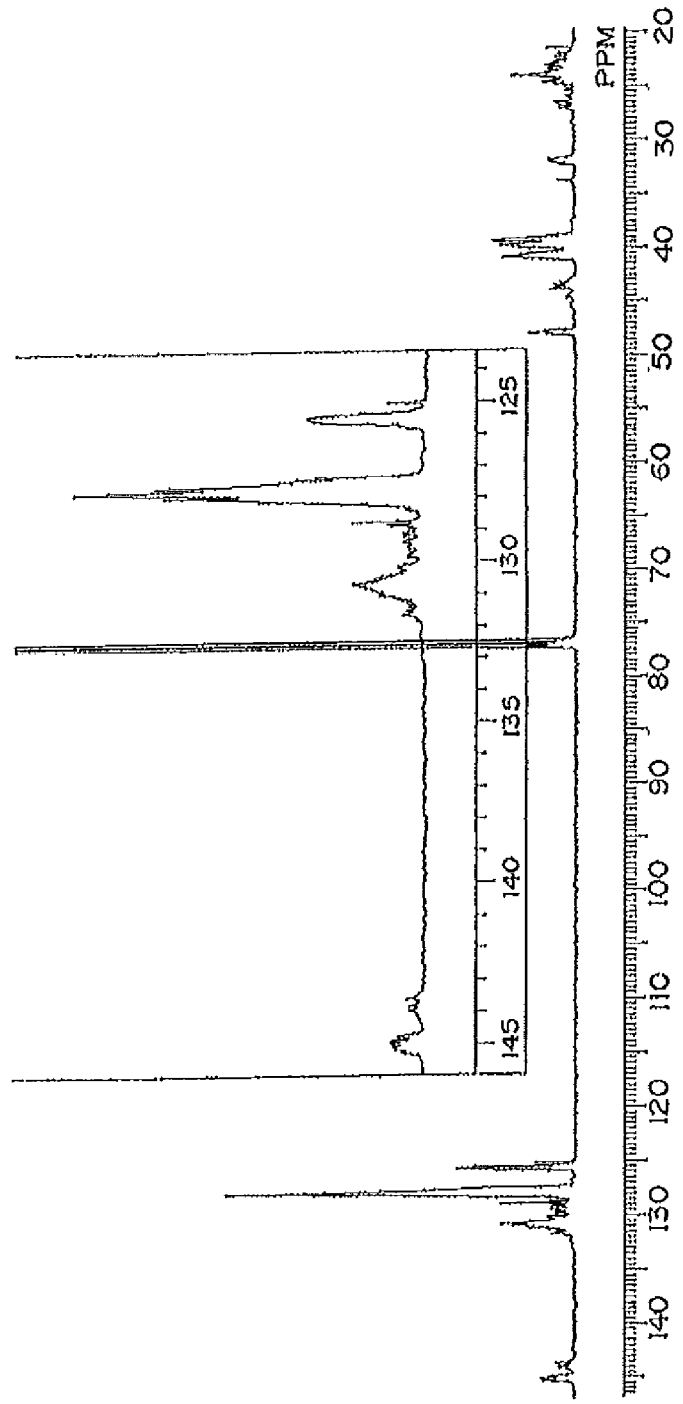
FIG. 9 is a $^{13}$C-NMR spectrum chart of the copolymer of 1,3-cyclohexadiene and styrene, which was obtained in Examples 85, and an enlarged parts thereof.
Figure 10:
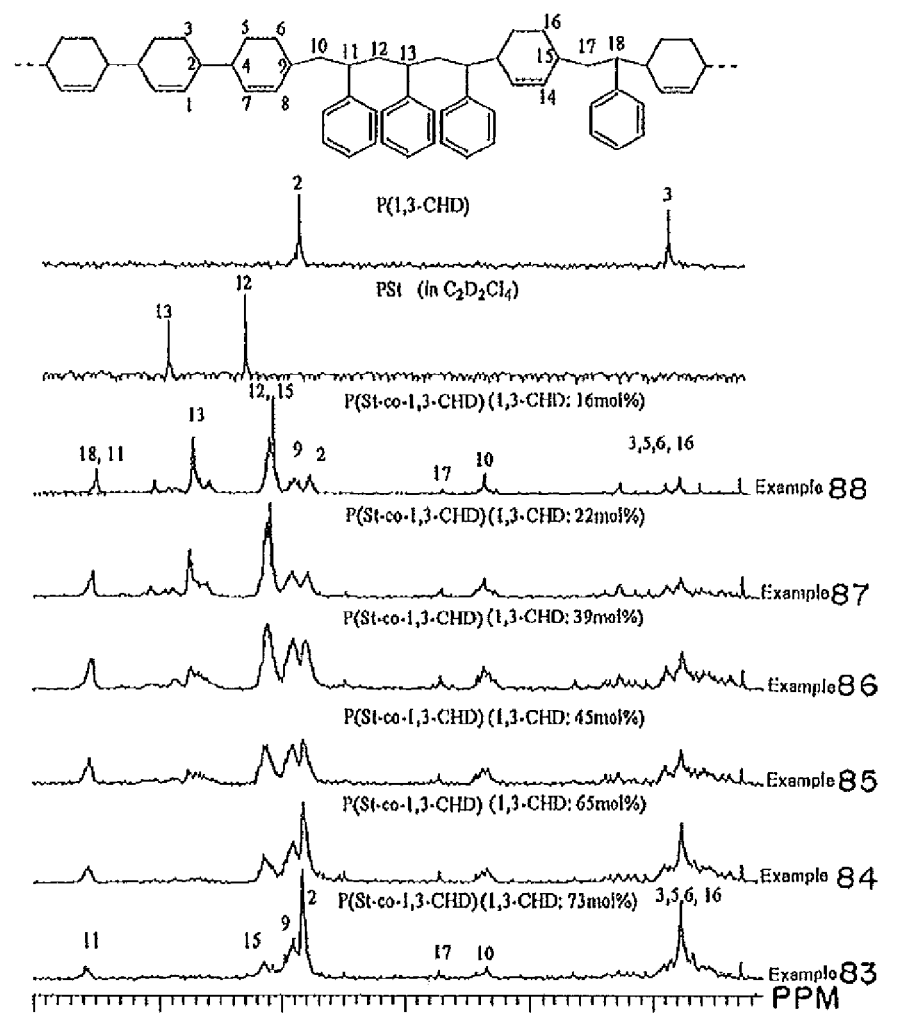
FIG. 10 shows $^{13}$C-NMR spectrum charts of the copolymers of 1,3-cyclohexadiene and styrene, which were obtained in Examples 83 to 88, respectively.
Figure 11:
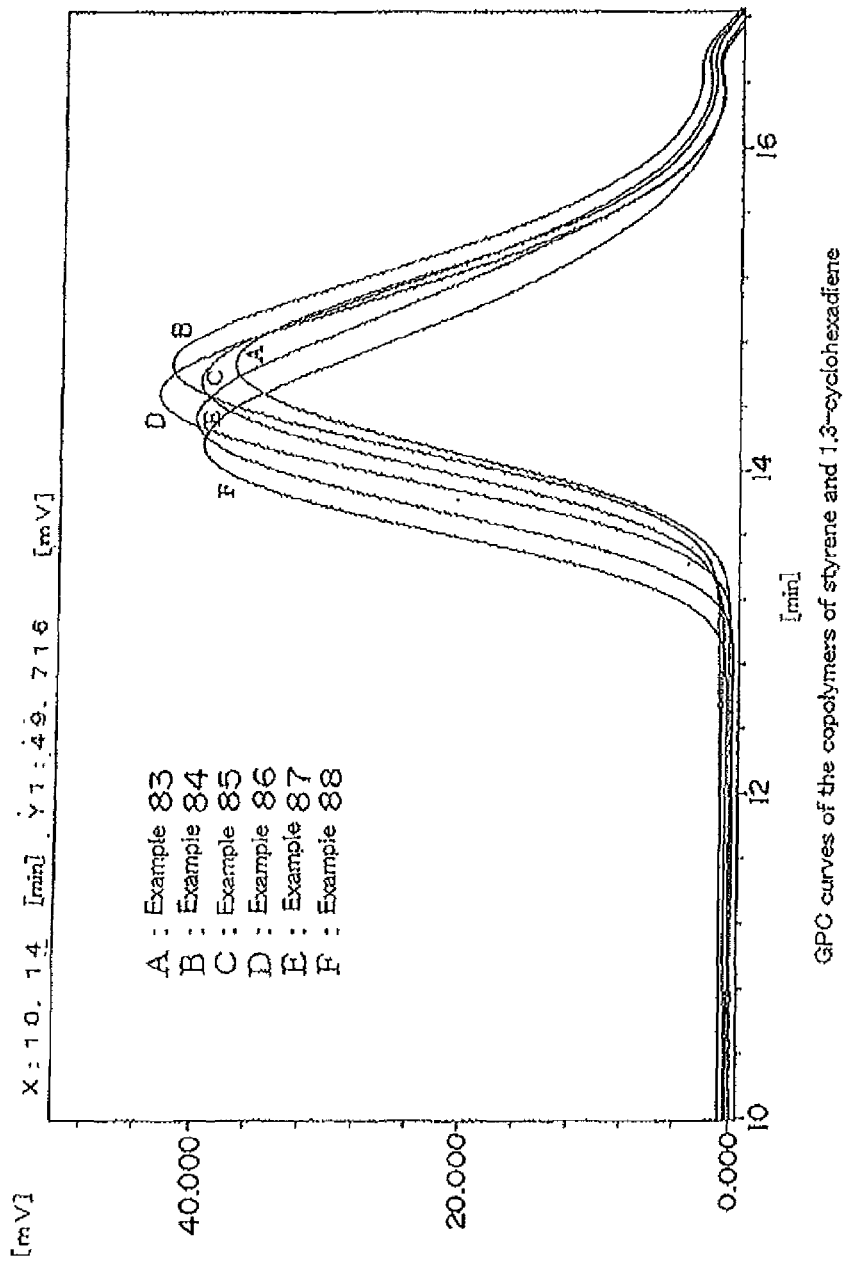
FIG. 11 is a graph showing GPC curves of the copolymers of 1,3-cyclohexadiene and styrene, which were obtained in Examples 83 to 88, respectively.

The content can be measured by means of $^1$H-NMR. For example, as shown in FIG. 8, a peak derived from olefin hydrogen of cyclohexadiene structural unit is observed at around 5.2 to 6.0 ppm, while a peak of aromatic hydrogen of styrene structural unit is observed at around 6.7 to 7.4 ppm. Thus, the content may be determined from the ratio between both of the peaks.

In production of a CHD-ST copolymer, the content may be controlled by adjusting ratios of the respective monomers as raw materials.

As described above, the CHD-ST copolymer of the present invention includes a 1,3-cyclohexadiene structural unit and a styrene structural unit, and both the structural units may be arranged in an arbitrary order. In other words, each of those structural units may be arranged in a random manner, or with a certain regularity (for example, both the structural units are arranged in an alternate manner, in a successive manner to some degree, or in other determined order). Therefore, the CHD-ST copolymer of the present invention may be any of a random copolymer, an alternate copolymer, a block copolymer, and other sequence-defined copolymer. The CHD-ST copolymer of the present invention is preferably a random copolymer or block copolymer, and more preferably a random copolymer.

The CHD-ST copolymer of the present invention is characterized by having a high ratio of a 1,4-structural unit with respect to all structural units of 1,3-cyclohexadiene which is contained in the copolymer. A ratio of the 1,4-structural unit is generally 80% or more, preferably 90% or more, more preferably 95% or more, and still more preferably 99% or more. The ratio of the 1,4-structural unit may be measured by the same method as the method used for measurement of 1,4-structural unit in the above-mentioned 1,3-cyclohexadiene polymer.

Further, a chain composed of 1,4-structural units of 1,3-cyclohexadiene, which is contained in the CHD-ST copolymer of the present invention, is preferably high cis-syndiotactic. Specifically, cis-syndiotacticity of two successive units of 1,4-structural unit of 1,3-cyclohexadiene is generally 50 r % or more, preferably 70 r % or more, and more preferably 90 r % or more. The cis-syndiotacticity can be measured by the same method as the method used for measurement of cis-syndiotacticity in the above-mentioned 1,3-cyclohexadiene polymer.

A styrene structural unit contained in the CHD-ST copolymer of the present invention is represented by the following formula (A). Here, substituents $(R)_n$ on phenyl rings may or may not exist. When the structural units represented by the formula (A) are arranged in a successive manner, the units each generally bind with a head to tail bond. The styrene structural unit contained in the CHD-ST copolymer of the present invention may be one kind or two or more kinds.

R and n in the following formula (A) are not particularly limited, but are similar to R and n in the repetitive unit represented by the formula (A) described earlier in the part of the styrene polymer (copolymer), respectively.

[Chem 10]

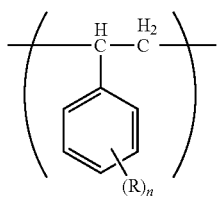

(A)

In the CHD-ST copolymer of the present invention, a chain composed of styrene structural units, which is contained in the copolymer, is preferably high syndiotactic. Specifically, in the CHD-ST copolymer of the present invention, which is a random copolymer, the ratio of diad which is a syndiotactic sequence (syndiotacticity) among all two successive units (diad) of styrene structural unit contained in the copolymer is generally 60 r % or more, preferably 80 r % or more, and more preferably 98 r % or more. The syndiotacticity of chain composed of the styrene structural units can be measured by the same method (by analysis of $^{13}$C-NMR spectrum) as the method used for measurement of syndiotacticity of a chain composed of styrene structural units in the above-mentioned ethylene-styrene copolymer.

Mw/Mn as an index of the molecular weight distribution of the CHD-ST copolymer of the present invention is generally 2 or less, and preferably 1.8 or less. The term "molecular weight distribution" refers to a measurement value (Mw/Mn) obtained by a GPC method (where a measurement is performed by using polystyrene as a reference material and tetrahydrofran as an eluate at 40° C.). The molecular weight distribution may be measured by using a GPC measurement device (TOSOH HLC 8220 GPC/HT), for example.

A molecular weight of the CHD-ST copolymer of the present invention is not particularly limited, but the number average molecular weight of the CHD-ST copolymer is generally 10,000 or less, and preferably 8,000 or less. A lower limit thereof is not particularly limited, but is particularly 1,000 or more (preferably 3,000 or more). The molecular weight is related to a content of 1,3-cyclohexadiene structural unit, and there is a tendency that a molecular weight increases as a content decreases. The molecular weight can be measured by the same GPC method used in measurement of the molecular weight distribution.

The CHD-ST copolymer of the present invention generally has a glass transition temperature. The glass transition temperature is not particularly limited, but is generally 100° C. or higher (preferably 150° C. or higher). The glass transition temperature is measured by a differential scanning calorimetry (DSC) method.

5. Copolymer of 1,3-cyclohexadiene and ethylene (CHD-ET Copolymer) of the Present Invention The copolymer of 1,3-cyclohexadiene and ethylene (CHD-ET copolymer) of the present invention is a polymer including a 1,3-cyclohexadiene structural unit and an ethylene structural unit (preferably consisting of both the units). Here, a content of the 1,3-cyclohexadiene structural unit in the CHD-ET copolymer of the present invention can be arbitrarily selected, but is generally 3 to 70 mol %.

Figure 12:
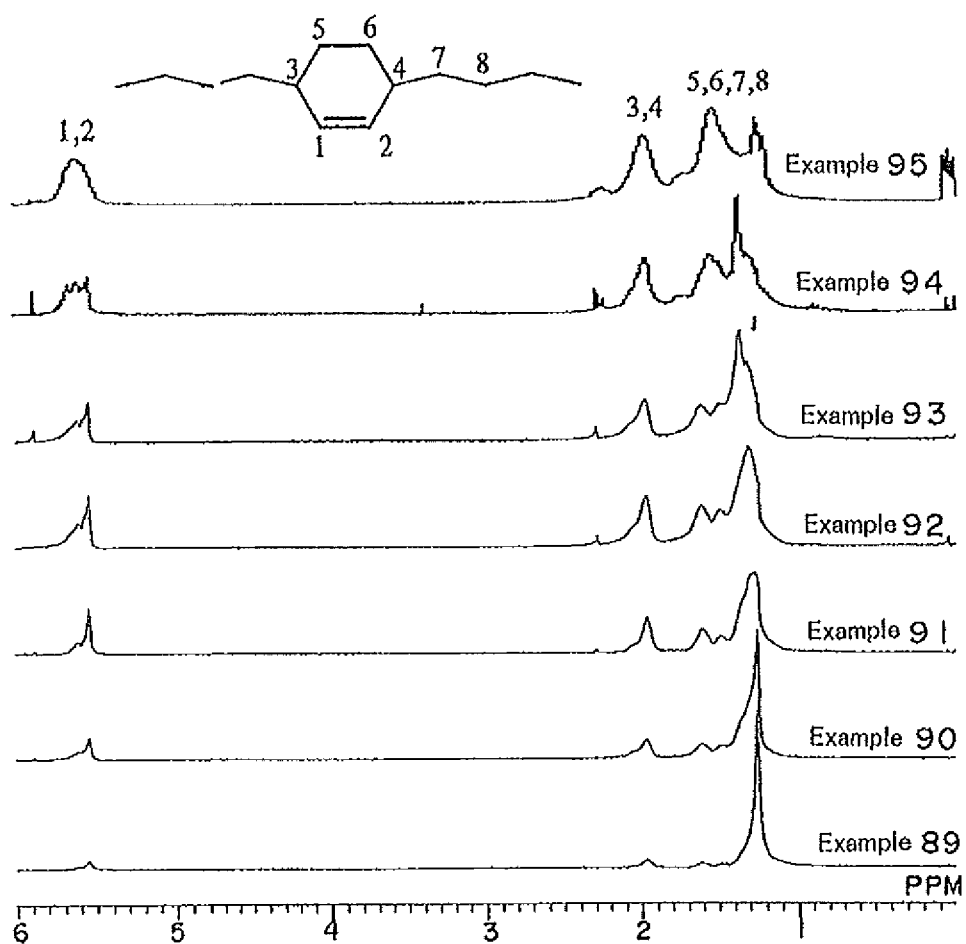
FIG. 12 shows $^{1}$H-NMR spectrum charts of copolymers of 1,3-cyclohexadiene and ethylene, which were obtained in Examples 89 to 95, respectively.
Figure 13:
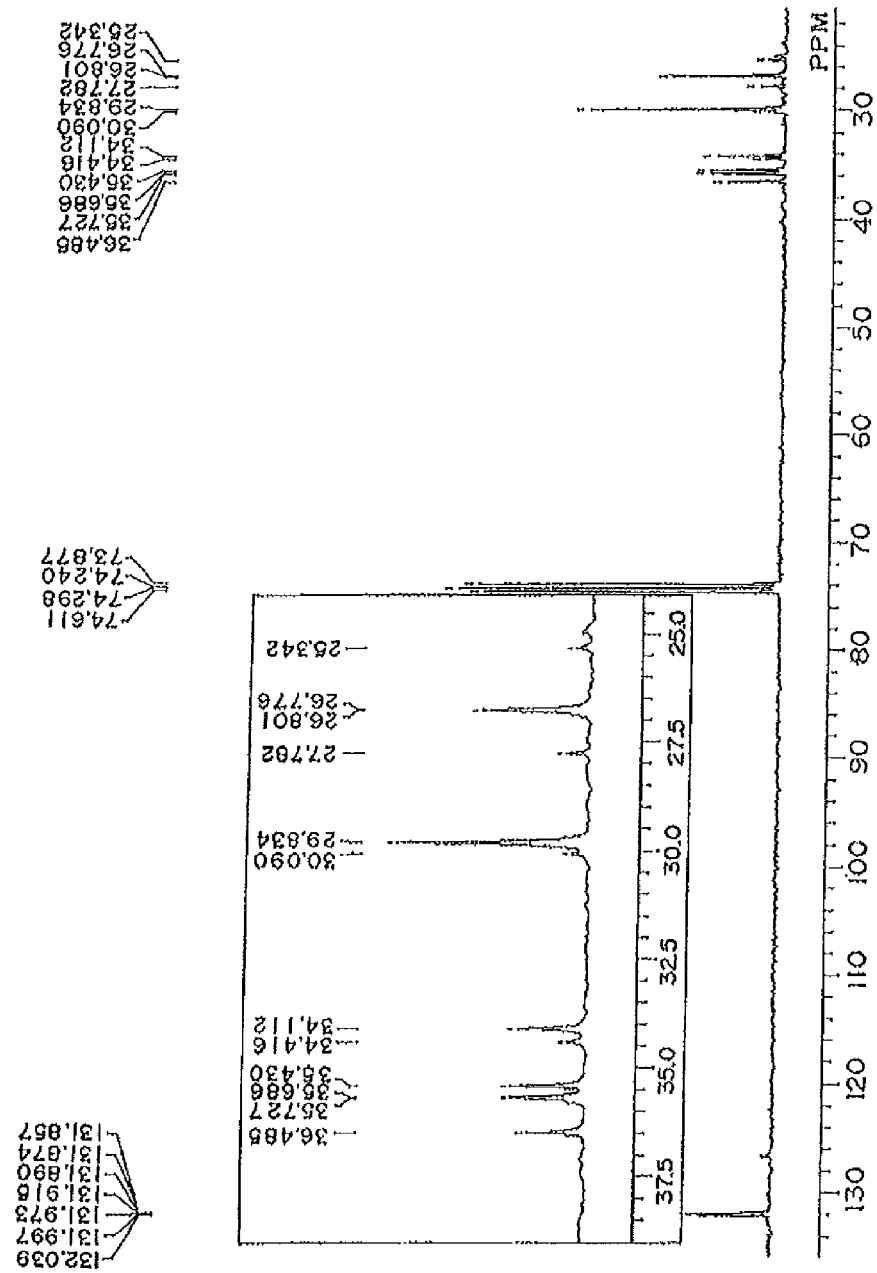
FIG. 13 is a $^{13}$C-NMR spectrum chart of the copolymer of 1,3-cyclohexadiene and ethylene, which was obtained in Example 92, and an enlarged parts thereof.
Figure 14:
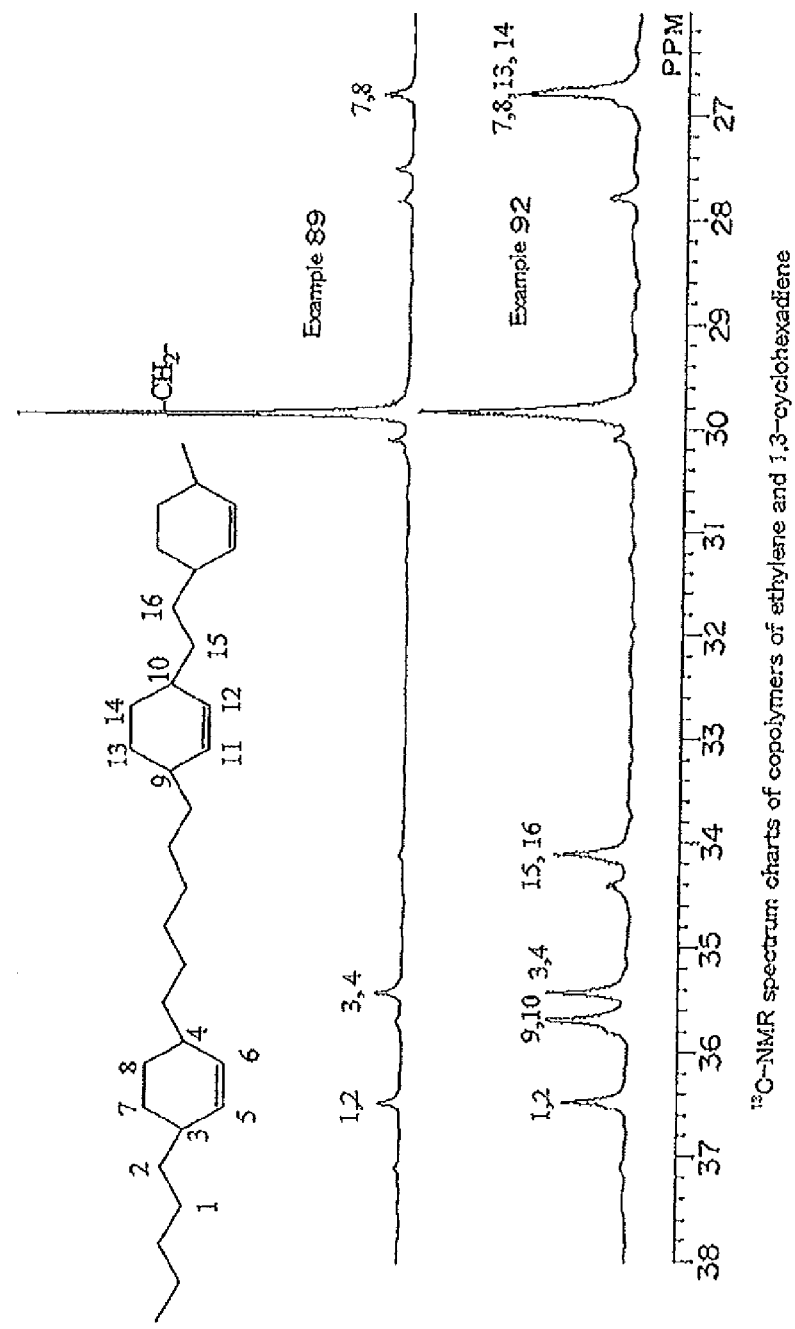
FIG. 14 shows $^{13}$C-NMR spectrum charts of the copolymers of 1,3-cyclohexadiene and ethylene, which were obtained in Examples 89 and 92, and enlarged parts thereof.
Figure 15:
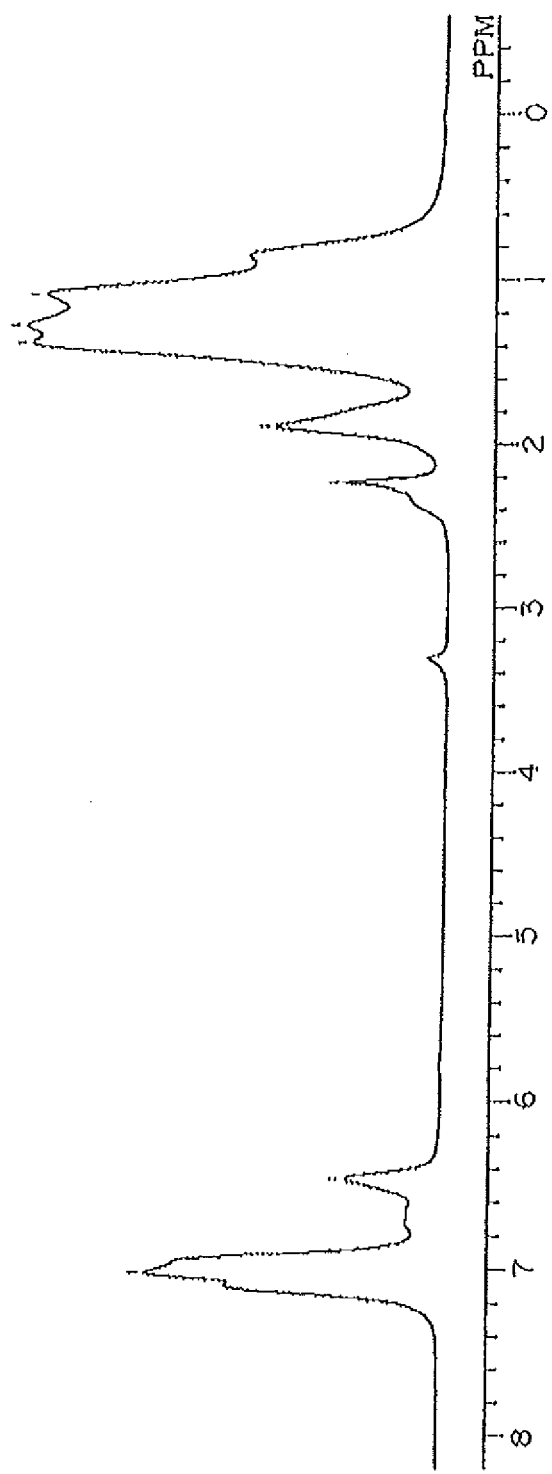
FIG. 15 is an $^{1}$H-NMR spectrum chart of a terpolymer of ethylene, norbornene, and styrene, which was obtained in Example 99.

The content can be measured by means of $^1$H-NMR. For example, as shown in FIG. 12, the content can be determined from the ratio of a peak area of a peak attributed to olefin hydrogen of the 1,3-cyclohexadiene structural unit at around 5.3 to 5.8 ppm and peak areas of other peaks.

As described later, the content can be controlled by adjusting the amount of 1,3-cyclohexadiene of the monomer to be used as a raw material.

As described above, the CHD-ET copolymer of the present invention includes a 1,3-cyclohexadiene structural unit and an ethylene structural unit, and both the structural units may be arranged in an arbitrary order. In other words, each of those structural units may be arranged in a random manner, or with a certain regularity (for example, both the structural units are arranged in an alternate manner, in a successive manner to some degree, or in other determined order). Therefore, the CHD-ET copolymer of the present invention may be any of a random copolymer, an alternate copolymer, a block copolymer, and other sequence-defined copolymer. The CHD-ET copolymer of the present invention is preferably a random copolymer or block copolymer, and more preferably a random copolymer.

A 1,3-cyclohexadiene structural unit contained in the CHD-ET copolymer of the present invention may be a 1,4-structural unit or 1,2-structural unit. The CHD-ET copolymer of the present invention is characterized by having a ratio of 1,4-structural unit {the number of 1,4-structural unit/(the number of 1,4-structural unit+the number of 1,2-structural unit)} of generally 80% or more, preferably 90% or more, more preferably 95% or more, and still more preferably 99% or more. The ratio can be determined form $^1$H-NMR spectrum. Specifically, the ratio may be measured by the same method as the method used for measurement of 1,4-structural unit in the above-mentioned CHD polymer.

Further, a chain composed of 1,4-structural units of 1,3-cyclohexadiene in the CHD-ET copolymer of the present invention is preferably high cis-syndiotactic. Specifically, cis-syndiotacticity of two successive units of 1,4-structural unit of 1,3-cyclohexadiene is generally 50 r % or more, preferably 70 r % or more, and more preferably 90 r % or more. The cis-syndiotacticity can be measured by the same method as the method used for measurement of cis-syndiotacticity in the above-mentioned CHD polymer.

A molecular weight distribution of the CHD-ET copolymer of the present invention is not particularly limited, but Mw/Mn, as an index of the molecular weight distribution, of the CHD-ET copolymer of the present invention is generally 1.7 or less, and preferably 1.4 or less. The term "molecular weight distribution" refers to a measurement value (Mw/Mn) obtained by a GPC method (where a measurement is performed by using polystyrene as a reference material and 1,2-dichlorobenzene as an eluate at 145° C.). The molecular weight distribution may be measured by using a GPC measurement device (TOSOH HLC 8121 GPC/HT), for example.

A molecular weight of the CHD-ET copolymer of the present invention is not particularly limited, but the number average molecular weight of the copolymer is generally $3 \times 10^5$ or less, and preferably $2 \times 10^5$ or less. A lower limit is not particularly limited, but is preferably 1,000 or more. The molecular weight is related to a content of structural unit derived from 1,3-cyclohexadiene, and a molecular weight increases as a content decreases. The molecular weight can be determined by the same GPC method used for measurement of the molecular weight distribution. In addition, by elevating the temperature at a polymerization reaction in production of CHD-ET copolymer, the molecular weight can be increased.

The CHD-ET copolymer of the present invention generally has a melting point. The temperature at the melting point is not particularly limited, but is generally about 120 to 130° C. The melting point is measured by a differential scanning calorimetry (DSC) method.

6. Copolymer of norbornenes/ethylene/styrene (NBE-ET-ST Copolymer) of the Present Invention The term "copolymer of norbornenes/ethylene/styrene of the present invention" refers to a polymer including a norbornene structural unit, ethylene structural unit, and styrene structural unit (preferably composed of those units). The NBE-ET-ST copolymer of the present invention is preferably a terpolymer.

Each of norbornene/ethylene/styrene structural units in the NBE-ET-ST copolymer may be arranged in an arbitrary order. In other words, each of those structural units may be arranged in a random manner, or with a certain regularity (for example, each of the structural units is arranged in a successive manner to some degree, or in other determined order). Therefore, the NBE-ET-ST copolymer of the present invention may be any of a random copolymer, an ABC-type block copolymer, and other sequence-defined copolymer. The NBE-ET-ST copolymer of the present invention is preferably a random copolymer or ABC-type block copolymer, and more preferably a random copolymer.

The ratios of the respective structural units in the NBE-ET-ST copolymer of the present invention are arbitrary, but the content of ethylene structural unit with respect to all structural units is generally about 20 to 80 mol %. In production of NBE-ET-ST copolymer (described later), the content of the ethylene structural unit can be controlled depending on the ratio between norbornenes and styrene, pressure of ethylene, amount of solvent, reaction temperature, kind of catalyst (kinds of central metal and ligand), kind of co-catalyst, and the like, and is not limited to the above-mentioned range.

Further, the ratio between styrene structural unit and norbornene structural unit in the NBE-ET-ST copolymer of the present invention is arbitrary. The ratio between the units can be controlled by adjusting the ratio between styrene and norbornenes, which are monomer raw materials in production of NBE-ET-ST copolymer (described later).

Figure 16:
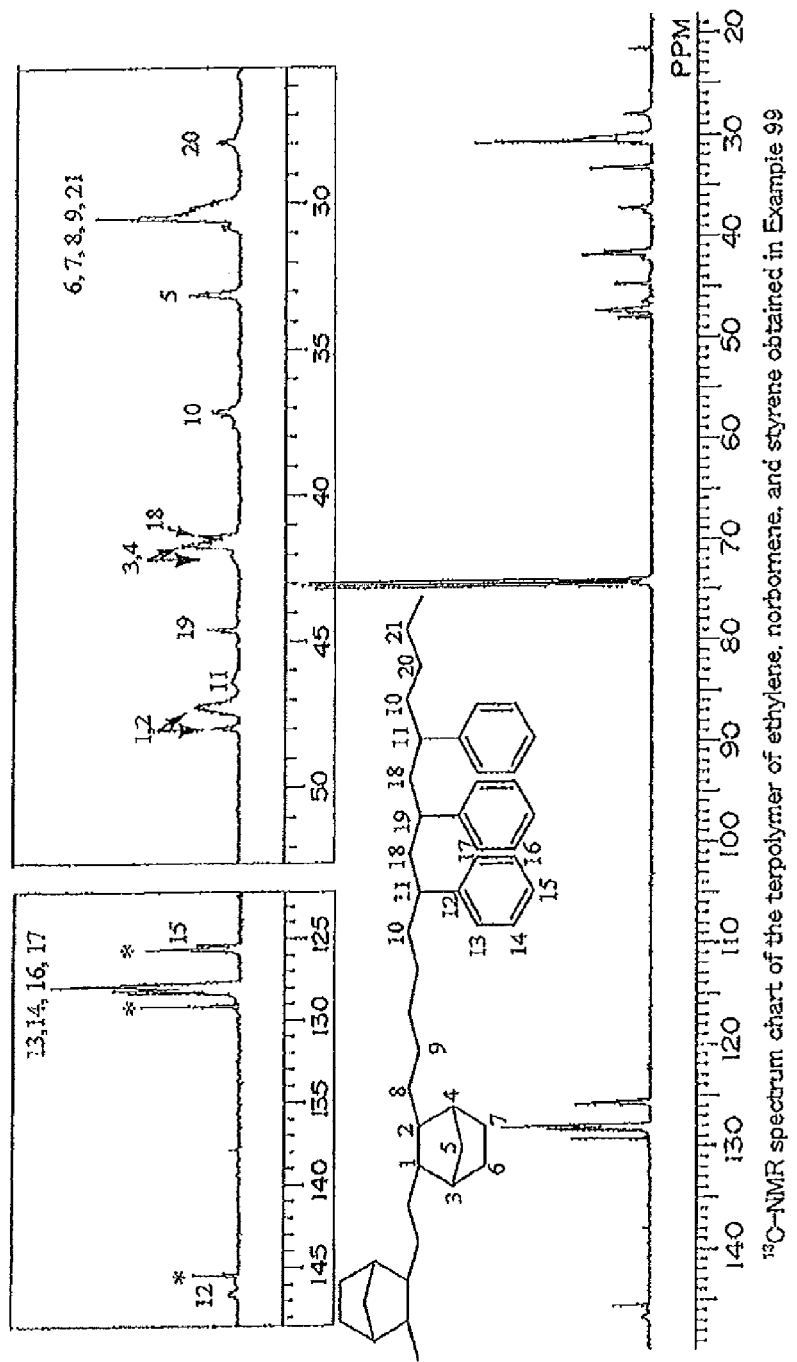
FIG. 16 is a $^{13}$C-NMR spectrum chart of the terpolymer of ethylene, norbornene, and styrene, which was obtained in Example 99.
Figure 17:
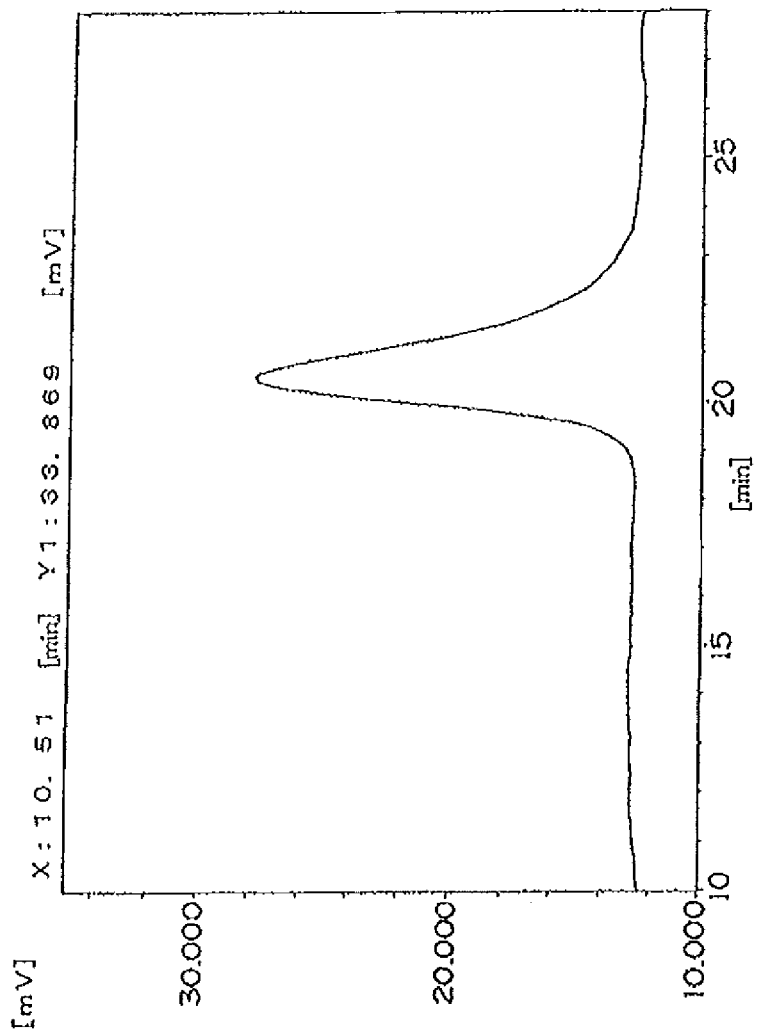
FIG. 17 is a GPC curve of the terpolymer of ethylene, norbornene, and styrene, which was obtained in Example 99.
Figure 18:
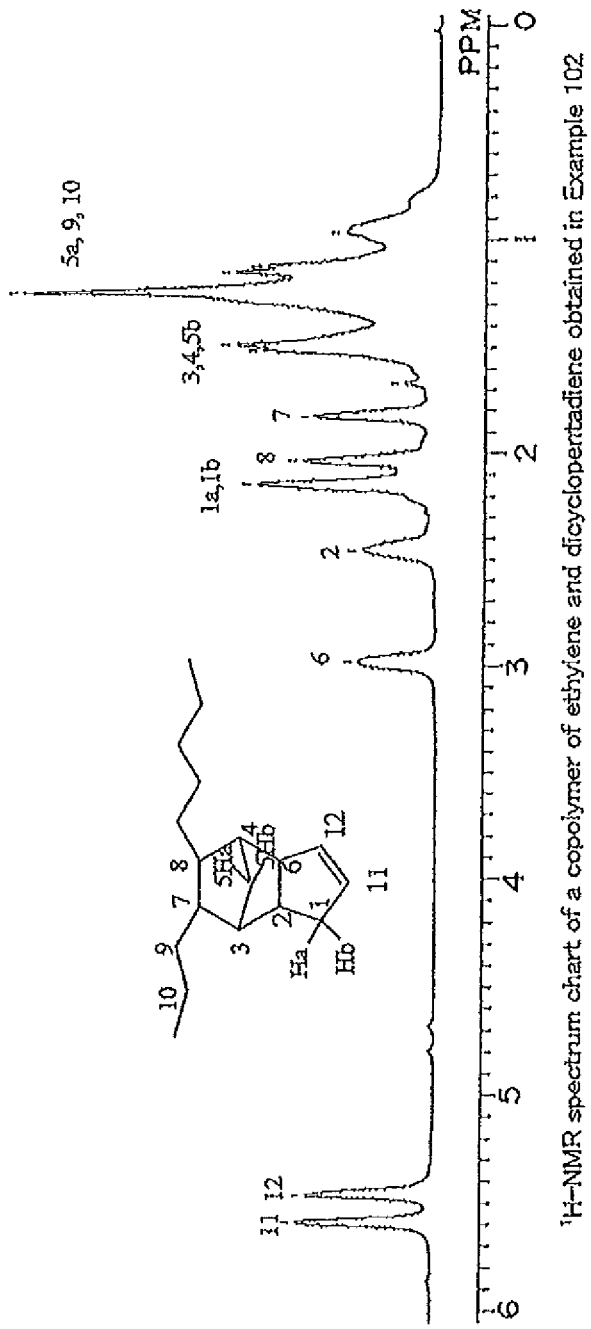
FIG. 18 is an $^{1}$H-NMR spectrum chart of a copolymer of dicyclopentadiene and ethylene, which was obtained in Example 102.

The content of ethylene structural unit in the NBE-ET-ST copolymer of the present invention and the ratio between styrene structural unit and norbornene structural unit can be measured by analysis of $^{13}$C-NMR spectrum. Specifically, as shown in FIG. 16, respective peaks of $^{13}$C-NMR spectrum of the NBE-ET-ST copolymer are attributed to respective carbons, so the ratio may be determined on the basis of the peak area.

Specifically, the contents can be determined from the ratio of, for example, a peak area $P_{128}$ of a peak (ST4 carbon) at around 128 ppm, a peak area $P_{33}$ of a peak (NBE1 carbon) at around 33 ppm, and a peak area $P_{30.5}$ of a peak (ET2 carbon+NBE2 carbon) at around 30.5 ppm. That is, the contents can be determined according to the following formulae.

Styrene content(%)=$(P_{128}/(P_{128}+2 \times P_{30.5})) \times 100$,

Norbornene content(%)=$(4 \times P_{33}/(P_{128}+2 \times P_{30.5})) \times 100$, Ethylene content(%)=$((2 \times P_{30.5}-4 \times P_{33})/(P_{128}+2 \times P_{30.5})) \times 100$ A styrene structural unit contained in the NBE-ET-ST copolymer of the present invention is represented by the following formula (A). Here, substituents $(R)_n$ on phenyl rings may or may not exist (may be unsubstituted). When the structural units represented by the formula (A) are arranged in a successive manner, the units each generally bind with a head to tail bond. The styrene structural unit contained in the NBE-ET-ST copolymer of the present invention may be one kind or two or more kinds.

R and n in the following formula (A) are similar to R and n in the repetitive unit represented by the formula (A) described earlier in the part of the styrene polymer (copolymer), respectively.

[Chem 11]

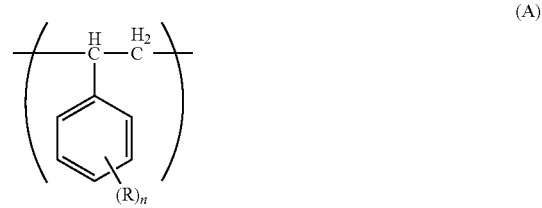

(A)

Tacticity of the styrene structural unit in the NBE-ET-ST copolymer of the present invention is preferably high syndiotactic. Specifically, of all two successive units (diad) of styrene structural unit contained in the NBE-ET-ST copolymer of the present invention, which is a random copolymer, a ratio of diad which is a syndiotactic sequence is generally 60 r % or more, preferably 80 r % or more, and more preferably 98 r % or more.

The syndiotacticity of chain composed of the styrene structural units can be measured by the same method as the method used for measurement of syndiotacticity in the above-mentioned styrene-ethylene copolymer.

As described above, the NBE-ET-ST copolymer of the present invention includes a norbornene structural unit. Here, the term "norbornenes" refers to compounds each having a 2-norbornene skeleton as shown in the following formula.

[Chem 12]

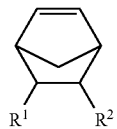

$R^1 \quad R^2$

In the formula, $R^1$ and $R^2$ are each arbitrary and not particularly limited, but, for example, they may independently represent a hydrogen atom or an alkyl group having 1 to 20 carbon atoms (preferably 1 to 10 carbon atoms), or form an alkylene chain or alkenylene chain in combination with each other. Specific examples of the norbornenes include 2-norbornene, dicyclopentadiene, tetracyclododecane (TCD), and 1,4-methanotetrahydrofuluorene (MTF).

The norbornenes are preferably 2-norbornene in which $R^1$ and $R^2$ are hydrogen atoms or dicyclopentadiene.

[Chem 13]

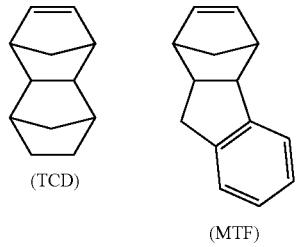

(TCD)  (MTF)

The norbornene structural unit in the NBE-ET-ST copolymer of the present invention preferably has high selectivity for addition polymerization unit. In other words, as a structural unit of polynorbornenes, the following addition polymerization unit and open-ring polymerization unit are possible, and the NBE-ET-ST copolymer of the present invention is characterized by having a high ratio of the addition polymerization unit with respect to all structural units of norbornenes therein. Specifically, the ratio of the addition polymerization unit in all structural units of norbornenes therein in the NBE-ET-ST copolymer of the present invention is generally 95% or more, and preferably near 100%. The ratio between the addition polymerization unit and open-ring polymerization unit can be determined from $^1$H-NMR spectrum.

[Chem 14]

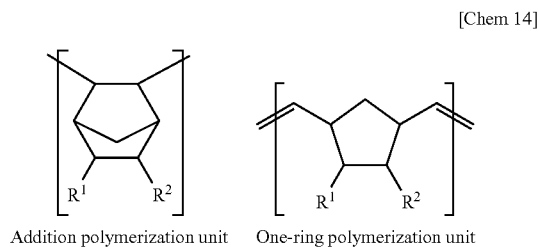

Addition polymerization unit    One-ring polymerization unit

A molecular weight distribution of the NBE-ET-ST copolymer of the present invention is not particularly limited, but Mw/Mn as an index of the molecular weight distribution of the NBE-ET-ST copolymer of the present invention is generally 2.0 or less, and preferably 1.5 or less. The term "molecular weight distribution" refers to a measurement value (Mw/Mn) obtained by a GPC method (where a measurement is performed by using polystyrene as a reference material and 1,2-dichlorobnezene as an eluate at 145° C.). The molecular weight distribution may be measured by using a GPC measurement device (TOSOH HLC 8121 GPC/HT), for example.

A molecular weight of the NBE-ET-ST copolymer of the present invention is not particularly limited, but the number average molecular weight of the copolymer is generally $5 \times 10^5$ or less. A lower limit is not particularly limited, but is preferably 5,000 or more.

The NBE-ET-ST copolymer of the present invention generally has a glass transition temperature. The glass transition temperature is not particularly limited, but is generally about 60° C. The glass transition temperature is measured by a differential scanning calorimetry (DSC) method.

7. Copolymer of dicyclopentadiene and ethylene (DCPD-ET copolymer) of the Present Invention The copolymer of dicyclopentadiene and ethylene of the present invention is a copolymer including a dicyclopentadiene structural unit and an ethylene structural unit. In the DCPD-ET copolymer of the present invention, both the structural units may be arranged in an arbitrary order. In other words, each of those structural units may be arranged in a random manner, or with a certain regularity (for example, both the structural units are arranged in an alternate manner, in a successive manner to some degree, or in other determined order). Therefore, the DCPD-ET copolymer of the present invention may be any of a random copolymer, an alternate copolymer, a block copolymer, and other sequence-defined copolymer. The DCPD-ET copolymer of the present invention is preferably a random copolymer or block copolymer, and more preferably a random copolymer.

A content of the dicyclopentadiene structural unit with respect to all structural units contained in the DCPD-ET copolymer of the present invention is not particularly limited, but is generally 10 mol % or more, preferably 20 mol % or more, and more preferably 30 mol % or more. Further, the upper limit of the content is not particularly limited, but is generally 60 mol % or less, preferably 50 mol % or less, and more preferably 40 mol % or less.

Figure 19:
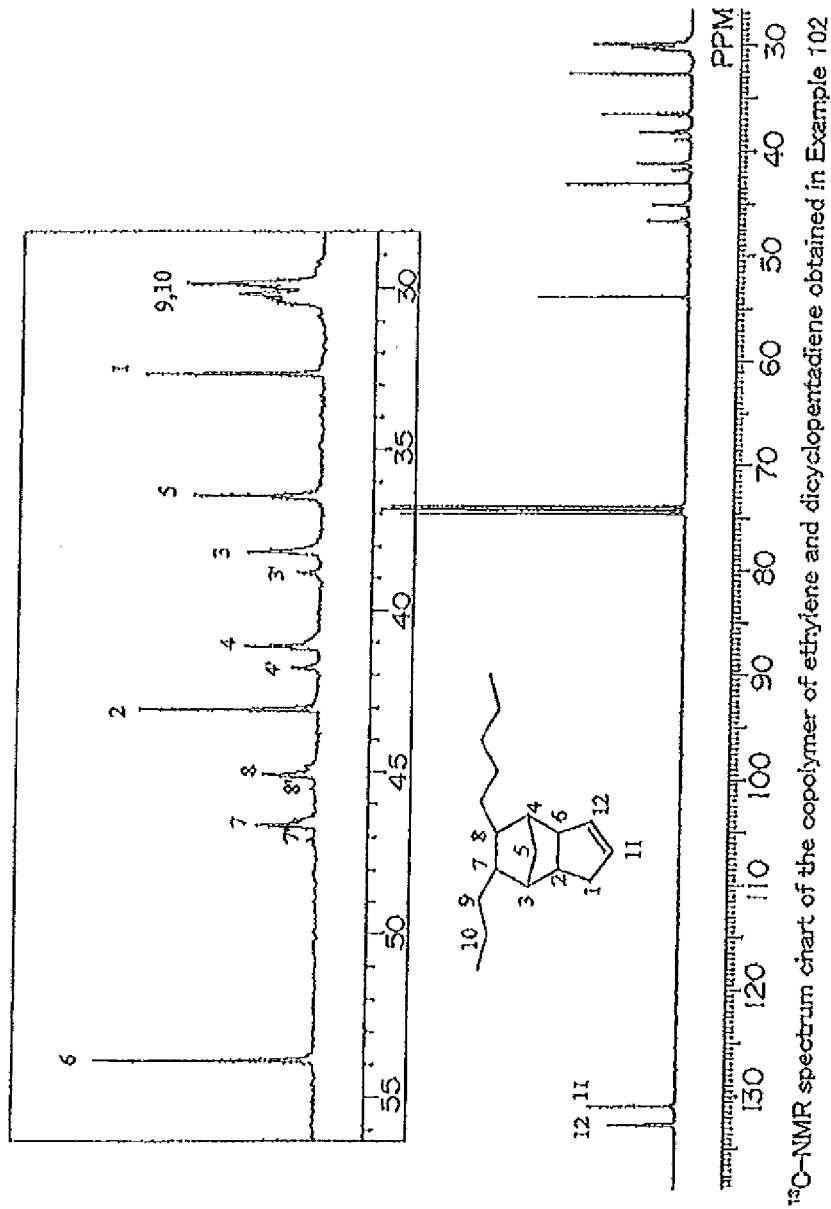
FIG. 19 is a $^{13}$C-NMR spectrum chart of the copolymer of dicyclopentadiene and ethylene, which was obtained in Example 102.
Figure 20:
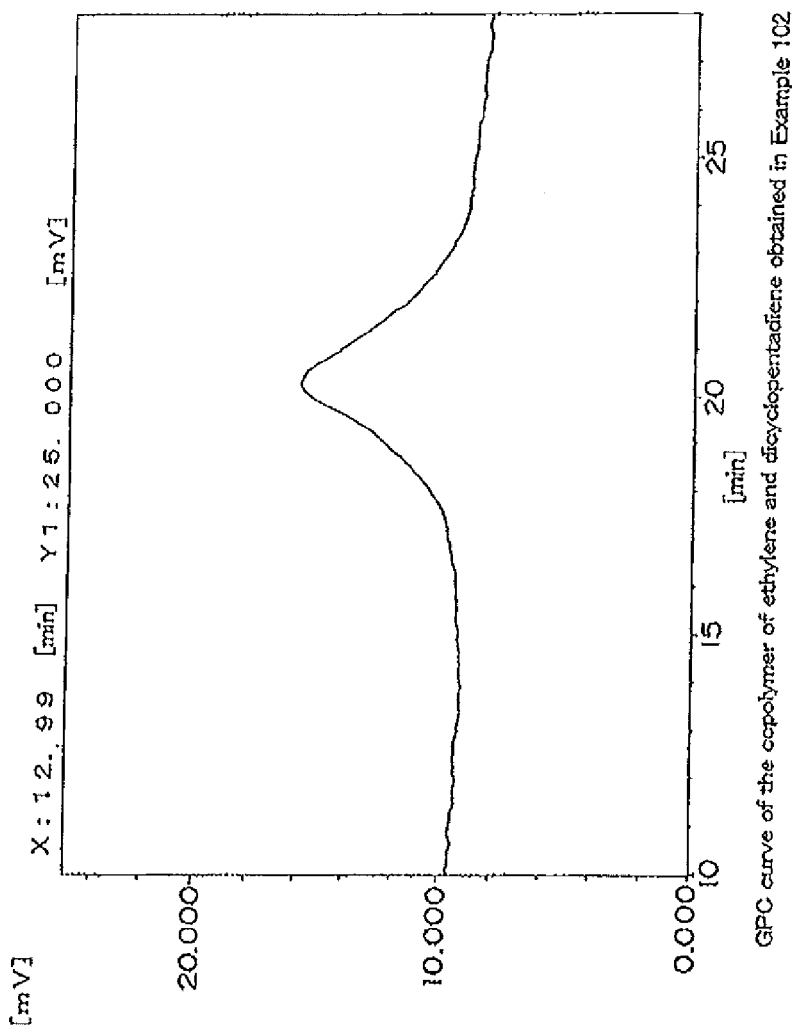
FIG. 20 is a GPC curve of the copolymer of dicyclopentadiene and ethylene, which was obtained in Example 102.

The content can be measured by analysis of $^1$H-NMR spectrum. Specifically, as shown in FIG. 19, respective peaks of $^1$H-NMR spectrum of the DCPD-ET copolymer are attributed to respective carbons of the copolymer, so the ratio may be determined on the basis of these peak areas. Specifically, the content can be determined from the ratio of, for example, a peak area $P_3$ of a peak (DCPD1 hydrogen) at around 3 ppm, and a peak area $P_{0.7-1.7}$ of a peak (DCPD4 hydrogen+ET4 hydrogen) at around 0.7 to 1.7 ppm. That is, the content can be determined according to the following formula.

$$\text{DCPD}(\%) = (4P_3/(P_{0.7-1.7})) \times 100$$

The content can be controlled by adjusting the using amount (or concentration) of dicyclopendadiene of a raw material in production of a DCPD-ET copolymer (described later).

Dicyclopentadiene has a C=C double bond derived from a norbornene structure and a C=C double bond derived from a cyclopentene structure. A ratio of dicyclopentadiene structural unit, which is based on the C=C double bond derived from a norbornene structure, with respect to all structural units of dicyclopentadiene in the DCPD-ET copolymer of the present invention, is generally 80% or more, preferably 90% or more, and more preferably 99% or more.

In addition, like the norbornene structural unit, a dicyclopentadiene structural unit, which is based on the C=C double bond derived from a norbornene structure, may be an addition polymerization unit or open-ring polymerization unit as shown in the following formula. The ratio of addition polymerization unit with respect to all structural units of dicyclopentadiene in the DCPD-ET copolymer of the present invention is generally 80% or more, preferably 90% or more, more preferably 95% or more, and still more preferably 99% or more.

The content can be determined from $^1$H-NMR spectrum data.

[Chem 15]

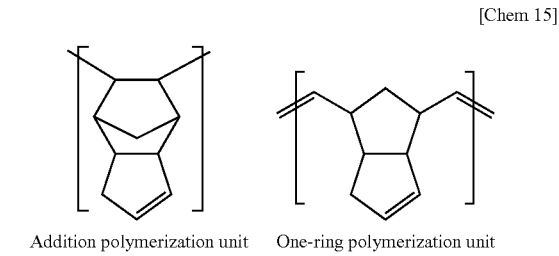

Addition polymerization unit    One-ring polymerization unit

A molecular weight distribution of the DCPD-ET copolymer of the present invention is not particularly limited, but Mw/Mn as an index of the molecular weight distribution of the DCPD-ET copolymer of the present invention is generally 3 or less, and preferably 2 or less. The term "molecular weight distribution" refers to a measurement value (Mw/Mn) obtained by a GPC method (where a measurement is performed by using polystyrene as a reference material and 1,2-dichlorobnezene as an eluate at 145° C.). The molecular weight distribution may be measured by using a GPC measurement device (TOSOH HLC 8121 GPC/HT), for example.

A molecular weight of the DCPD-ET copolymer of the present invention is not particularly limited, but the number average molecular weight of the copolymer is generally 100,000 or more, preferably 200,000 or more, more preferably 300,000 or more, and still more preferably 400,000 or more. An upper limit of the molecular weight is not particularly limited, but the number average molecular weight of the copolymer only needs to be 1,000,000 or less.

The DCPD-ET copolymer of the present invention generally has a glass transition temperature. The glass transition temperature is not particularly limited, but generally about 160 to 200° C. The glass transition temperature is measured by a differential scanning calorimetry (DSC) method.

(Production Method of Polymer Compound of the Present Invention)

The production method of the polymer compound of the present invention is characterized by including subjecting an arbitrary polymerizable monomer to polymerization (or addition polymerization) by using the above-mentioned polymerization catalyst composition of the present invention.

Further, the production method of the present invention may be the same as the production method of a polymer compound by an addition polymerization reaction using a conventional coordinated ionic polymerization catalyst except that the catalyst composition of the present invention is used as a polymerization catalyst.

Specifically, the method can be performed by the following procedures.

1. A polymerizable monomer is supplied into a system (preferably a liquid phase) including the catalyst composition of the present invention, and is then polymerized. At that time, if the monomer is a liquid, it can be supplied by being dropped, or if the monomer is gas, it may be supplied through a gas pipe (by means of bubbling in the case of liquid phase reaction system).

2. For the purpose of polymerization, the catalyst composition of the present invention is added or each of the components of the catalyst composition is separately added into a system (preferably a liquid phase) including the polymerizable monomer. The catalyst composition to be added may be prepared (preferably in a liquid phase), and activated in advance (in this case, the catalyst composition may be desirably added so as not to be touch in the air).

Here, examples of the polymerizable monomer include a monomer capable of addition polymerization such as an olefin-based monomer, an epoxy-based monomer, an isocyanate-based monomer, a lactone-based monomer, a lactide-based polymer, a cyclic carbonate-based monomer, and an alkyne-based monomer, and any of them can be used in combination.

Of those, the polymerizable monomer is preferably one kind or two or more kinds of olefin-based monomers, or more preferably one kind or two or more kinds of monomers selected from the group consisting of a substituted or unsubstituted styrene, ethylene, α-olefin (including 1-hexene), diene, and cyclic olefin (including norbornenes and cyclohexadiene). Here, examples of the diene as an olefin-based monomer include cyclic diene such as 1,3-butadiene, 1,3-pentadiene, 1,4-pentadiene, 1,3-hexadiene, 1,4-hexadiene, 1,5-hexadiene, 2,4-dimethyl-1,3-pentadiene, 2-methyl-1,3-hexadiene, 2,4-hexadiene, and cyclohexadiene.

The production method may be an arbitrary method such as a gas phase polymerization method, a solution polymerization method, a suspension polymerization method, a liquid phase bulk polymerization method, an emulsion polymerization method, or a solid phase polymerization method. In the case of the solution polymerization method, a solvent to be used is not particularly limited as long as it is inactive during a polymerization reaction and is a solvent capable of dissolving a monomer and catalyst. Examples of the solvent include: saturated aliphatic hydrocarbons such as butane, pentane, hexane, and heptane; saturated alicyclic hydrocarbons such as cyclopentane and cyclohexane; aromatic hydrocarbons such as benzene and toluene; halogenated hydrocarbones such as methylene chloride, chloroform, carbon teterachloride, trichlorethylene, perchlorethylene, 1,2-dichloroethane, chlorbenzene, brombenzene, and chlortoluene; and ethers such as tetrahydrofran and diethyl ether.

Further, a solvent with no toxicity to living body is preferable. A specific example of the solvent includes aromatic hydrocarbons, with toluene being particularly preferable. A solvent may be used alone, or a mixed solvent of combination of two or more kinds may be used.

An amount of the solvent to be used is arbitrary, but the amount may preferably allow the concentration of complex contained in the polymerization catalyst to be 0.1 to 0.0001 mol/l.

A temperature at polymerization when the polymerization of the present invention is a solution polymerization may be set in an arbitrary range of, for example, −90 to 100° C. The temperature may be arbitrarily selected depending on the kind of monomer to be polymerized, but is generally at around room temperature, that is, about 25° C.

The polymerization time is in a range of about several seconds to several hours, and may be arbitrarily selected depending on the kind of monomer to be polymerized. In general, the polymerization time may be one hour or less, or one minute or less in some cases.

Of course, those conditions may be arbitrarily selected depending on the temperature at a polymerization reaction, kind of monomer, molar amount, kind and amount of catalyst composition, and the like, and are not limited to the above-listed range.

Further, a copolymer can be produced in the following manner.

1) In the case of random copolymer or alternate copolymer, a mixture of two or more kinds of monomers can be subjected to a polymerization reaction under the presence of catalyst composition to produce the random copolymer or alternate copolymer.

2) In the case of block copolymer, each of monomers can be sequentially supplied into a reaction system including a catalyst composition to produce the block copolymer.

Examples of the polymer compound produced by the production method of the present invention include the following, but are not limited to those compounds.

1) A substituted or unsubstituted styrene polymer, or a copolymer of a substituted or unsubstituted styrene and a substituted styrene.

2) A copolymer of a substituted or unsubstituted styrene and ethylene.

3) An ethylene polymer.

4) An α-olefin (including 1-hexene) polymer.

5) A copolymer of ethylene and α-olefin (including 1-hexene).

6) A copolymer of ethylene and norbornenes.

7) A 1,3-cyclohexadiene polymer.

8) A copolymer of 1,3-cyclohexadiene and a substituted or unsubstituted styrene.

9) A copolymer of 1,3-cyclohexadiene and ethylene.

9) A copolymer of norbornenes, a substituted or unsubstituted styrene, and ethylene.

10) A copolymer of dicyclopentadiene and ethylene.

11) A polymer or a copolymer of diene.

12) A copolymer of a substituted or unsubstituted styrene and a conjugated diene.

Note that production methods of polymers (copolymers) in the items 1) and 2), 7) to 10), and 12) will be described in more detail hereinbelow.

1. Production Method of Styrene Polymer or Copolymer

A styrene polymer or copolymer can be produced by polymerizing a substituted or unsubstituted styrene, or the mixture thereof (hereinafter, also simply referred to as "styrene compound") by using the catalyst composition of the present invention.

Examples of a complex to be used in the catalyst composition preferably include a complex having a central metal of Scandium (Sc), Yttrium (Y), Gadolinium (Gd), or Lutetium (Lu), or more preferably Scandium (Sc).

On the other hand, as an ionic compound in the catalyst composition, a compound composed of a quadrivalent boron anion and carbonium cation such as $[Ph_3C][B(C_6F_5)_4]$ is preferable. The molar ratio between the complex and the ionic compound is preferably about 1:1.

Specific procedures includes, for example, composing the catalyst composition of the present invention in a solvent (preferably toluene) to produce an active species; and supplying a styrene compound in the solvent while stirring the solvent. The reaction temperature is preferably set to about 25° C.

An amount of the solvent to be used in a polymerization reaction may be in a ratio of about 5 ml per 1 ml of styrene monomer, but is not limited to the ratio.

An amount of styrene compound to be provided is preferably 100 to 3,000 folds in a molar ratio with respect to a complex, and preferably 500 to 2,500 folds when an Sc complex is used. Increase in the ratio makes it possible to produce a polystyrene polymer (copolymer) having a larger molecular weight, but the ratio largely exceeding 3,000 folds may result in a slight decrease in syndiotacticity.

In many cases, the polymerization reaction is completed in several seconds to one hour. In particular, in the case where an Sc complex is used, the reaction is often completed in one minute or less. After completion of the reaction, the reaction system may have a increased viscosity and thus can not be stirred in some cases.

After completion of the reaction, a generated polymer can be precipitated by transferring a reaction mixture into methanol or the like. A styrene polymer (copolymer) can be obtained by filtrating and drying the precipitated polymer. An yield of the obtained styrene polymer (copolymer) can be made almost 100%, though depending on the kind of complex to be used. In particular, use of Sc complex leads to a high yield in many cases.

The thus-produced styrene polymer (copolymer) may have high syndiotacticity. In a particularly preferable embodiment, the above-mentioned styrene polymer (copolymer) may be produced.

2. Production Method of Ethylene-Styrene Copolymer

An ethylene-styrene copolymer can be produced by polymerizing ethylene and one or two or more styrene compounds by using the catalyst composition of the present invention. The kinds of complex and ionic compound, the relative ratio thereof, and the like in the catalyst composition are preferably similar to those in the production method in the above-mentioned styrene polymer or copolymer.

Specific procedures includes, for example, continuously supplying ethylene gas into a solution (preferably a toluene solution) containing a styrene compound, and adding the catalyst compound of the present invention into the solution. The reaction temperature is preferably set to about 25° C.

An amount of the solvent to be used in a polymerization reaction is preferably set to be in a ratio of about 50 ml per 1 ml of styrene, but is not particularly limited to the ratio.

An amount of styrene compound is preferably about 100 to 3,000 folds in a molar ratio with respect to a complex (or an ionic compound). Increase in the amount of a styrene compound may provide an increase in a molecular weight of a copolymer to be obtained, and also an increase in a content of styrene.

A pressure of ethylene gas to be supplied can be arbitrarily adjusted, but only has to be 1 atm in general. Adjustment of the pressure is thought to enable adjustments of a molecular weight of the copolymer and a content of ethylene.

The catalyst composition is preferably added as a solution (preferably a solution containing an active species) which is obtained by a reaction of a complex and an ionic compound in a solvent (preferably toluene) in advance.

The reaction time is preferably set to several seconds to one hour. In particular, in the case where an Sc complex is used, the reaction time is preferably set to about several minutes.

After completion of the reaction, a generated polymer can be precipitated by transferring a reaction mixture into methanol or the like. A ethylene-styrene copolymer can be obtained by filtrating and drying the precipitated polymer.

The thus-produced ethylene-styrene copolymer is a random copolymer and may have high syndiotacticity. In a preferable embodiment, the ethylene-styrene copolymer may have a sharp molecular weight distribution.

On the other hand, an ethylene-styrene copolymer, which is a block copolymer, can be obtained by: adding the catalyst composition of the present invention into a solution (preferably a toluene solution) containing a styrene compound for polymerization; and supplying ethylene gas into the solvent after the styrene compound in the system has disappeared (the styrene compound may disappear in several minutes). Note that styrene may be supplied to be polymerized after the polymerization of ethylene.

The thus-obtained ethylene-styrene copolymer, which is a block copolymer, may have a styrene block chain with high syndiotacticity and a sharp molecular weight distribution.

3. Production Method of 1,3-cyclohexadiene Polymer

A 1,3-cyclohexadiene polymer can be produced by polymerizing 1,3-cyclohexadiene by using the catalyst composition of the present invention. Examples of a complex in the catalyst composition preferably include a complex having a central metal of Scandium (Sc), Yttrium (Y), Lutetium (Lu), Dysprosium (Dy), or Holmium (Ho), Erbium (Er), and more preferably a complex having a central metal of Scandium (Sc). The central metal is preferably Sc in view of yield of the obtained polymer. On the other hand, examples of an ionic compound of the catalyst composition of the present invention preferably include a compound composed of a quadrivalent boron anion and carbonium cation such as $[Ph_3C][B(C_6F_5)_4]$, or a compound composed of a quadrivalent boron anion and anilium cation such as $[Ph(Me)_2NH][B(C_6F_5)_4]$. A molar ratio between the complex and the ionic compound is preferably set to about 1:1.

Specific procedures include, for example, composing the catalyst composition of the present invention in a solvent (preferably toluene) to produce an active species, and supplying 1,3-cyclohexadiene in the obtained solvent while stirring the solution. The reaction temperature is preferably set to about 25° C.

An amount of the solvent to be used in a polymerization reaction may be in a ratio of about 5 ml per 10 mmol of 1,3-cyclohexadiene, but is not particularly limited to the ratio.

An amount of 1,3-cyclohexadiene to be provided is preferably 100 to 3000 folds in a molar ratio with respect to a complex. Increase in the ratio may produce a polystyrene polymer (copolymer) having a larger molecular weight, but the excessively large ratio may lead to a decrease in cis-syndiotacticity.

In general, the polymerization reaction is completed in about several hours.

After completion of the reaction, a generated polymer can be precipitated by transferring a reaction mixture into methanol or the like. A 1,3-cyclohexadiene polymer can be obtained by filtrating and drying the precipitated polymer. An yield of the obtained 1,3-cyclohexadiene polymer can be made near 50%, though depending on the kind of complex to be used.

The thus-produced 1,3-cyclohexadiene polymer has high 1,4-selectivity and may have high cis-syndiotacticity. In a particularly preferable embodiment, the above-mentioned 1,3-cyclohexadiene polymer may be produced.

4. Production Method of Copolymer of 1,3-cyclohexadiene and Styrene

A copolymer of 1,3-cyclohexadiene and styrene can be produced by polymerizing 1,3-cyclohexadiene and a substituted or unsubstituted styrene by using the catalyst composition of the present invention. The kinds of complex and ionic compound, the relative ratio thereof, and the like in the catalyst composition are preferably similar to those in the production method in the above-mentioned 1,3-cyclohexadiene polymer.

Specific procedures include, for example, composing the catalyst composition of the present invention in a solvent (preferably toluene) to produce an active species, and supplying 1,3-cyclohexadiene and styrene in the solvent while stirring the solvent. 1,3-cyclohexadiene and styrene each may be provided in a state of being dissolved in a solvent (for example, toluene). A random copolymer can be obtained by supplying a mixture of 1,3-cyclohexadiene and styrene, and polymerizing them. A block copolymer can be obtained by: supplying one of 1,3-cyclohexadiene and styrene; polymerizing the one; and supplying the other one for polymerization (living copolymerization).

The reaction temperature is preferably set to about 25° C.

An amount of the solvent to be used in a polymerization reaction is preferably in a ratio of about 5 to 10 ml per total 20 mmol of 1,3-cyclohexadiene and styrene, but is not particularly limited to the ratio.

Amounts of 1,3-cyclohexadiene and styrene to be provided is each preferably 100 to 3,000 folds, and more preferably 100 to 1,000 folds in a molar ratio with respect to a complex. Increase in the ratio makes it possible to produce a polymer having a larger molecular weight, but the excessively large ratio may lead to a decrease in tacticity of each of 1,3-cyclohexadiene structural unit and styrene structural unit.

In general, the polymerization reaction is completed in about several hours.

After completion of the reaction, a generated polymer can be precipitated by transferring a reaction mixture into methanol or the like. A 1,3-cyclohexadiene-styrene copolymer can be obtained by filtrating and drying the precipitated polymer.

The thus-produced 1,3-cyclohexadiene and styrene copolymer has a high ratio of 1,4-structural unit with respect to all structural units in 1,3-cyclohexadiene, and may have high cis-syndiotacticity. Further, the 1,3-cyclohexadiene and styrene copolymer may have a styrene structural unit with high syndiotacticity. In a preferable embodiment, the above-mentioned CHD-ST copolymer of the present invention may be produced.

5. Production Method of Copolymer of 1,3-cyclohexadiene and Ethylene

A copolymer of 1,3-cyclohexadiene and ethylene can be produced by polymerizing 1,3-cyclohexadiene and ethylene by using the catalyst composition of the present invention. The kinds of complex and ionic compound, the relative ratio thereof, and the like in the catalyst composition are preferably similar to those in the production method of the above-mentioned 1,3-cyclohexadiene polymer.

Specific procedures for obtaining a random copolymer include, for example, continuously supplying ethylene gas into a solution (preferably a toluene solution) containing 1,3-cyclohexadiene, and adding the catalyst composition of the present invention into the solution.

A block copolymer can be obtained, for example, by: adding the catalyst composition of the present invention into a solution containing 1,3-cyclohexadiene to polymerize the 1,3-cyclohexadiene; and supplying ethylene gas into the solvent for polymerization.

An amount of the solvent to be used in a polymerization reaction may be in a ratio of about 20 to 40 ml per 1.0 g of 1,3-cyclohexadiene, but is not particularly limited to the ratio.

An amount of 1,3-cyclohexadiene may be about 100 to 3,000 folds in a molar ratio with respect to a complex (or an ionic compound). There is a tendency that an increase in the amount of 1,3-cyclohexadiene results in a decrease in a molecular weight and an increase in a content of 1,3-cyclohexadiene.

The reaction temperature may be set to about 25° C. By increasing the reaction temperature, a molecular weight of the obtained copolymer may be increased.

A pressure of ethylene gas to be supplied can be arbitrarily adjusted, but only has to be 1 atm in general. Adjustment of the pressure is thought to enable adjustments of a molecular weight of a copolymer and a content of ethylene.

The catalyst composition is preferably added as a solution (preferably a solution containing an active species) which is obtained by a reaction of a complex and an ionic compound in a solvent (preferably toluene) in advance.

In general, the polymerization reaction is completed in about several hours.

After completion of the reaction, a generated copolymer can be precipitated by transferring a reaction mixture into methanol or the like. A 1,3-cyclohexadiene-ethylene copolymer can be obtained by filtrating and drying the precipitated polymer. In a particularly preferable embodiment, the above-mentioned CHD-ET copolymer of the present invention may be produced.

6. Production Method of Copolymer of Ethylene, Substituted or Unsubstituted Styrene, and Norbornenes A copolymer of ethylene, substituted or unsubstituted styrene, and norbornenes can be produced by copolymerization of ethylene, substituted or unsubstituted styrene, and norbornenes by using the catalyst composition of the present invention. The kinds of complex and ionic compound, the relative ratio thereof, and the like in the catalyst composition are preferably similar to those in the production method in the above-mentioned 1,3-cyclohexadiene polymer.

Here, the term "norbornenes" has the same meaning as that of the norbornenes described in the above-mentioned NBE-ET-ST copolymer of the present invention.

Specific procedures for obtaining a random copolymer include, for example, continuously supplying ethylene gas into a solution (preferably a toluene solution) containing norbornenes and a substituted or unsubstituted styrene, and adding the catalyst composition of the present invention into the solution.

An ABC-type block copolymer can be obtained, for example, by: adding the catalyst composition of the present invention into a solution containing one of norbornenes and styrene; polymerizing the one; adding the other one to be polymerized; and supplying ethylene gas.

An amount of the solvent to be used in a polymerization reaction may be in a ratio of about 40 ml per 20.0 mmol of norbornenes, but is not particularly limited to the ratio.

An amount of norbornenes to be used may be about 100 to 3,000 folds in a molar ratio with respect to a complex (or an ionic compound), but is not particularly limited to the ratio.

An amount of styrene to be used may be adjusted depending on a content of styrene structural unit in the copolymer of interest (in the case of high content of styrene structural unit in the copolymer of interest, the amount of styrene may be increased).

A pressure of ethylene gas to be supplied can be arbitrarily adjusted, but only has to be 1 atm in general. Adjustment of the pressure is thought to enable adjustments of a molecular weight of copolymer and a content of ethylene.

The reaction temperature is preferably set to about 25° C. By increasing the reaction temperature, a molecular weight of the obtained copolymer may be increased.

The catalyst composition is preferably added as a solution (preferably a solution containing an active species) which is obtained by a reaction of a complex and an ionic compound in a solvent (preferably toluene) in advance.

In general, the polymerization reaction is completed in about several minutes.

After completion of the reaction, a generated copolymer can be precipitated by adding methanol into a reaction mixture. A copolymer of ethylene, a substituted or unsubstituted styrene, and norbornenes can be obtained by filtrating and drying the precipitated polymer. In a particularly preferable embodiment, the above-mentioned NBE-ET-ST copolymer of the present invention may be produced.

7. Production Method of Copolymer of Dicyclopentadiene and Ethylene

A copolymer of dicyclopentadiene and ethylene can be produced by copolymerization of dicyclopentadiene and ethylene by using the catalyst composition of the present invention. The kinds of complex and ionic compound, the relative ratio thereof, and the like in the catalyst composition are preferably similar to those in the production method in the above-mentioned 1,3-cyclohexadiene polymer.

Specific procedures for obtaining a random copolymer include, for example, continuously supplying ethylene gas into a solution (preferably a toluene solution) containing dicyclopentadiene, and adding the catalyst composition of the present invention into the solution.

A block copolymer can be obtained by: adding the catalyst composition of the present invention into a solution containing dicyclopentadiene; polymerizing the dicyclopentadiene; and supplying ethylene gas for polymerization (block copolymerization).

An amount of the solvent to be used in a polymerization reaction may be in a ratio of about 40 ml per 20.0 mmol of dicyclopentadiene, but is not particularly limited to the ratio.

An amount of dicyclopentadiene to be used may be about 100 to 3,000 folds in a molar ratio with respect to a complex (or an ionic compound). Further, it goes without saying that an increase in an amount of dicyclopentadiene results in a high content of dicyclopentadiene structural unit in the obtained copolymer.

A pressure of ethylene gas to be supplied can be arbitrarily adjusted, but only has to be 1 atm in general. Adjustment of the pressure is thought to enable adjustments of a molecular weight of a copolymer and an content of ethylene.

The catalyst composition is preferably added as a solution (preferably a solution containing an active species) which is obtained by a reaction of a complex and an ionic compound in a solvent (preferably toluene) in advance.

In general, the polymerization reaction is completed in about several minutes.

After completion of the reaction, a generated copolymer can be precipitated by adding methanol or the like into a reaction mixture. A copolymer of dicyclopentadiene and ethylene can be obtained by filtrating and drying the precipitated polymer. In a particularly preferable embodiment, the above-mentioned DCPD-ET copolymer of the present invention may be produced.

8. Production Method of Conjugated Diene-Styrene Copolymer

A conjugated diene-styrene copolymer can be produced by polymerization of one or two or more conjugated diene and one or two or more styrene compounds by using the catalyst composition of the present invention. The kinds of complex and ionic compound, the relative ratio thereof, and the like in the catalyst composition are preferably similar to those in the production method of the above-mentioned styrene polymer or copolymer.

Examples of specific procedures will be shown below, but the procedures are not particularly limited to those examples.

A solution containing the catalyst composition of the present invention is prepared. An example of the solvent of the solution includes toluene. A mixture, which is obtained by adding a styrene compound and conjugated diene, is stirred in the prepared solution to undergo a polymerization reaction. An amount of the solvent to be used in a polymerization reaction is preferably in a ratio of about 1 to 10 ml per 1 ml of monomer mixture. An amount of styrene compound may be about 100 to 2,000 folds in a molar ratio with respect to a complex (or an ionic compound).

A ratio between the styrene compound and conjugated diene (styrene/conjugated diene) is arbitrary, but may be set to 0.5 to 8 in a molar ratio. By adjusting the ratio between the styrene compound and conjugated diene, a content ratio between a styrene structural unit and conjugated diene structural unit in the obtained copolymer can be adjusted.

The reaction temperature is preferably set to about 25° C. The reaction time varies depending on a volume ratio between a styrene compound and conjugated diene compound or the like, which are to be polymerized, but is preferably about 1 to 5 hours. Extension of the reaction time may result in a high ratio of a styrene content of the obtained copolymer.

After completion of the reaction, a generated polymer can be precipitated by: stopping the polymerization reaction by addition of methanol to a reaction mixture; and transferring the reaction mixture into methanol. A conjugated diene-styrene copolymer can be obtained by filtrating and drying the precipitated polymer.

EXAMPLES

Hereinafter, the present invention will be described in more detail with reference to examples and reference examples. However, the scope of the present invention is not limited by those examples. Note that the measurement of $^{13}$C-NMR was performed at frequency of 75.5 MHz.

Reference Example (Synthesis of Metallocene Complex)

Synthesis was performed according to the method described in the following literatures (1) and (2).

(1) Tardif, O.; Nishiura, M.; Hou, Z. M. Organometallics 22, 1171, (2003).

(2) Hultzsch, K. C.; Spaniol, T. P.; Okuda, J. Angew. Chem. Int. Ed, 38, 227, (1999).

1. Synthesis of $(C_5Me_4SiMe_3)Sc(CH_2SiMe_3)_2(THF)$ $ScCl_3$ and $LiCH_2SiMe_3$ were reacted with each other in a ratio of 1:3 in THF, and a solution (10 ml) of $Sc(CH_2SiMe_3)_3$ (1.366 g, 3.03 mmol) in hexane was prepared from the reaction product. $C_5Me_4H(SiMe_3)$ (0.589 g, 3.03 mmol) was added to the prepared solution at room temperature. The obtained pale yellow solution was stirred at room temperature for two hours.

After the stirring, the resultant solution was concentrated under reduced pressure, and the obtained residual oil was cooled at −30° C. overnight, to thereby obtain $(C_5Me_4SiMe_3)Sc(CH_2SiMe_3)_2(THF)$ (1.145 g, 2.36 mmol, 78% yield) as a colorless cubic crystal.

Physical property data of $(C_5Me_4SiMe_3)Sc(CH_2SiMe_3)_2$ (THF) will be shown below.

$^1$H-NMR ($C_6D_6$, 22° C.): δ (ppm) −0.30 (d, 2H, $CH_2SiMe_3$, $J_{H-H}$=11.5 Hz), −0.25 (d, 2H, $CH_2SiMe_3$, $J_{H-H}$=11.5 Hz) 0.29 (s, 18H, $CH_2SiMe_3$), 0.43 (s, 9H, $C_5Me_4SiMe_3$), 1.19 (m, 4H, THF-b-$CH_2$), 1.91 (s, 6H, $C_5Me_4$), 2.22 (s, 6H, $C_5Me_4$), 3.63 (m, 4H, THF-a-$CH_2$).

$^{13}$C-NMR ($C_6D_6$, 22° C.): δ (ppm) 2.83 (s, 3C, $C_5Me_4SiMe_3$), 4.62 (s, 6C, $CH_2SiMe_3$), 12.12 (s, 2C, $C_5Me_4$), 15.43 (s, 2C, $C_5Me_4$), 24.93 (s, 2C, THF), 40.41 (s, 1C, $CH_2SiMe_3$), 71.51 (s, 2C, THF), 116.64 (s, 1C, ipso-$C_5$ (SiMe$_3$)Me$_4$, 124.15 (s, 2C, $C_5Me_4$), 127.96 (s, 2C, $C_5Me_4$).

IR (nujol): 628 (s), 672 (s), 713 (s), 755 (s), 819 (s), 851 (s), 889 (s), 1013 (s), 1038 (m), 1131 (m), 1175 (w), 1238 (s), 1247 (s), 1280 (w), 1328 (s), 1344 (m), 1407 (w).

Anal. Calcd for $C_{24}H_{51}OScSi_3$: C, 59.45; H, 10.60. Found: C, 58.54; H, 10.41.

2. Synthesis of $(C_5Me_4SiMe_3)Ln(CH_2SiMe_3)_2(THF)$ (Ln=Y, Gd, Ho, and Lu)

Synthesis was performed in the same manner as that in the above-mentioned $(C_5Me_4SiMe_3)Sc(CH_2SiMe_3)_2(THF)$.

3. Synthesis of $(C_5Me_5)Sc(CH_2C_6H_4NMe_2\text{-}o)_2$

To a solution (10 ml) of $Sc(CH_2C_6H_4NMe_2\text{-}o)_3$ (1.323 g, 3 mmol) in THF, pentamethylcyclopentadiene (409 mg, 3 mmol) was added. The solution was stirred at 70° C. for 12 hours and then concentrated under reduced pressure to obtain a yellow powder. The obtained yellow powder was washed with hexane, and recrystallized from benzene, to thereby obtain $(C_5Me_5)Sc(CH_2C_6H_4NMe_2\text{-}o)_2$ (538 mg, 40% yield) as a yellow crystal.

Physical property data of $(C_5Me_5)Sc(CH_2C_6H_4NMe_2\text{-}o)_2$ will be shown below.

$^1$H-NMR ($C_6D_6$, 60° C.): δ (ppm) 7.13 (d, J=7.3 Hz, 2H, aryl), 6.99 (t, J=7.4 Hz, 2H, aryl), 6.71 to 6.83 (m, 4H, aryl), 2.35 (s, 12H, $NMe_2$), 1.73 (s, 15H, $C_5Me_5$), 1.47 (s, 4H, $CH_2$)

$^{13}$C-NMR ($C_6D_6$, 60° C.): δ (ppm) 11.8 (CpMe), 45.5 (br $NMe_2$), 47.3 ($CH_2$), 117.1, 119.6, 120.9, 126.5, 130.7, 145.7, 147.7 (aromatic and Cp ring carbons).

Anal. Calcd for $C_{28}H_{39}ScN_2$: C, 74.97; H, 8.76; N, 6.24. Found: C, 74.89; H, 8.67; N, 6.19.

Example 1

Production of Styrene Polymer

To a 100 ml-glass reaction vessel, a solution (5 ml) of $(C_5Me_4SiMe_3)Sc(CH_2SiMe_3)_2(THF)$ (10 mg, 21 μmol) in toluene and a solution (7 ml) of $[Ph_3C][B(C_6F_5)_4]$(19 mg, 21 μmol) in toluene were successively added. After one minute, styrene (2.148 g, 21 mmol) was added to the obtained solution while the solution was vigorously stirred (stirred by a magnetic stirrer). Viscosity of the solution increased in several seconds to stop the stirring. The reaction mixture was poured into methanol (400 ml) to precipitate a polymer. The polymer of a white powder was filtrated, and dried at 60° C. under reduced pressure, to thereby obtain 2.14 g (constant weight) (100%) of polymer.

Examples 2 to 9

Production of Styrene Polymer (1) Example 2: polystyrene was obtained by the same method as that of Example 1 except that the amount of styrene was changed to 10.5 mmol.

(2) Example 3: polystyrene was obtained by the same method as that of Example 1 except that the amount of styrene was changed to 14.7 mmol.

(3) Example 4: polystyrene was obtained by the same method as that of Example 1 except that the amount of styrene was changed to 31.5 mmol.

(4) Example 5: polystyrene was obtained by the same method as that of Example 1 except that the amount of styrene was changed to 42.0 mmol.

(5) Example 6: polystyrene was obtained by the same method as that of Example 1 except that the amount of styrene was changed to 52.5 mmol.

(6) Example 7: polystyrene was obtained by the same method as that of Example 1 except that: the complex was changed to $(C_5Me_4SiMe_3)Y(CH_2SiMe_3)_2(THF)$ (21 μmol); the amount of styrene was changed to 2.1 mmol; and the reaction time was changed to 30 minutes.

(7) Example 8: polystyrene was obtained by the same method as that of Example 7 except that the complex was changed to $(C_5Me_4SiMe_3)Gd(CH_2SiMe_3)_2(THF)$ (21 μmol).

(8) Example 9: polystyrene was obtained by the same method as that of Example 7 except that the complex was changed to $(C_5Me_4SiMe_3)Lu(CH_2SiMe_3)_2(THF)$ (21 μmol).

(9) Example 10: to a 100 ml-flask, a solution (50 ml) of $(C_5Me_5)Sc(CH_2C_6H_4NMe_2\text{-}o)_2$ (11 mg, 0.025 mmol) in toluene and a solution (7 ml) of $[Ph_3C][B(C_6F_5)_4]$ (23 mg, 0.025 mmol) in toluene were successively added. After 10 minutes, styrene (10.415 g, 100 mmol) was added to the obtained solution while the solution was vigorously stirred. Viscosity of the reaction solution increased in several minutes to stop the stirring.

The reaction mixture was poured into methanol (400 ml) to precipitate a polymer of a white powder. The filtrated precipitate was dried at 60° C. under reduced pressure to obtain a polymer (10.42 g, 100%).

(10) Comparative Example 1: An experiment was performed by the same method as that of Example 1 except that the complex was changed to $(C_5Me_4SiMe_2CH_2PPh_2)Y(CH_2SiMe_3)_2(THF)$ (21 μmol), but polystyrene was not obtained.

Table 1 provides a summary of the production methods of Examples 1 to 10 and the physical properties of the styrene polymers obtained by the methods.

TABLE 1

| Example No | Central metal | Styrene/Complex (molar ratio) | Reaction time | Yield (%) | Activity | Syndiotactic polystyrene | Number average molecular weight (×10⁻⁴) | Molecular weight distribution | Melting point (° C.) |
|---|---|---|---|---|---|---|---|---|---|
| 2 | Sc | 500 | <1 min | 100 | ≥3125 | 100% | 8.85 | 1.38 | 271 |
| 3 | Sc | 700 | <1 min | 100 | ≥4376 | 100% | 11.96 | 1.29 | 271 |
| 1 | Sc | 1000 | <1 min | 100 | ≥6034 | 100% | 13.55 | 1.45 | 272 |
| 4 | Sc | 1500 | <1 min | 100 | ≥9362 | 100% | 18.96 | 1.55 | 271 |
| 5 | Sc | 2000 | <1 min | 100 | ≥12498 | 100% | 26.94 | 1.36 | 272 |
| 6 | Sc | 2500 | <1 min | 87.2 | 13618 | 100% | 37.86 | 1.37 | 272 |
| 7 | Y | 100 | 30 min | 60.3 | 13 | 100% | 1.07 | 1.39 | 269 |
| 8 | Gd | 100 | 30 min | 69.1 | 15 | 100% | 0.92 | 1.35 | 269 |
| 9 | Lu | 100 | 30 min | 25.2 | 6 | 100% | 0.49 | 1.38 | 268 |
| 10 | Sc | 4000 | 10 min | 100 | 2510 | 100% | 115 | 1.54 | 271 |

In Table 1:
1. the yield was calculated from (mass of obtained styrene polymer)/(mass of used styrene monomer);
2. the activity is represented by weight of polymer in kg, which is produced by a reaction for 1 hour using 1 mol of complex;
3. the content of syndiotactic polystyrene was calculated from (mass of insoluble polymer in 2-butanone being refluxed)/(mass of all obtained polymer); and syndiotacticity of each of the polystyrene was 99% or more in terms of a pentad indication (rrrr) from NMR spectrum data (an NMR measurement solvent was 1,2-dichlorobenzene-$d_4$, and the measurement temperature was set to 130° C.);
4. the number average molecular weight and the molecular weight distribution were each determined by a GPC method (the measurement was at 145° C. performed by using polystyrene as a reference material and 1,2-dichlorobenzen as an eluate); and
5. the melting point was measured by a DSC method.

As shown in Table 1, syndiotacticity of each of the polystyrene polymers obtained in Examples 1 to 10 was 100%. Further, from the fact that each of Mw/Mn, which is an index of a molecular weight distribution of the obtained styrene polymer, was 1.55 or less, the distribution was found to be narrow.

Further, it was found that adjustment of a ratio between styrene monomer and complex allows adjustment of the molecular weight.

As described above, syndiotacticity (pentad) of the styrene polymer of the present invention can be determined from $^{13}$C-NMR spectrum. Specifically, the syndiotacticity can be determined from an integration ratio of a peak to be attributed to aromatic C1 carbon, or a peak to be attributed to polystyrene main chain carbon.

For example, FIG. 1 shows a $^{13}$C-NMR spectrum chart of the styrene polymer obtained in Example 1, and from the figure, it is found that a peak of c (at about 145 ppm) to be attributed to aromatic C1 carbon of racemic pentad is extremely sharp and has syndiotacticity of almost 100 rrrr %. Further, it is found that peaks of a and b each of which is to be attributed to polystyrene main chain carbon of racemic pentad are also extremely sharp and have syndiotacticity of almost 100 rrrr %.

Example 11

Production of Ethylene-Styrene Copolymer or the Like

In a glove box, to a two-necked, 250 ml-glass-made reaction vessel provided with a stirrer bar, toluene (35 ml) and styrene (2.148 g, 21 mmol) were added. The glass-made reaction vessel was taken out of the glove box and connected to a Schlenk line. The temperature of the reaction vessel was kept to 25° C. by using a water bath.

Ethylene gas (1 atm) was continuously supplied into the reaction vessel while a mixture in the reaction vessel was rapidly stirred.

On the other hand, $(C_5Me_4SiMe_3)Sc(CH_2SiMe_3)_2(THF)$ (10 mg, 21 μmol) and $[Ph_3C][B(C_6F_5)_4]$ (19 mg, 21 μmol) were reacted with each other in a toluene solution (15 ml) to generate a predetermined amount of active species in the system. The obtained solution was rapidly added to the reaction vessel by syringe to initiate polymerization.

After two minutes, methanol was added to the reaction vessel to terminate the polymerization reaction, and the reaction mixture was poured into methanol (400 ml) to precipitate a polymer. The precipitated polymer was filtrated, and dried at 60° C. under reduced pressure, to thereby obtain 0.79 g (constant weight) of polymer.

Examples 12 to 16

Production of Ethylene-Styrene Copolymer (Random Copolymer) or the Like (1) Example 12: an ethylene-styrene copolymer was obtained by the same method as that of Example 11 except that the amount of styrene was changed to 10 mmol.

(2) Example 13: an ethylene-styrene copolymer was obtained by the same method as that of Example 11 except that the amount of styrene was changed to 31 mmol.

(3) Example 14: an ethylene-styrene copolymer was obtained by the same method as that of Example 11 except that the amount of styrene was changed to 41 mmol.

(4) Example 15: a styrene copolymer was obtained by the same method as that of Example 11 except that supply of ethylene was stopped.

(5) Example 16: an ethylene copolymer was obtained by the same method as that of Example 11 except that the amount of styrene was changed to 0 mmol.

Table 2 provides a summary of the production methods of polymers of Examples 11 to 16 and the physical properties of the polymers obtained by the methods.

TABLE 2

| Example No | Styrene (mmol) | Ethylene (atm) | Yield (g) | Activity | Content of styrene (mol %) | Syndiotacticity (r %) | Number average molecular weight (×10⁻⁴) | Molecular weight distribution (Mw/Mn) | Melting point (° C.) |
|---|---|---|---|---|---|---|---|---|---|
| 16 | 0 | 1 | 0.55 | 786 | 0 |  | 17.23 | 1.72 | 127 |
| 15 | 21 | 0 | 0.45 | 643 | 100 |  | 6.04 | 1.41 | 268 |
| 12 | 10 | 1 | 0.40 | 600 | 9 | >98 | 7.92 | 1.14 | — |
| 11 | 21 | 1 | 0.79 | 1123 | 56 | >98 | 11.13 | 1.19 | 214 |
| 13 | 31 | 1 | 0.92 | 1314 | 68 | >98 | 16.26 | 1.17 | 233 |
| 14 | 41 | 1 | 1.62 | 2314 | 91 | >98 | 15.09 | 1.26 | 245 |

In Table 2:
1. the activity is represented by weight of polymer in kg, the polymer being produced by reaction for 1 hour using 1 mol of complex;
2. the content of polystyrene was determined from $^{13}$C-NMR spectrum data (an NMR measurement solvent was 1,2-dichlorobenzene-d$_4$, and the measurement temperature was set to 130° C.);
3. the number average molecular weight and the molecular weight distribution (Mw/Mn) were each determined by a GPC method (the measurement was performed at 145° C. by using polystyrene as a reference material and 1,2-dichlorobenzen as an eluate); and
4. the melting point was measured by a DSC method.

As described above, syndiotacticity (diad r %) of the ethylene-styrene copolymer of the present invention can be determined from $^{13}$C-NMR spectrum.

Figure 2:
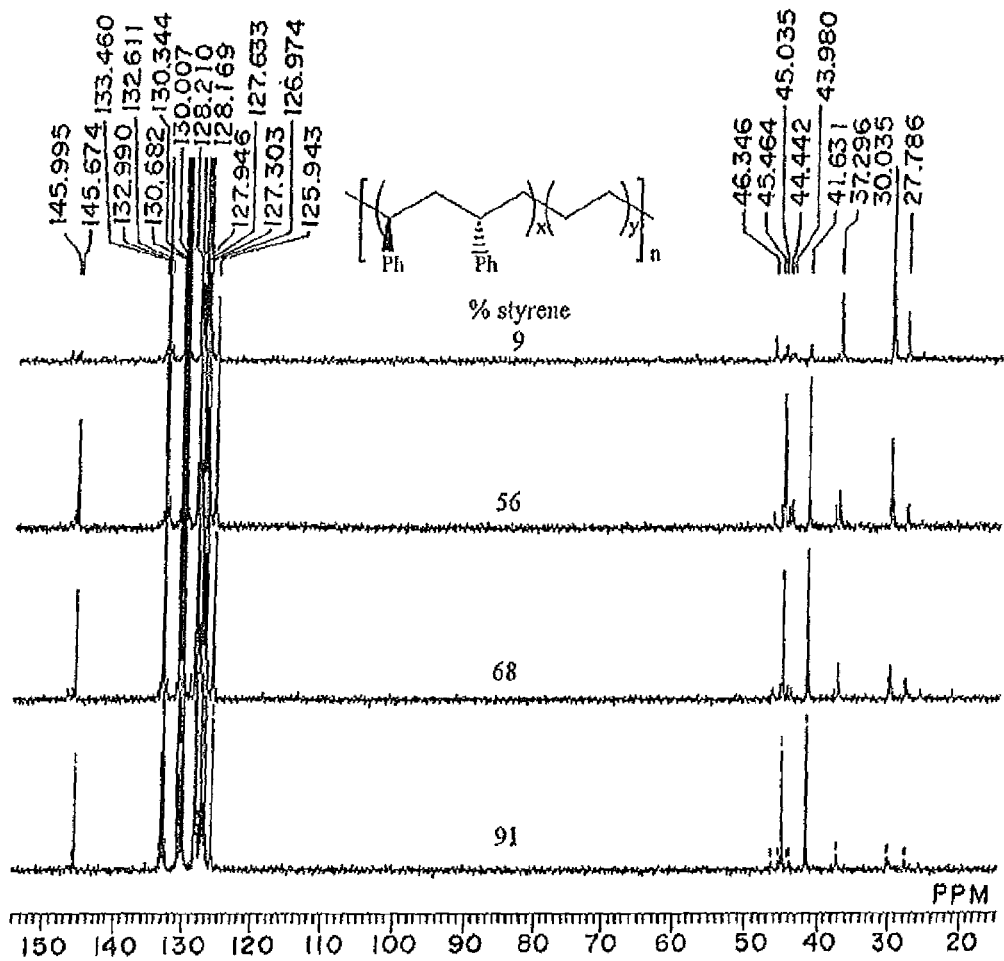
FIG. 2 shows $^{13}$C-NMR spectrum charts of an ethylene-styrene random copolymer of the present invention.
Figure 3:
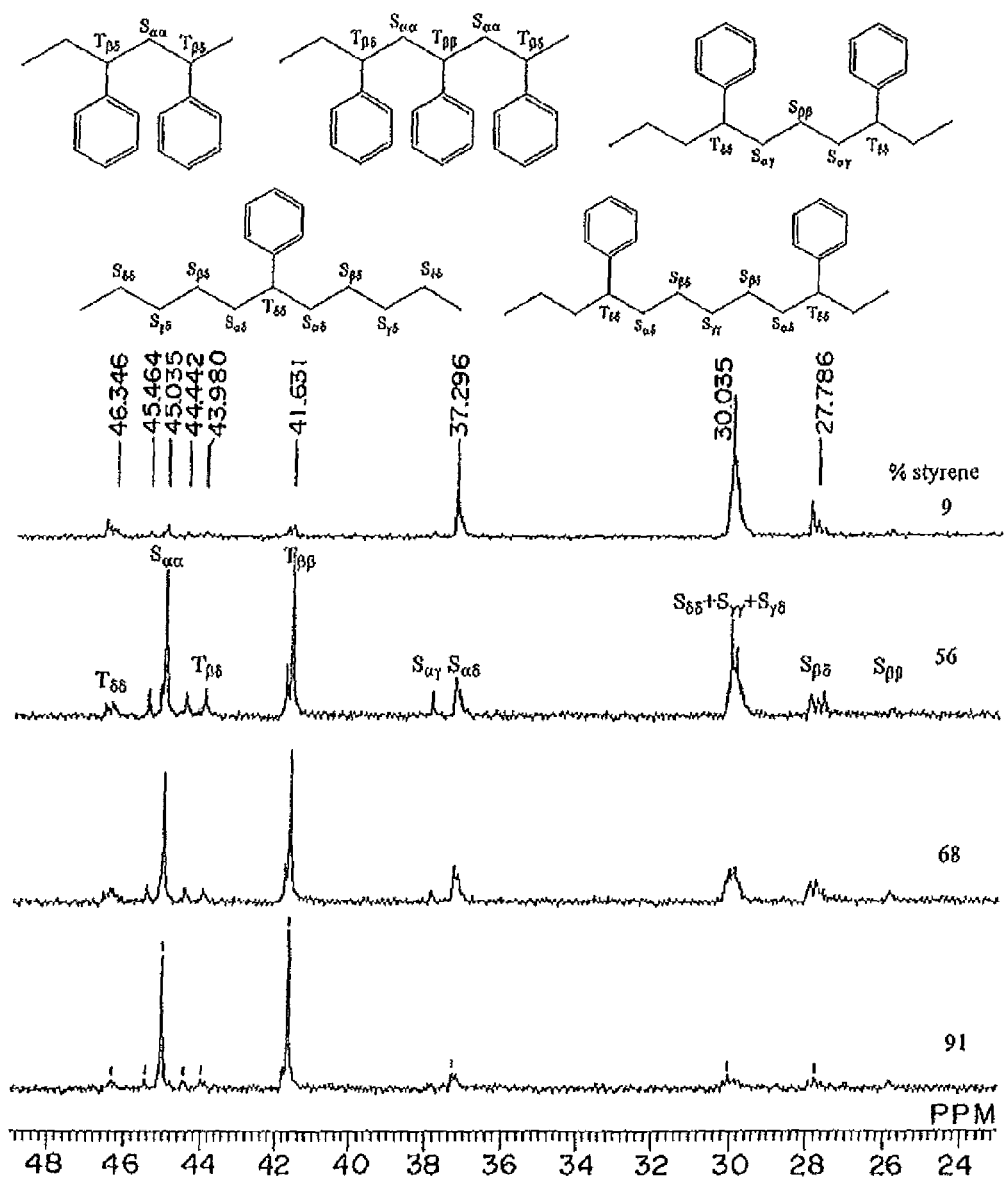
FIG. 3 shows enlarged parts of the spectrum charts of FIG. 2.

FIGS. 2 and 3 show $^{13}$C-NMR spectrum chars of ethylene-styrene copolymers of Examples 11 to 14, and an enlarged part (about 24 to 48 ppm) of FIG. 2, respectively.

All peaks observed in a range of about 145.6 to 146.2 ppm are attributed to racemic diad (r), so it is found that the copolymer has syndiotacticity of almost 100%.

Example 17

Production of Ethylene-Styrene Copolymer (Block Copolymer) or the Like

In a glove box, to a 100 ml-two-necked flask provided with a stirrer bar, toluene (35 ml) and styrene (2.148 g, 21 mmol) were added and the resultant solution was stirred. The flask was taken out of the glove box and connected to a Schlenk line. The temperature of the flask was kept to 25° C. by using a water bath and argon gas was supplied thereto.

On the other hand, (C$_5$Me$_4$SiMe$_3$)Sc(CH$_2$SiMe$_3$)$_2$ (THF) (10 mg, 21 µmol) and [Ph$_3$C][B(C$_6$F$_5$)$_4$](19 mg, 21 µmol) were reacted with each other in a toluene solution (15 ml) to generate a predetermined amount of active species in the system. The obtained solution was rapidly added to the reaction vessel by syringe to initiate polymerization.

Two minutes after the initiation of polymerization, ethylene gas (1 atm) was supplied to the reaction vessel for 1 minute.

After that, methanol (2 ml) was added to terminate the polymerization reaction, and the reaction mixture was poured into methanol (400 ml) to precipitate a polymer. The precipitated polymer was filtrated, and dried at 60° C. under reduced pressure, to thereby obtain 1.092 g (constant weight) of a white polymer. Physical properties of the obtained polymer are shown below.

Number average molecular weight: $1.12 \times 10^5$

Molecular weight distribution (Mw/Mn): 1.23

Content of styrene: 82%

Note that, in Example 17, when the reaction was stopped before supply of ethylene gas (in other words, ethylene gas was not supplied), 0.5 g (constant weight) of polymer (styrene sole polymer) was obtained. Physical properties of the polymer are shown below.

Number average molecular weight: $0.60 \times 10^5$

Molecular weight distribution (Mw/Mn): 1.23

Example 18

Production of Isoprene-Styrene Copolymer

To a 100 ml-flask in a glove box, (C$_5$Me$_4$SiMe$_3$)Sc(CH$_2$SiMe$_3$)$_2$ (THF) (10 mg, 21 µmol) and [Ph$_3$C][B(C6F$_5$)$_4$](19 mg, 21 µmol) were added, and toluene (30 ml) was further added. To the obtained solution a mixture of styrene (2.148 g, 21 mmol) and isoprene (1.431 g, 21 mmol) was added, and the whole was subjected to a polymerization reaction at 25° C. After 12 hours, methanol was added to stop the polymerization reaction. The reaction mixture was poured into methanol (200 ml) to precipitate a polymer. The precipitated polymer was filtrated, and dried at 60° C. under reduced pressure, to thereby obtain 1.64 g of isoprene-styrene copolymer.

Examples 19 to 21

Production of Isoprene-Styrene Copolymer

An isoprene-styrene copolymer was obtained in a similar manner as that in Example 18 except that the amounts of styrene and isoprene were changed as shown in the following table.

TABLE 3

| Example | Styrene (mmol) | Isoprene (mmol) | Reaction time (h) | Yield (g) | Content of styrene (%) | Number average molecular weight ($\times 10^{-3}$) | Molecular weight distribution (Mw/Mn) | Syndiotacticity (r %) |
|---|---|---|---|---|---|---|---|---|
| 18 | 21 | 21 | 12 | 1.64 | 25 | 3.91 | 1.84 | 100 |
| 19 | 21 | 7.34 | 2 | 0.36 | 50 | 3.92 | 1.16 | 100 |
| 20 | 37 | 7.34 | 2 | 0.74 | 70 | 6.14 | 1.29 | 100 |
| 21 | 52 | 7.34 | 2 | 0.98 | 86 | 8.62 | 1.28 | 100 |

Syndiotacticity represents a ratio of diad which is a syndiotactic sequence to all two successive units (diad) of styrene unit.

Example 22

Production of Ethylene Polymer

In a glove box, $(C_5Me_4SiMe_3)Sc(CH_2SiMe_3)_2$ (THF) (10 mg, 21 µmol), $[Ph_3C][B(C_6F_5)_4]$ (19 mg, 21 µmol), and toluene (50 ml) were added to a 250 ml-two-necked flask at room temperature. The flask was taken out of the glove box and connected to a Schlenk line. The temperature of the flask was kept to 25° C. by using a water bath.

Figure 4:
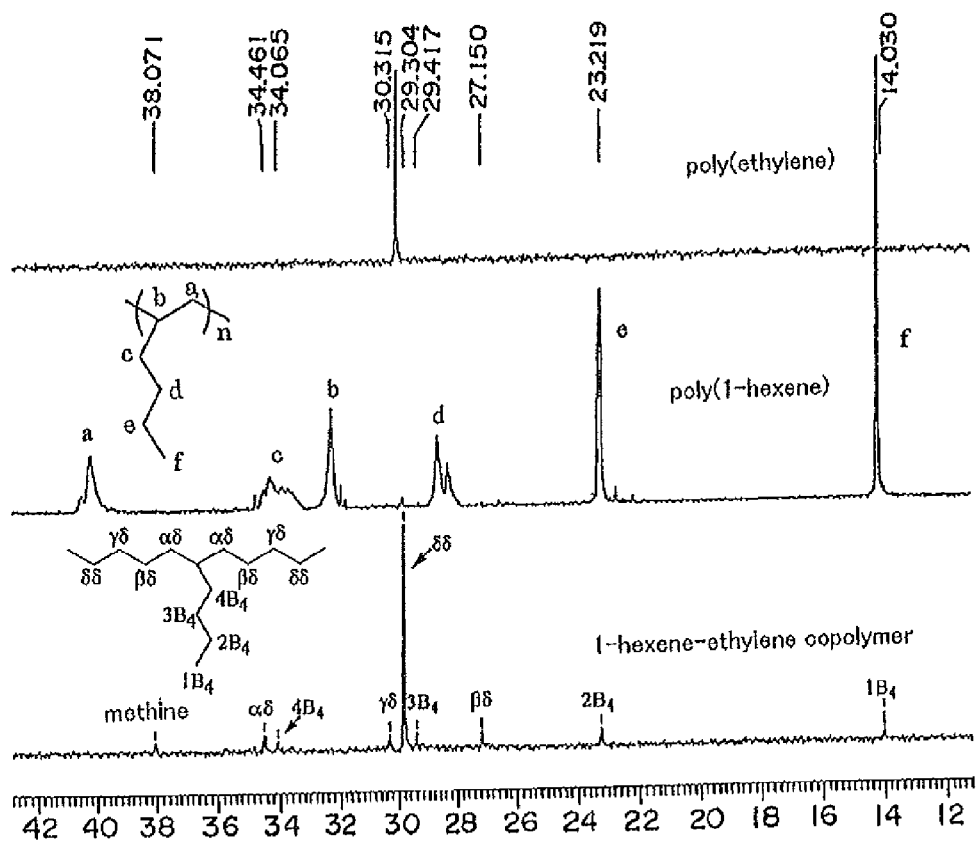
FIG. 4 shows $^{13}$C-NMR spectrum charts of polyethylene, poly(1-hexene), and a 1-hexene-ethylene copolymer, respectively.

Ethylene gas (1 atm) was continuously supplied into the flask while a mixture in the flask was rapidly stirred to cause bubbling and to allow the polymerization reaction to proceed for 10 minutes. After completion of the reaction, the reaction mixture was poured into methanol (400 ml) to precipitate a polymer. The polymer of a white powder was filtrated, and dried at 60° C. under reduced pressure, to thereby obtain 4.39 g (constant weight) of polymer. FIG. 4 shows a $^{13}$C-NMR spectrum chart of the polymer (a measurement solvent was 1,2-dichlorobenzene-$d_4$, and the measurement temperature was set to 130° C.).

Examples 23 to 30

Production of ethylene polymer (1) Example 23: an ethylene polymer was obtained by the same method as that of Example 22 except that the complex was changed to $(C_5Me_4SiMe_3)Gd(CH_2SiMe_3)_2$ (THF)

(2) Example 24: an ethylene polymer was obtained by the same method as that of Example 22 except that the complex was changed to $(C_5Me_4SiMe_3)Y(CH_2SiMe_3)_2$ (THF)

(3) Example 25: an ethylene polymer was obtained by the same method as that of Example 22 except that the complex was changed to $(C5Me_4SiMe_3)Ho(CH_2SiMe_3)_2$ (THF).

(4) Example 26: an ethylene polymer was obtained by the same method as that of Example 22 except that the complex was changed to $(C_5Me_4SiMe_3)Lu(CH_2SiMe_3)_2$ (TF).

(5) Example 27: an ethylene polymer was obtained by the same method as that of Example 22 except that the complex was changed to $(C5Me_4SiMe_3)Er(CH_2SiMe_3)_2$ (THF).

(6) Example 28: an ethylene polymer was obtained by the same method as that of Example 22 except that the complex was changed to $(C_5Me_4SiMe_3)$ Dy $(CH_2SiMe_3)_2$ (THF)

(7) Example 29: an ethylene polymer was obtained by the same method as that of Example 22 except that the complex was changed to $(C_5Me_4SiMe_3)$ Tb $(CH_2SiMe_3)_2$ (THF).

(8) Example 30: an ethylene polymer was obtained by the same method as that of Example 22 except that the complex was changed to $(C_5Me_4SiMe_3)$ Tm $(CH_2SiMe_3)_2$ (THF)

Table 4 provides a summary of the production methods of Examples 22 to 30 and the physical properties of the styrene polymers obtained by the methods.

TABLE 4

| Example No | Central metal | Concentration of complex × $10^4$ mol/L | Yield (g) | Activity (kg/mol · h · atm) | Number average molecular weight $\times 10^{-5}$ | Molecular weight distribution (Mw/Mn) |
|---|---|---|---|---|---|---|
| 22 | Sc | 6.600 | 4.39 | 798 | 2.19 | 2.14 |
| 23 | Gd | 5.024 | 1.65 | 591 | 1.84 | 1.96 |
| 24 | Y | 6.429 | 4.22 | 788 | 3.11 | 1.79 |
| 25 | Ho | 6.613 | 3.95 | 716 | 2.01 | 1.98 |
| 26 | Lu | 6.506 | 0.612 | 226 | 0.96 | 3.40 |
| 27 | Er | 6.588 | 3.98 | 726 | 2.92 | 1.84 |
| 28 | Dy | 6.640 | 3.03 | 553 | 2.65 | 1.85 |
| 29 | Tb | 6.680 | 2.65 | 476 | 2.61 | 1.96 |
| 30 | Tm | 6.570 | 2.26 | 413 | 2.32 | 2.23 |

In Table 4:

1. the activity is represented by weight of polymer in kg, which is produced by a reaction for 1 hour using 1 mol of complex; and 2. the number average molecular weight and the molecular weight distribution (Mw/Mn) were each determined by a GPC method (the measurement was performed at 145° C. by using polystyrene as a reference material and 1,2-dichlorobenzen as an eluate).

As shown in Table 4, the composition of the present invention containing as a central metal a group III metal or a lanthanoid metal can be used as a polymerization catalyst composition.

Example 31

Production of 1-hexene polymer

In a glove box, a solution (5 ml) of $(C_5Me_4SiMe_3)Sc(CH_2SiMe_3)_2$ (THF) (10 mg, 21 µmol) in toluene and a solution (8 ml) of $[Ph_3C][B(C_6F_5)_4]$ (19 mg, 21 µmol) in toluene were added to a 100 ml-glass-made reaction vessel at room temperature.

After several minutes, 1-hexene (1.736 g, 21 mmol) was added to the obtained wine red catalyst solution while the solution was stirred. The polymerization reaction was allowed to proceed for minutes. After completion of the reaction, methanol (70 ml) was added thereto to precipitate an oil-state polymer. The obtained polymer was dried at 60° C. under reduced pressure, to thereby obtain 1.684 g (constant weight) (97%) of polymer. FIG. 4 shows a $^{13}$C-NMR spectrum chart of the polymer (a measurement solvent was 1,2-dichlorobenzene-$d_4$, and the measurement temperature was set to 130° C.).

Examples 32 to 35

Production of 1-hexene Polymer (1) Example 32: a 1-hexene polymer was obtained by the same method as that of Example 31 except that: the reaction temperature was changed to −30° C.; and the reaction time was changed to 60 minutes.

(2) Example 33: a 1-hexene polymer was obtained by the same method as that of Example 31 except that: the amount of 1-hexane was changed to 2.604 g; and the reaction time was changed to 30 minutes.

(3) Example 34: a 1-hexene polymer was obtained by the same method as that of Example 31 except that the complex was changed to $(C_5Me_5)Sc(CH_2SiMe_3)_2$ (THF) (21 μmol).

(4) Example 35: a 1-hexene polymer was obtained by the same method as that of Example 31 except that the complex was changed to $(C_5(SiMe_3)_2H_3)Sc(CH_2SiMe_3)_2$ (THF) (21 μmol).

TABLE 5

| Example No | Ligand of complex Cp* | Molar ratio of hexene/complex | Reaction solvent | Reaction time (minute) | Yield (%) | Number average molecular weight ×10$^{-3}$ | Molecular weight distribution |
|---|---|---|---|---|---|---|---|
| 31 | $C_5Me_4SiMe_3$ | 1000 | Toluene | 15 | 97 | 5.76 | 1.65 |
| 32 | $C_5Me_4SiMe_3$ | 1000 | Toluene | 60 | 73 | 347.2 | 1.46 |
| 33 | $C_5Me_4SiMe_3$ | 1500 | Toluene | 30 | 90 | 5.74 | 1.67 |
| 34 | $C_5Me_5$ | 1000 | Toluene | 15 | 64 | 5.60 | 1.58 |
| 35 | $C_5(SiMe_3)_2H_3$ | 1000 | Toluene | 15 | 26 | 4.84 | 1.51 |

In Table 5:
1. the yield was calculated from (mass of polymer obtained)/(mass of monomer used); and
2. the number average molecular weight and the molecular weight distribution (Mw/Mn) were each calculated by a GPC method (the measurement was performed at 40° C. by using polystyrene as a reference material and THF as an eluate).

Example 36

Production of 1-hexene-ethylene Copolymer

In a glove box, 1-hexene (1.736 g, 21 mmol) and toluene (15 ml) were added to a 250-ml glass-made two-necked flask provided with a stirrer bar. The reaction vessel was taken from the glove box and connected to a Schlenk line. The temperature of the flask was kept to 25° C. by using a water bath, and ethylene gas (1 atm) was supplied thereto to cause bubbling while the content therein was rapidly stirred.

In toluene (15 ml), $(C_5Me_4SiMe_3)Sc(CH_2SiMe_3)_2$ (THF) (10 mg, 21 μmol) and $[Ph_3C][B(C_6F_5)_4]$ (19 mg, 21 μmol) were reacted to each other to generate a predetermined amount of active species in the system. The obtained solution was rapidly added to the above-mentioned solution of hexene-ethylene in toluene by using a syringe to initiate a polymerization reaction. After 5 minutes, methanol was added thereto to terminate the polymerization reaction. The reaction mixture was poured into methanol (400 ml) to precipitate a polymer. The precipitated polymer was filtrated, and dried at 60° C. under reduced pressure, to thereby obtain 1.92 g (constant weight) of polymer. FIG. 4 shows a $^{13}$C-NMR spectrum chart of the polymer (the measurement was performed at 120° C. by using 1,1,2,2-tetrachloroethane-$d_2$ as a measurement solvent).

Examples 37 to 49

Production of 1-hexene-ethylene Copolymer (1) Example 37: a polymer was obtained by the same method as that in Example 36 except that the amount of 1-hexene was changed to 10 mmol.

(2) Example 38: a polymer was obtained by the same method as that in Example 36 except that the amount of 1-hexene was changed to 31 mmol.

(3) Example 39: a polymer was obtained by the same method as that in Example 36 except that the amount of 1-hexene was changed to 41 mmol.

(4) Example 40: a polymer was obtained by the same method as that in Example 36 except that the amount of 1-hexene was changed to 62 mmol.

(5) Example 41: a polymer was obtained by the same method as that in Example 36 except that the reaction time was changed to 3 minutes.

(6) Example 42: a polymer was obtained by the same method as that in Example 36 except that the reaction time was changed to 7 minutes.

(8) Example 43: a polymer was obtained by the same method as that in Example 36 except that the reaction time was changed to minutes.

(9) Example 44: a polymer was obtained by the same method as that in Example 36 except that the reaction time was changed to minutes.

(10) Example 45: a polymer was obtained by the same method as that in Example 36 except that the complex was changed to $(C_5Me_5)Sc(CH_2SiMe_3)_2$ (THF)

(11) Example 46: a polymer was obtained by the same method as that in Example 45 except that: the amount of 1-hexene was changed to 31 mmol; and the reaction time was changed to 3 minutes.

(12) Example 47: a polymer was obtained by the same method as that in Example 45 except that: the amount of 1-hexene was changed to 41 mmol; and the reaction time was changed to 3 minutes.

(13) Example 48: a polymer was obtained by the same method as that in Example 45 except that the amount of 1-hexene was changed to 31 mmol.

(14) Example 49: a polymer was obtained by the same method as that in Example 45 except that and the reaction time was changed to 15 minutes.

FIG. 6 provides a summary of the production methods of Examples 36 to 49 and the physical properties of the copolymers obtained by the methods.

TABLE 6

| Example No | Ligand of complex Cp* | 1-hexene (mmol) | Reaction time (minute) | Yield (g) | Activity (kg/(mol Sc · h)) | Content of 1-hexene (mol %) | polymerization rate of 1-hexene (%) | Number average molecular weight ×10$^{-4}$ | Molecular weight distribution |
|---|---|---|---|---|---|---|---|---|---|
| 37 | C$_5$Me$_4$SiMe$_3$ | 10 | 5 | 1.69 | 965 | 4 | 22 | 6.17 | 3.40 |
| 36 | C$_5$Me$_4$SiMe$_3$ | 21 | 5 | 1.92 | 1098 | 11 | 29 | 2.77 | 2.74 |
| 38 | C$_5$Me$_4$SiMe$_3$ | 31 | 5 | 2.71 | 1547 | 12 | 30 | 2.04 | 2.99 |
| 39 | C$_5$Me$_4$SiMe$_3$ | 41 | 5 | 3.17 | 1810 | 13 | 37 | 2.26 | 2.09 |
| 40 | C$_5$Me$_4$SiMe$_3$ | 62 | 5 | 3.75 | 2145 | 27 | 38 | 1.21 | 2.37 |
| 41 | C$_5$Me$_4$SiMe$_3$ | 21 | 3 | 1.76 | 1676 | 6 | 15 | 1.67 | 3.30 |
| 42 | C$_5$Me$_4$SiMe$_3$ | 21 | 7 | 3.48 | 1420 | 8 | 40 | 2.33 | 3.52 |
| 43 | C$_5$Me$_4$SiMe$_3$ | 21 | 10 | 4.84 | 1383 | 6 | 42 | 5.43 | 4.38 |
| 44 | C$_5$Me$_4$SiMe$_3$ | 21 | 15 | 5.55 | 1057 | 12 | 91 | 6.00 | 3.12 |
| 45 | C$_5$Me$_5$ | 21 | 5 | 0.99 | 565 | 27 | 3 | 18.39 | 1.92 |
| 46 | C$_5$Me$_5$ | 31 | 3 | 1.10 | 1047 | 12 | 12 | 1.95 | 2.37 |
| 47 | C$_5$Me$_5$ | 41 | 3 | 1.32 | 1257 | 10 | 9 | 3.78 | 1.87 |
| 48 | C$_5$Me$_5$ | 31 | 5 | 2.64 | 1510 | 8 | 21 | 4.07 | 2.12 |
| 49 | C$_5$Me$_5$ | 21 | 15 | 2.61 | 498 | 5 | 19 | 14.21 | 2.40 |

In Table 6:
1. the content of 1-hexene was calculated from $^1$H-NMR spectrum (measurement was performed at 120° C. by using 1 μl, 2,2-tetrachloroethane-d$_2$ as a measurement solvent); and
2. the number average molecular weight and the molecular weight distribution (Mw/Mn) were each measured by a GPC method (polystyrene and 1,2-dichlorobenzene were used as a reference material and an eluate, respectively).

Example 50

Production of Copolymer of styrene and p-methylstyrene

In a glove box, (C$_5$Me$_4$SiMe$_3$)Sc(CH$_2$SiMe$_3$)$_2$ (THF) (10 mg, 21 μmol) and [Ph$_3$C][B(C$_6$F$_5$)$_4$](19 mg, 21 μmol) were added to toluene (30 ml) in a 100 ml-reaction vessel. Further, a mixture of styrene (4.076 g, 39 mmol) and 4-methylstyrene (0.243 g, 2 mmol) was added thereto to allow a polymerization reaction at 25° C. After 5 minutes, methanol was added thereto to terminate the polymerization reaction. The reaction mixture was poured into methanol (200 ml) to precipitate a polymer. The precipitated polymer was filtrated, and dried at 60° C. under reduced pressure, to thereby obtain 4.32 g (constant weight) of polymer.

Examples 51 to 58

Production of Copolymer of styrene and p-methylstyrene (1) Example 51: a polymer was obtained by the same method as that in Example 50 except that the molar ratio between styrene and 4-methylstyrene was changed to 90:10 (total molar amount was 41 mmol).

(2) Example 52: a polymer was obtained by the same method as in Example 50 except that the molar ratio between styrene and 4-methylstyrene was changed to 70:30 (total molar amount was 41 mmol).

(3) Example 53: a polymer was obtained by the same method as in Example 50 except that the molar ratio between styrene and 4-methylstyrene was changed to 50:50 (total molar amount was 41 mmol).

(4) Example 54: a polymer was obtained by the same method as in Example 50 except that the molar ratio between styrene and 4-methylstyrene was changed to 30:70 (total molar amount was 41 mmol).

(5) Example 55: a polymer was obtained by the same method as in Example 50 except that the molar ratio between styrene and 4-methylstyrene was changed to 5:95 (total molar amount was 41 mmol).

(6) Example 56: a polymer was obtained by the same method as in Example 50 except that: 4-methylstyrene was changed to 4-t-butylstyrene; and the molar ratio between styrene and 4-t-butylstyrene was changed to 50:50 (total molar amount was 41 mmol).

(7) Example 57: a polymer was obtained by the same method as in Example 56 except that the molar ratio between styrene and 4-t-butylstyrene was changed to 70:30 (total molar amount was 41 mmol).

(8) Example 58: a polymer was obtained by the same method as in Example 56 except that the molar ratio between styrene and 4-t-butylstyrene was changed to 30:70 (total molar amount was 41 mmol).

Table 7 provides a summary of the production methods of Examples 50 to 58 and the physical properties of the copolymers obtained by the methods.

TABLE 7

| Example No | Substituted styrene | Molar ratio of styrene/ substituted styrene | Yield % | Syndiotacticity (rrrr %) | Content of styrene (mol %) | Number average molecular weight ×10$^{-4}$ | Molecular weight distribution |
|---|---|---|---|---|---|---|---|
| 50 | p-Me Styrene | 95/5 | 100 | >98 | 95 | 31.49 | 1.33 |
| 51 | p-Me Styrene | 90/10 | 100 | >98 | 90 | 33.75 | 1.42 |
| 52 | p-Me Styrene | 70/30 | 100 | >98 | 70 | 28.99 | 1.39 |
| 53 | p-Me Styrene | 50/50 | 100 | >98 | 50 | 29.69 | 1.35 |

TABLE 7-continued

| Example No | Substituted styrene | Molar ratio of styrene/ substituted styrene | Yield % | Syndiotacticity (rrrr %) | Content of styrene (mol %) | Number average molecular weight ×10$^{-4}$ | Molecular weight distribution |
|---|---|---|---|---|---|---|---|
| 54 | p-Me Styrene | 30/70 | 100 | >98 | 30 | 30.84 | 1.36 |
| 55 | p-Me Styrene | 5/95 | 97 | >98 | 5 | 28.71 | 1.56 |
| 56 | p-Bu$^t$ Styrene | 50/50 | 99 | >98 | 50 | 25.54 | 1.49 |
| 57 | p-Bu$^t$ Styrene | 70/30 | 99 | >98 | 70 | 29.37 | 1.65 |
| 58 | p-Bu$^t$ Styrene | 30/70 | 100 | >98 | 30 | 29.41 | 1.38 |

In Table 7:

1. the yield was calculated from (mass of polymer obtained/mass of monomer used);

2. the content of styrene was calculated from $^{13}$C-NMR spectrum and $^1$H-NMR spectrum (measurement was performed at 130° C. by using 1,2-dichlorobenzene as a measurement solvent);

3. the number average molecular weight and the molecular weight distribution (Mw/Mn) were each measured by a GPC method (the measurement was performed by using polystyrene as a reference material and 1,2-dichlorobenzene as an eluate); and 4. the syndiotacticity was determined from $^{13}$C-NMR spectrum.

Example 59

Production of Copolymer of ethylene and norbornene

In a glove box, to a two-necked flask provided with a dropping funnel, which contains 2 ml of a solution (21 ml) of (C$_5$Me$_4$SiMe$_3$) Sc (CH$_2$SiMe$_3$)$_2$ (THF) (10 mg, 21 µmol) in toluene and toluene (8 ml), a solution (15 ml) of norbornene (1.88 g, 20.0 mmol) in toluene, 2 ml of a solution (21 ml) of [Ph$_3$C][B(C$_6$F$_5$)$_4$](19 mg, 21 µmol) in toluene, and toluene (13 ml) were added (total volume of toluene was 40 ml).

The flask was taken out of the glove box, set in a water bath (25° C.), and connected to each of a Schlenk line, ethylene gas supply line, and a mercury-sealed stopper. The solution in the dropping funnel was dropped to the flask with supply of ethylene gas. After dropping, a polymerization reaction was allowed to proceed for 5 minutes and then methanol (25 ml) was added thereto to terminate the polymerization reaction.

The precipitated polymer was filtrated and washed with methanol. The resultant polymer was dried at 60° C. under reduced pressure for 24 hours. The obtained crude product was extracted by toluene at room temperature, to thereby obtain 0.67 g of ethylene-norbornene alternate copolymer.

Examples 60 to 74

Production of Copolymer of ethylene and norbornene (1) Example 60: a polymer was obtained by the same method as that in Example 59 except that the complex was changed to {1,3-(SiMe$_3$)$_2$C$_5$H$_3$}Sc(CH$_2$SiMe$_3$)$_2$ (THF).

(2) Example 61: a polymer was obtained by the same method as that in Example 59 except that the reaction temperature was changed to 0° C.

(3) Example 62: a polymer was obtained by the same method as that in Example 59 except that the reaction temperature was changed to 50° C.

(4) Example 63: a polymer was obtained by the same method as that in Example 59 except that the reaction temperature was changed to 70° C.

(5) Example 64: a polymer was obtained by the same method as that in Example 59 except that the total volume of toluene was adjusted to 60 ml.

(6) Example 65: a polymer was obtained by the same method as that in Example 59 except that the total volume of toluene was adjusted to 20 ml.

(7) Example 66: a polymer was obtained by the same method as that in Example 59 except that the total volume of toluene was adjusted to 10 ml.

Figure 5:
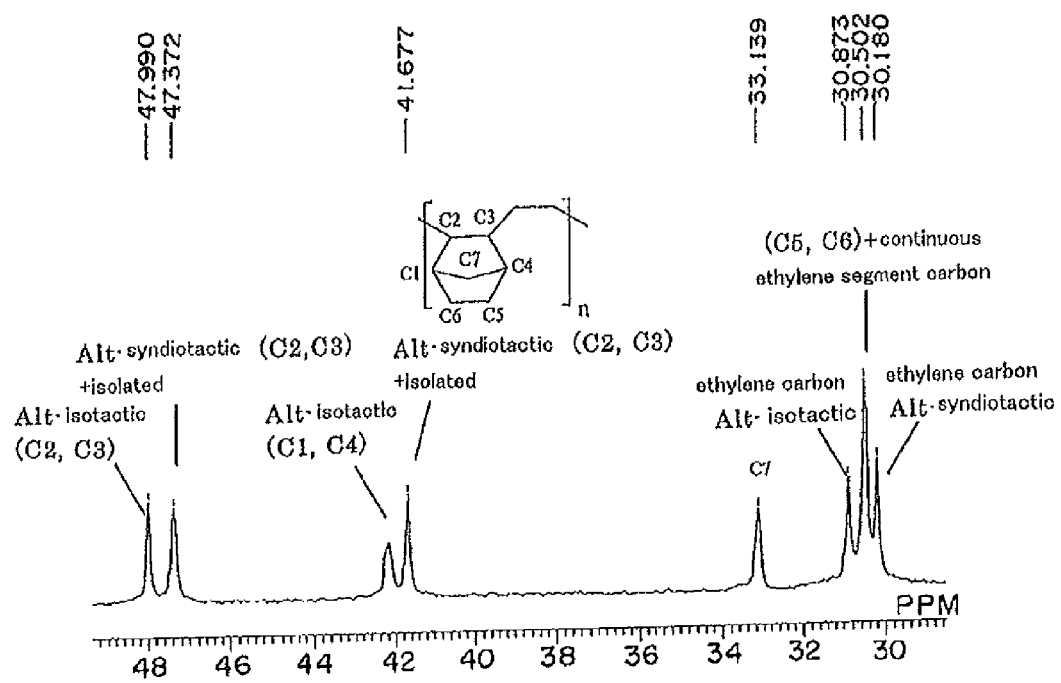
FIG. 5 is a $^{13}$C-NMR spectrum chart of an ethylene-norbornene copolymer.

(8) Example 67: a polymer was obtained by the same method as that in Example 59 except that the amount of norbornene was changed to 2.82 g. FIG. 5 shows a $^{13}$C-NMR spectrum chart of the polymer (the measurement was performed at 130° C. by using 1,2-dichlorobenzene-d$_4$ as a measurement solvent).

(9) Example 68: a polymer was obtained by the same method as that in Example 59 except that the amount of norbornene was changed to 3.76 g.

(10) Example 69: a polymer was obtained by the same method as that in Example 59 except that the reaction time was changed to 1 minute.

(11) Example 70: a polymer was obtained by the same method as that in Example 59 except that the reaction time was changed to 3 minutes.

(12) Example 71: a polymer was obtained by the same method as that in Example 59 except that the reaction time was changed to 15 minutes.

(13) Example 72: a polymer was obtained by the same method as that in Example 59 except that the reaction time was changed to 30 minutes.

(14) Example 73: a polymer was obtained by the same method as that in Example 59 except that the amount of [Ph$_3$C][B(C$_6$F$_5$)$_4$] to be used was changed to 0.

(15) Example 74: a polymer was obtained by the same method as that in Example 59 except that the amount of (C$_5$Me$_4$SiMe$_3$)Sc(CH$_2$SiMe$_3$)$_2$ (THF) to be used was changed to 0.

Table 8 provides a summary of the production methods of Examples 59 to 74 and the physical properties and the like of the polymers obtained by the methods. NB represents a norbornene. The numeral "1" in the column of catalyst composition represents (C$_5$Me$_4$SiMe$_3$)Sc(CH$_2$SiMe$_3$)$_2$ (THF), and the numeral "2" represents {1,3-(SiMe$_3$)$_2$C$_5$H$_3$}Sc (CH$_2$SiMe$_3$)$_2$ (THF).

TABLE 8

| Example No | Catalyst composition | Reaction temperature (°C.) | Reaction volume (mL) | NB (g) | Reaction time (min) | Yield (g) | Activity | Content of NB (mol %) | Number average molecular weight (×10$^{-4}$) | Molecular weight distribution | Melting point (°C.) |
|---|---|---|---|---|---|---|---|---|---|---|---|
| 73 | 1 | 25 | 40 | 1.88 | 5 | trace | — | — | — | — | — |
| 74 | borate | 25 | 40 | 1.88 | 5 | — | — | — | — | — | — |
| 59 | 1/borate | 25 | 40 | 1.88 | 5 | 0.67 | 8 | 41.2 | 11 | 1.79 | 126 |
| 60 | 2/borate | 25 | 40 | 1.88 | 5 | 0.47 | 5.6 | 36.1 | 4.9 | 1.89 | 105 |
| 61 | 1/borate | 0 | 40 | 1.88 | 5 | 0.35 | 4.2 | 35.7 | 12.1 | 1.49 | 104 |
| 62 | 1/borate | 50 | 40 | 1.88 | 5 | 0.81 | 9.7 | 42.5 | 8 | 1.81 | 119 |
| 63 | 1/borate | 70 | 40 | 1.88 | 5 | 0.97 | 11.6 | 43.2 | 4 | 2.33 | 127 |
| 64 | 1/borate | 25 | 60 | 1.88 | 5 | 0.62 | 7.4 | 35.8 | 15.4 | 1.65 | 105 |
| 65 | 1/borate | 25 | 20 | 1.88 | 5 | 1.29 | 15.5 | 46.4 | 6.5 | 1.92 | 134 |
| 66 | 1/borate | 25 | 10 | 1.88 | 5 | 0.37 | 4.4 | 48.1 | 3.2 | 2.08 | 128 |
| 67 | 1/borate | 25 | 40 | 2.82 | 5 | 2.1 | 25.2 | 44.2 | 8.5 | 2.19 | 108 |
| 68 | 1/borate | 25 | 40 | 3.76 | 5 | 0.31 | 3.7 | 45.5 | 7.4 | 1.8 | 120 |
| 69 | 1/borate | 25 | 40 | 1.88 | 1 | 0.4 | 24 | 45.2 | 7 | 1.62 | 130 |
| 70 | 1/borate | 25 | 40 | 1.88 | 3 | 0.57 | 11.4 | 44.8 | 8.2 | 1.74 | 129 |
| 71 | 1/borate | 25 | 40 | 1.88 | 15 | 0.99 | 4 | 37.7 | 5.5 | 2.41 | 118 |
| 72 | 1/borate | 25 | 40 | 1.88 | 30 | 1.2 | 2.4 | 36.4 | 4.6 | 2.62 | 109 |

In Table 8:
1. the activity is represented by weight of polymer in kg, which is produced by a reaction for 1 hour using 1 mol of complex;
2. the number average molecular weight and the molecular weight distribution (Mw/Mn) were each measured by a GPC method (polystyrene was used as a reference material); and
3. the melting point was measured by a DSC method.

Note that all the polymers obtained in Examples 59 to 72 were ethylene-norbornene alternate copolymers.

Example 75

Stereospecific Polymerization Reaction of 1,3-cyclohexadiene

In a glove box, a solution (3 ml) of [Ph$_3$C][B(C$_6$F$_5$)$_4$](37 mg, 40 μmol) in toluene was added to a solution (2 ml) of (C$_5$Me$_4$SiMe$_3$) Sc (CH$_2$SiMe$_3$)$_2$ (THF) (19 mg, 40 μmol) in toluene in a 100-ml flask. The obtained mixture was stirred at room temperature for several minutes, and then 1,3-cyclohexadiene (0.8 g, 10 mmol) was added to the mixture while the solution was vigorously stirred. After 3 hours, the flask was taken out of the glove box, and methanol was added to the flask to stop the polymerization. The obtained reaction mixture was poured into methanol (200 ml), and the precipitated white polymer powder was filtrated. The filtrated powder was dried at 60° C. under reduced pressure, to thereby obtain 0.44 g (55%) of polymer product. The obtained product was dissolved in dichlorobenzene at 120° C.

Examples 76 to 82

Stereospecific Polymerization Reaction of 1,3-cyclohexadiene (1) Example 76: 0.16 g (24%) of polymer product was obtained by the same method as that in Example 75 except that [Ph(Me)$_2$NH][B(C$_6$F$_5$)$_4$](32 mg, 40 μmol) was used instead of [Ph$_3$C][B(C$_6$F$_5$)$_4$](37 mg, 40 μmol). The obtained product was dissolved in dichlorobenzene at 120° C.

(2) Example 77: 0.34 g (43%) of polymer product was obtained by the same method as that in Example 75 except that (C$_5$Me$_5$) Sc(CH$_2$SiMe$_3$)$_2$ (THF) (17 mg, 40 μmol) was used instead of (C$_5$Me$_4$SiMe$_3$)Sc(CH$_2$SiMe$_3$)$_2$ (THF) (19 mg, 40 μmol). The obtained product was dissolved in dichlorobenzene at 120° C.

(3) Example 78: 0.30 g (38%) of polymer product was obtained by the same method as that in Example 75 except that (C$_5$Me$_4$SiMe$_3$)Y(CH$_2$SiMe$_3$)$_2$ (THF) (21 mg, 40 μmol) was used instead of (C$_5$Me$_4$SiMe$_3$)Sc(CH$_2$SiMe$_3$)$_2$ (THF) (19 mg, 40 μmol). The obtained product was dissolved in dichlorobenzene at 120° C.

(4) Example 79: 0.29 g (36%) of polymer product was obtained by the same method as that in Example 75 except that (C$_5$Me$_4$SiMe$_3$)Lu(CH$_2$SiMe$_3$)$_2$ (THF) (25 mg, 40 μmol) was used instead of (C$_5$Me$_4$SiMe$_3$)Sc(CH$_2$SiMe$_3$)$_2$ (THF) (19 mg, 40 μmol). The obtained product was dissolved in dichlorobenzene at 120° C.

(5) Example 80: 0.39 g (49%) of polymer product was obtained by the same method as that in Example 75 except that (C$_5$Me$_4$SiMe$_3$)Dy(CH$_2$SiMe$_3$)$_2$ (THF) (24 mg, 40 μmol) was used instead of (C$_5$Me$_4$SiMe$_3$)Sc(CH$_2$SiMe$_3$)$_2$ (THF) (19 mg, 40 μmol). The obtained product was dissolved in dichlorobenzene at 120° C.

(6) Example 81: 0.40 g (50%) of polymer product was obtained by the same method as that in Example 75 except that (C$_5$Me$_4$SiMe$_3$)Ho(CH$_2$SiMe$_3$)$_2$ (THF) (19 mg, 40 μmol) was used instead of (C$_5$Me$_4$SiMe$_3$)Sc(CH$_2$SiMe$_3$)$_2$ (THF) (19 mg, 40 μmol). The obtained product was dissolved in dichlorobenzene at 120° C.

(7) Example 82: 0.37 g (46%) of polymer product was obtained by the same method as that in Example 75 except that (C$_5$Me$_4$SiMe$_3$)Er(CH$_2$SiMe$_3$)$_2$ (THF) (24 mg, 40 μmol) was used instead of (C$_5$Me$_4$SiMe$_3$)Sc(CH$_2$SiMe$_3$)$_2$ (THF) (19 mg, 40 μmol). The obtained product was dissolved in dichlorobenzene at 120° C.

Table 9 provides a summary of the physical properties and the like of the polymer products obtained in Examples 75 to 82.

TABLE 9

| | Number average molecular weight | Molecular weight distribution | Melting point | Ratio of 1,4-unit | Cis-syndio-tacticity |
|---|---|---|---|---|---|
| Example75 | 1500 | 2.46 | 230° C. | >99% | 77rrrr % |
| Example76 | 4400 | 2.37 | 250° C. | >99% | 83rrrr % |
| Example77 | 3500 | 2.02 | 221° C. | >99% | 99rrrr % |
| Example78 | 3700 | 2.12 | 230° C. | >99% | 75rrrr % |
| Example79 | 2900 | 2.18 | 224° C. | >99% | 71rrrr % |
| Example80 | 2900 | 2.55 | 230° C. | >99% | 72rrrr % |
| Example81 | 3400 | 2.16 | 231° C. | >99% | 73rrrr % |
| Example82 | 6200 | 2.38 | 227° C. | >99% | 70rrrr % |

Example 83

Copolymerization Reaction of 1,3-cyclohexadiene and styrene

In a glove box, a solution (3 ml) of [Ph$_3$C][B(C$_6$F$_5$)$_4$](61 mg, 67 μmol) in toluene was added to a solution (2 ml) of (C$_5$Me$_4$SiMe$_3$)Sc(CH$_2$SiMe$_3$)$_2$ (THF) (32 mg, 67 μmol) in toluene in a 100-ml flask. The obtained mixture was stirred at room temperature for several minutes, and then a solution (5 ml) of 1,3-cyclohexadiene (1.26 g, 15.75 mmol) and styrene (0.55 g, 5.25 mmol) in toluene was added to the mixture while the mixture was vigorously stirred. After 3 hours, the flask was taken out of the glove box, and methanol was added to the flask to stop the polymerization. The obtained reaction mixture was poured into methanol (200 ml), and the precipitated white polymer powder was filtrated. The filtrated powder was dried at 60° C. under reduced pressure, to thereby obtain 0.99 g (activity: 4.9 kg copolymer/mol Sc h) of polymer product. The obtained product was dissolved in THF.

Examples 84 to 88

Copolymerization Reaction of 1,3-cyclohexadiene and styrene (1) Example 84: 1.13 g (activity: 5.6 kg copolymer/mol Sc h) of polymer product was obtained by the same method as that in Example 83 except that: the amount of 1,3-cyclohexadiene was changed from 1.26 g (15.75 nmol) to 1.12 g (14.00 mmol); and the amount of styrene was changed from 0.55 g (5.25 mmol) to 0.72 g (7.00 mmol). The obtained product was dissolved in THF.

(2) Example 85: 1.33 g (activity: 6.6 kg copolymer/mol Sc h) of polymer product was obtained by the same method as that in Example 83 except that: the amount of 1,3-cyclohexadiene was changed from 1.26 g (15.75 mmol) to 0.96 g (12.00 mmol); and the amount of styrene was changed from 0.55 g (5.25 mmol) to 0.94 g (9.00 mmol). The obtained product was dissolved in THF.

(3) Example 86: 1.46 g (activity: 7.3 kg copolymer/mol Sc h) of polymer product was obtained by the same method as that in Example 83 except that: the amount of 1,3-cyclohexadiene was changed from 1.26 g (15.75 mmol) to 0.84 g (10.50 mmol); and the amount of styrene was changed from 0.55 g (5.25 mmol) to 1.09 g (10.50 mmol). The obtained product was dissolved in THF.

(4) Example 87: 1.60 g (activity: 8.0 kg copolymer/mol Sc h) of polymer product was obtained by the same method as that in Example 83 except that: the amount of 1,3-cyclohexadiene was changed from 1.26 g (15.75 mmol) to 0.56 g (7.00 mmol); and the amount of styrene was changed from 0.55 g (5.25 mmol) to 1.46 g (14.00 mmol). The obtained product was dissolved in THF.

(5) Example 88: 2.00 g (activity: 10.0 kg copolymer/mol Sc h) of polymer product was obtained by the same method as that in Example 83 except that: the amount of 1,3-cyclohexadiene was changed from 1.26 g (15.75 mmol) to 0.42 g (5.25 mmol); and the amount of styrene was changed from 0.55 g (5.25 mmol) to 1.64 g (15.75 mmol)

The obtained product was dissolved in THF.

Table 10 shows physical properties of the polymer products obtained in Examples 83 to 88.

TABLE 10

| | Number average molecular weight | Molecular weight distribution | Glass transition temperature | Content of cyclohexadiene | Ratio of 1,4-unit of cyclohexadiene | Syndiotacticity of styrene structural unit |
|---|---|---|---|---|---|---|
| Example 83 | 3100 | 1.75 | 173° C. | 73 mol % | >99% | — |
| Example 84 | 3200 | 1.76 | 179° C. | 65 mol % | >99% | — |
| Example 85 | 3500 | 1.79 | 190° C. | 45 mol % | >99% | — |
| Example 86 | 3900 | 1.76 | 205° C. | 39 mol % | >99% | 50r % |
| Example 87 | 4200 | 1.93 | 236° C. | 22 mol % | >99% | >80r % |
| Example 88 | 8500 | 1.90 | 100° C. (Melting point 183° C.) | 16 mol % | >99% | >85r % |

Example 89

Copolymerization Reaction of 1,3-cyclohexadiene and ethylene

In a glove box, a solution (15 ml) of 1,3-cyclohexadiene (0.4 g, 5.0 mmol) in toluene was charged into a two-necked flask provided with a stirrer bar. The flask was taken out of the glove box, set in a water bath (25° C.), and connected to each of a Schlenk ethylene line and a mercury-sealed stopper by using a three-way cock. Ethylene gas (1 atm) was supplied into the system, and the solution was stirred for 1 minute to be saturated with the ethylene gas.

On the other hand, a catalyst toluene solution (5 ml) was obtained from (C$_5$Me$_4$SiMe$_3$)Sc(CH$_2$SiMe$_3$)$_2$ (THF) (19 mg, 40 μmol) and [Ph$_3$C][B(C$_6$F$_5$)$_4$](37 mg, 40 μmol). The catalyst toluene solution was added to the solution of 1,3-cyclohexadiene by using a syringe while the solution was vigorously stirred.

After 5 minutes, methanol (200 ml) was added thereto to stop the polymerization reaction. The precipitated polymer product was filtrated. The filtrated product was washed with methanol and dried at 60° C., to thereby obtain 1.31 g (activity: $3.9 \times 10^5$ g copolymer/mol Sc h atm) of polymer product. The obtained product was dissolved in dichlorobenzene at 145° C.

Examples 90 to 96

Copolymerization Reaction of 1,3-Cyclohexadiene and Ethylene (1) Example 90: 0.87 g of polymer product was obtained by the same method as that in Example 89 except that the amount of 1,3-cyclohexadiene was changed from 0.4 g (5.0 mmol) to 0.5 g (6.3 mmol). The obtained product was dissolved in dichlorobenzene at 145° C.

(2) Example 91: 0.35 g of polymer product was obtained by the same method as that in Example 89 except that the amount of 1,3-cyclohexadiene was changed from 0.4 g (5.0 mmol) to 0.6 g (7.5 mmol). The obtained product was dissolved in dichlorobenzene at 145° C.

(3) Example 92: 0.29 g of polymer product was obtained by the same method as that in Example 89 except that the amount of 1,3-cyclohexadiene was changed from 0.4 g (5.0 mmol) to 0.8 g (10.0 mmol). The obtained product was dissolved in dichlorobenzene at 145° C.

(4) Example 93: 2.00 g of polymer product was obtained by the same method as that in Example 89 except that the temperature of water bath was changed from 25° C. to 50° C. The obtained product was dissolved in dichlorobenzene at 145° C.

(5) Example 94: 0.15 g of polymer product was obtained by the same method as that in Example 89 except that the amount of 1,3-cyclohexadiene was changed from 0.4 g (5.0 mmol) to 1.0 g (12.5 mmol). The obtained product was dissolved in dichlorobenzene at 145° C.

(6) Example 95: 0.08 g of polymer product was obtained by the same method as that in Example 89 except that the amount of 1,3-cyclohexadiene was changed from 0.4 g (5.0 mmol) to 1.2 g (15.0 mmol). The obtained product was dissolved in dichlorobenzene at 145° C.

(7) Example 96: 0.20 g of polymer product was obtained by the same method as that in Example 89 except that: the amount of 1,3-cyclohexadiene was changed from 0.4 g (5.0 mmol) to 2.0 g (25.0 mmol); and the temperature of the water bath was changed from 25° C. to 50° C. The obtained product was dissolved in dichlorobenzene at 145° C.

Table 11 shows physical properties of the polymer compositions obtained in Examples 89 to 96.

TABLE 11

|  | Number average molecular weight | Molecular weight distribution | Melting point | Content of cyclohexadiene | Ratio of 1,4-unit of cyclohexadiene |
|---|---|---|---|---|---|
| Example89 | 105800 | 1.54 | 126° C. | 10 mol % | >99% |
| Example90 | 49800 | 1.66 | 124° C. | 22 mol % | >99% |
| Example91 | 33900 | 1.43 | 126° C. | 39 mol % | >99% |
| Example92 | 27700 | 1.36 | 126° C. | 44 mol % | >99% |
| Example93 | 115500 | 1.69 | 126° C. | 22 mol % | >99% |
| Example94 | 27100 | 1.31 | 124° C. | 46 mol % | >99% |
| Example95 | 2500 | 1.67 | 126° C. | 51 mol % | >99% |
| Example96 | 3000 | 1.65 | 123° C. | 67 mol % | >99% |

Example 97

Terpolymerization Reaction of ethylene/styrene/norbornene

In a glove box, a solution (35 ml) of 2-norbornene (1.88 g, mmol) and styrene (0.52 g, 5 mmol) in toluene was charged into a two-necked flask provided with a stirrer bar. The flask was taken out of the glove box, set in a water bath (25° C.), and connected to each of a Schlenk ethylene line and a mercury-sealed stopper by using a three-way cock. Ethylene gas (1 atm) was supplied into the system, and the solution was stirred for 1 minute to be saturated with the ethylene gas.

On the other hand, a catalyst toluene solution (5 ml) was obtained from $(C_5Me_4SiMe_3)Sc(CH_2SiMe_3)_2$ (THF) (10 mg, 21 µmol) and $[Ph_3C][B(C_6F_5)_4]$ (19 mg, 21 µmol). The obtained catalyst toluene solution was added to the solution of norbornene-styrene by using a syringe while the solution was vigorously stirred. Viscosity of the reaction mixture of the solution rapidly increased.

After 5 minutes, methanol (200 ml) was added thereto to stop the polymerization reaction. The precipitated polymer product was filtrated, washed with methanol, and dried at 60° C., to thereby obtain 2.93 g (activity: $1.7 \times 10^6$ g terpolymer/mol Sc h atm) of polymer product. The obtained product was dissolved in dichlorobenzene at 145° C.

Examples 98 to 101

Terpolymerization Reaction of ethylene/styrene/norbornene (1) Example 98: 2.69 g of polymer product (activity: $1.5 \times 10^6$ g terpolymer/mol Sc h atm) was obtained by the same method as that in Example 97 except that the amount of styrene was changed from 0.52 g (5 mmol) to 1.04 g (10 mmol). The obtained product was dissolved in dichlorobenzene at 145° C.

(2) Example 99: 3.00 g of polymer product (activity: $1.7 \times 10^6$ g terpolymer/mol Sc h atm) was obtained by the same method as that in Example 97 except that the amount of styrene was changed from 0.52 g (5 mmol) to 2.08 g (20 mmol). The obtained product was dissolved in dichlorobenzene at 145° C.

(3) Example 100: 3.45 g of polymer product (activity: $2.0 \times 10^6$ g terpolymer/mol Sc h atm) was obtained by the same method as that in Example 97 except that the amount of styrene was changed from 0.52 g (5 mmol) to 3.12 g (30 mmol). The obtained product was dissolved in dichlorobenzene at 145° C.

(4) Example 101: 1.16 g of polymer product (activity: $0.7 \times 10^6$ g terpolymer/mol Sc h atm) was obtained by the same method as that in Example 97 except that the amount of styrene was changed from 0.52 g (5 mmol) to 4.16 g (40 mmol). The obtained product was dissolved in dichlorobenzene at 145° C.

Table 12 shows physical properties of the polymer compositions obtained in Examples 97 to 101.

TABLE 12

|  | Number average molecular weight | Molecular weight distribution | Glass transition temperature | Content of styrene | Content of norbornene |
|---|---|---|---|---|---|
| Example97 | 288000 | 1.47 | 63° C. | 7 mol % | 39 mol % |
| Example98 | 322000 | 1.56 | 62° C. | 10 mol % | 35 mol % |
| Example99 | 379000 | 1.56 | 62° C. | 15 mol % | 32 mol % |
| Example100 | 458000 | 1.57 | 62° C. | 30 mol % | 30 mol % |
| Example101 | 488000 | 1.59 | 61° C. | 38 mol % | 25 mol % |

Example 102

Copolymerization Reaction of dicyclopentadiene and ethylene

In a glove box, a solution (35 ml) of dicyclopentadiene (2.64 g, 20 mmol) in toluene was charged into a two-necked flask. The flask was taken out of the glove box, set in a water bath (25° C.), and connected to each of a Schlenk ethylene line and a mercury-sealed stopper by using a three-way cock. Ethylene gas (1 atm) was supplied into the system, and the solution was stirred for 1 minute to be saturated with the ethylene gas.

On the other hand, a catalyst toluene solution (5 ml) was prepared from $(C_5Me_4SiMe_3)Sc(CH_2SiMe_3)_2$ (THF) (10 mg, 21 µmol) and $[Ph_3C][B(C_6F_5)_4]$(19 mg, 21 µmol). The prepared catalyst solution was added to the solution of dicyclopentadiene and ethylene by using a syringe while the solution was vigorously stirred. Viscosity of the reaction mixture rapidly increased.

After 5 minutes, methanol (200 ml) was added thereto to stop the polymerization reaction. The precipitated polymer product was filtrated, washed with methanol, and dried at 60° C., to thereby obtain 2.3 g ($1.3 \times 10^6$ g copolymer/mol Sc h atm) of polymer product. The obtained product was dissolved in dichlorobenzene at 145° C.

Examples 103 and 104

Copolymerization Reaction of dicyclopentadiene and ethylene (1) Example 103: 3.2 g of polymer product ($1.8 \times 10^6$ g copolymer/mol Sc h atm) was obtained by the same method as that in Example 102 except that the amount of dicyclopentadiene was changed from 2.64 g (20 mmol) to 3.96 g (30 mmol). The obtained product was dissolved in dichlorobenzene at 145° C.

(2) Example 104: 4.0 g of polymer product ($2.3 \times 10^6$ g copolymer/mol Sc h atm) was obtained by the same method as that in Example 102 except that the amount of dicyclopentadiene was changed from 2.64 g (20 mmol) to 5.28 g (40 mmol). The obtained product was dissolved in dichlorobenzene at 145° C.

Table 13 shows physical properties of the polymer products obtained in Examples 102 to 104.

TABLE 13

|  | Number average molecular weight | Molecular weight distribution | Glass transition temperature | Content of dicyclopentadiene |
| --- | --- | --- | --- | --- |
| Example102 | 494000 | 2.8 | 171° C. | 17 mol % |
| Example103 | 546000 | 2.9 | 174° C. | 25 mol % |
| Example104 | 597000 | 2.7 | 182° C. | 36 mol % |

INDUSTRIAL APPLICABILITY

Use of the polymerization catalyst composition of the present invention provides novel production methods of various kinds of polymer compounds, and further provides novel polymer compounds.

The invention claimed is:

1. A method of producing an olefin polymer, comprising:
    polymerizing an olefin monomer in the presence of a polymerization catalyst composition comprising:
    (1) a metallocene complex represented by the formula (I), $$\underset{Q^1}{\overset{Cp^*}{\phantom{M}}}\overset{|}{M}\underset{Q^2}{\overset{\phantom{|}}{\longleftarrow}}L_w, \qquad (I)$$

wherein:
    M is a central metal which is a group III metal atom or a lanthanoid metal atom;
    Cp* is a ligand bound to the central metal and includes a substituted or unsubstituted cyclopentadienyl derivative;
    $Q^1$ and $Q^2$ are monoanionic ligands; and
    L is a neutral Lewis base, where w represents an integer of 0 to 3; and
    (2) an ionic compound composed of a non-ligand anion and a cation.

2. The method according to claim 1, wherein the olefin monomer is one selected from the group consisting of a substituted styrene, an unsubstituted styrene, ethylene, diene, norbornenes, and α-olefin.

3. A method of producing an olefin copolymer, comprising:
    polymerizing two or more kinds of olefin monomers in the presence of a polymerization catalyst composition comprising:
    (1) a metallocene complex represented by the formula (I), $$\underset{Q^1}{\overset{Cp^*}{\phantom{M}}}\overset{|}{M}\underset{Q^2}{\overset{\phantom{|}}{\longleftarrow}}L_w, \qquad (I)$$

wherein:
    M is a central metal which is a group III metal atom or a lanthanoid metal atom;
    Cp* is a ligand bound to the central metal and includes a substituted or unsubstituted cyclopentadienyl derivative;
    $Q^1$ and $Q^2$ are monoanionic ligands; and
    L is a neutral Lewis base, where w represents an integer of 0 to 3; and
    (2) an ionic compound composed of a non-ligand anion and a cation.

4. The method according to claim 3, wherein the olefin monomers are two or more kinds selected from the group consisting of a substituted styrene, an unsubstituted styrene, ethylene, diene, norbornenes, and α-olefin.

5. The method according to claim 1, wherein:
    the olefin polymer is a substituted or unsubstituted styrene polymer; and
    the olefin monomer is a substituted or unsubstituted styrene.

6. The method according to claim 5, wherein the substituted or unsubstituted styrene polymer has a syndiotacticity of 80 rrrr% or more in terms of a pentad indication.

7. The method according to claim 6, wherein the polymer has Mw/Mn as an index of a molecular weight distribution of 1.7 or less.

8. The method according to claim 3, wherein:
the olefin copolymer is a styrene copolymer; and
the olefin monomers are two or more kinds of styrenes selected from a substituted styrene and an unsubstituted styrene.

9. The method according to claim 8, wherein the styrene copolymer has a syndiotacticity of 80 rrrr% or more of a pentad indication.

10. The method according to claim 9, wherein the copolymer has Mw/Mn as an index of a molecular weight distribution of 1.7 or less.

11. The method according to claim 3, wherein:
the olefin copolymer is a copolymer of ethylene and a substituted or unsubstituted styrene; and
the olefin monomers are ethylene and a substituted or unsubstituted styrene.

12. The method according to claim 11, wherein the copolymer of ethylene and a substituted or unsubstituted styrene is a random copolymer and has a syndiotacticity of a chain composed of styrene structural units of 60 r % or more in terms of a diad indication; or is a block copolymer and has a syndiotacticity of a styrene block chain of 80 rrrr % or more in terms of a pentad indication.

13. The method according to claim 1, wherein: the olefin polymer is a 1,3-cyclohexadiene polymer; and
the olefin monomer is 1,3-cyclohexadiene.

14. The method according to claim 13, wherein the 1,3-cyclohexadiene polymer has a ratio of a 1,4-structural unit with respect to all structural units of 90% or more, and has a cis-syndiotacticity of 70 rrrr % or more.

15. The method according to claim 3, wherein:
the olefin copolymer is a copolymer of 1,3-cyclohexadiene and a substituted or unsubstituted styrene; and
the olefin monomers are 1,3-cyclohexadiene and a substituted or unsubstituted styrene.

16. The method according to claim 15, wherein the copolymer of 1,3-cyclohexadiene and a substituted or unsubstituted styrene has a ratio of a 1,4-structural unit with respect to all structural units in the 1,3-cyclohexadiene of 90% or more.

17. The method according to claim 3, wherein:
the olefin copolymer is a copolymer of 1,3-cyclohexadiene and ethylene; and
the olefin monomers are 1,3-cyclohexadiene and ethylene.

18. The method according to claim 17, wherein the copolymer of 1,3-cyclohexadiene and ethylene has a ratio of a 1,4-structural unit with respect to all structural units of the 1,3-cyclohexadiene of 90% or more.

19. The method according to claim 3, wherein:
the olefin copolymer is a copolymer of ethylene, norbornenes, and a substituted or unsubstituted styrene; and
the olefin monomers are ethylene, norbornenes, and a substituted or unsubstituted styrene.

20. The method according to claim 19, wherein the copolymer is a random copolymer and has a syndiotacticity of a chain composed of styrene structural units of 98 r % or more in terms of a diad indication.

21. The method according to claim 3, wherein:
the olefin copolymer is a copolymer of dicyclopentadiene and ethylene; and
the olefin monomers are dicyclopentadiene and ethylene.

22. The method according to claim 21, wherein the copolymer of dicyclopentadiene and ethylene has a number average molecular weight of 100,000 or more.

23. The method according to claim 3, wherein:
the olefin copolymer is a copolymer of a substituted or unsubstituted styrene and a conjugated diene; and
the olefin monomers are a substituted or unsubstituted styrene and a conjugated diene.

24. The method according to claim 1, wherein, in the polymerization catalyst composition, the central metal M contained in the metallocene complex is selected from the group consisting of Scandium (Sc), Gadolinium (Gd), Yttrium (Y), Holmium (Ho), Lutetium (Lu), Erbium (Er), Dysprosium (Dy), Terbium (Tb), and Thulium (Tm).

25. The method according to claim 1, wherein, in the polymerization catalyst composition, the ligand Cp* including a cyclopentadienyl derivative is a non-crosslinking type ligand.

26. The method according to claim 1, wherein, in the polymerization catalyst composition, the cyclopentadienyl derivative contained in the ligand Cp* in the metallocene complex is tetramethyl(trimethylsilyl)cyclopentadienyl or pentamethylcyclopentadienyl.

27. The method according to claim 1, wherein, in the polymerization catalyst composition, at least one of the monoanionic ligands $Q^1$ and $Q^2$ in the metallocene complex is a trimethylsilyl group.

28. The method according to claim 1, wherein, in the polymerization catalyst composition, the neutral Lewis base L in the metallocene complex is tetrahydrofran.

29. The method according to claim 3, wherein, in the polymerization catalyst composition, the central metal M contained in the metallocene complex is selected from the group consisting of Scandium (Sc), Gadolinium (Gd), Yttrium (Y), Holmium (Ho), Lutetium (Lu), Erbium (Er), Dysprosium (Dy), Terbium (Tb), and Thulium (Tm).

30. The method according to claim 3, wherein, in the polymerization catalyst composition, the ligand Cp* including a cyclopentadienyl derivative is a non-crosslinking type ligand.

31. The method according to claim 3, wherein, in the polymerization catalyst composition, the cyclopentadienyl derivative contained in the ligand Cp* in the metallocene complex is tetramethyl(trimethylsilyl)cyclopentadienyl or pentamethylcyclopentadienyl.

32. The method according to claim 3, wherein, in the polymerization catalyst composition, at least one of the monoanionic ligands $Q^1$ and $Q^2$ in the metallocene complex is a trimethylsilyl group.

33. The method according to claim 3, wherein, in the polymerization catalyst composition, the neutral Lewis base L in the metallocene complex is tetrahydrofran.

34. The method according to claim 12, wherein the copolymer has Mw/Mn as an index of a molecular weight distribution of 1.3 or less.

35. The method according to claim 12, wherein a ratio of the styrene structural unit with respect to all structural units is 5 to 99 mol %.

36. The method according to claim 16, wherein the copolymer is a random copolymer and has a syndiotacticity of a chain composed of styrene structural units of 98 r % or more in terms of a diad indication.

37. The method according to claim 22, wherein the copolymer has a ratio of a dicyclopentadiene structural unit with respect to all structural units of 10 mol % or more.

* * * * *